US012771385B2

(12) United States Patent
Arditti Illitzky et al.

(10) Patent No.: US 12,771,385 B2
(45) Date of Patent: Oct. 20, 2026

(54) INTERFERENCE MITIGATION AND MULTI-MOMENT FILTERING

(71) Applicant: Apple Inc., Cupertino, CA (US)

(72) Inventors: David Arditti Illitzky, Guadalajara (MX); Harry Skinner, Beaverton, OR (US); Fernando Luis Ramos Alarcon Barroso, Mexico City (MX); Valeri Kontorovich Mazover, Mexico City (MX); Rocio Hernandez Fabian, Zopopan (MX)

(73) Assignee: Apple Inc., Cupertino, CA (US)

( * ) Notice: Subject to any disclaimer, the term of this patent is extended or adjusted under 35 U.S.C. 154(b) by 392 days.

(21) Appl. No.: 18/504,870

(22) Filed: Nov. 8, 2023

(65) Prior Publication Data

US 2024/0080050 A1 Mar. 7, 2024

Related U.S. Application Data

(62) Division of application No. 16/644,750, filed as application No. PCT/US2017/053865 on Sep. 28, 2017, now Pat. No. 11,848,692.

(51) Int. Cl.

*H04B 1/00* (2006.01)
*H04B 1/04* (2006.01)

(Continued)

(52) U.S. Cl.

CPC ............ *H04B 1/0096* (2013.01); *H04B 1/04* (2013.01); *H04B 17/21* (2015.01); *H04B 17/373* (2015.01); *H04B 2001/0425* (2013.01)

(58) Field of Classification Search

CPC ........ H04B 1/0096; H04B 1/04; H04B 17/21; H04B 17/373; H04B 2001/0425; H04B 1/10; H04L 25/024

See application file for complete search history.

(56) References Cited

U.S. PATENT DOCUMENTS 5,388,123 A * 2/1995 Uesugi .............. H04L 25/03044 375/349
5,926,767 A * 7/1999 Olds .................... H04B 17/373 455/10

(Continued)

FOREIGN PATENT DOCUMENTS

WO WO 2017/111800 A1 6/2017

*Primary Examiner* — Jinsong Hu
*Assistant Examiner* — Rui M Hu
(74) *Attorney, Agent, or Firm* — Kowert, Hood, Munyon, Rankin & Goetzel, P.C.

(57) ABSTRACT

Effective radio frequency interference (RFI) mitigation techniques are disclosed for use in wireless communication devices, among others. An RFI mitigation circuit may include a selector circuit to select between a cleaned signal and a clipped signal, and provide the selected signal as an output signal. The RFI mitigation circuit may also include a classifier circuit to generate a control input indication to the selector circuit to have the cleaned signal selected as the output signal based at least on a front-end circuit signal indicating that the front-end circuit is operating linearly and also indicating that the front-end circuit signal includes an interference signal. The classifier circuit may also generate the control input indication to have the clipped signal selected as the output signal based at least on the front-end circuit signal indicating that the front-end circuit is not operating linearly.

20 Claims, 23 Drawing Sheets

(51) Int. Cl.
*H04B 17/21* (2015.01)
*H04B 17/373* (2015.01)

(56) References Cited

U.S. PATENT DOCUMENTS 6,470,047 B1 * 10/2002 Kleinerman ...... H04L 25/03267 375/232
7,197,291 B2 * 3/2007 Mach .................. H04B 1/1027 455/283
7,277,725 B1 * 10/2007 Henry .................... H04B 1/525 455/296
7,487,933 B1 * 2/2009 Chen ..................... F41G 7/2206 244/3.1
8,488,724 B2 * 7/2013 Daneshrad ........... H04B 1/7102 375/350
8,718,178 B1 * 5/2014 Carbone ............... H03F 1/3241 375/296
9,246,523 B1 * 1/2016 Stopler ................ H04B 1/0458
9,413,420 B1 * 8/2016 Kong .................. H04L 27/0006
9,590,667 B1 * 3/2017 Hsu ..................... H04L 27/0012
10,616,011 B1 * 4/2020 Mirfakhraei .......... H04L 1/0048
11,101,832 B1 * 8/2021 Li .......................... H04B 1/123
2004/0203458 A1 * 10/2004 Nigra ..................... H04B 1/525 455/296
2004/0264561 A1 * 12/2004 Alexander .......... H04L 27/2662 375/232
2005/0075077 A1 * 4/2005 Mach ..................... H04B 1/406 455/70
2006/0229051 A1 * 10/2006 Narayan ............ H04B 1/71075 375/E1.031
2007/0058757 A1 * 3/2007 Kusume ............ H04L 25/03019 375/350
2007/0184782 A1 * 8/2007 Sahota ..................... H04B 1/10 455/63.1
2008/0025200 A1 * 1/2008 Tiirola .................... H04L 5/023 370/344
2008/0175308 A1 * 7/2008 Fimoff .................... H04L 27/06 375/232
2008/0317172 A1 * 12/2008 Zhang .................. H04B 7/0413 375/340
2009/0052591 A1 * 2/2009 Chen ................. H04L 25/03318 375/346
2009/0086864 A1 * 4/2009 Komninakis ............ H04B 1/10 455/296
2009/0257477 A1 * 10/2009 Khayrallah .......... H04B 1/7105 375/232
2011/0064172 A1 * 3/2011 Olson .................. H04B 1/7097 375/346
2011/0241656 A1 * 10/2011 Piemonte ............... G01C 21/20 324/207.11
2011/0311007 A1 12/2011 Nuutinen
2012/0214524 A1 * 8/2012 Wajcer ................. H04B 7/0845 455/502
2013/0044791 A1 * 2/2013 Rimini ................... H04B 1/525 375/219
2014/0198691 A1 * 7/2014 Oberhammer ........... H04B 1/10 370/281
2014/0241176 A1 * 8/2014 Wigren ............... H04W 72/541 370/252
2014/0241412 A1 * 8/2014 Kalbasi .................. H04J 11/005 375/232
2015/0043323 A1 * 2/2015 Choi ........................ H04B 1/62 370/203
2015/0051880 A1 * 2/2015 Arditti Ilitzky ......... G06F 30/20 703/2
2015/0065058 A1 * 3/2015 Wang ..................... H04B 15/00 455/63.1
2015/0244475 A1 * 8/2015 Motozuka ............. H04W 16/14 370/252
2015/0311971 A1 * 10/2015 Learned ................. H04B 7/086 370/329
2016/0226653 A1 * 8/2016 Bharadia ................ H04B 1/525
2016/0294532 A1 * 10/2016 Masmoudi ........... H04B 15/005
2017/0104574 A1 * 4/2017 Hahn ................... H04B 1/0475
2018/0026775 A1 * 1/2018 Chen ...................... H04B 1/525 370/278
2018/0115374 A1 * 4/2018 Mishra ................. H04B 17/345
2018/0115381 A1 * 4/2018 Lincoln ................ H04J 11/0053
2018/0254930 A1 * 9/2018 Luo .......................... H04B 1/10
2018/0351590 A1 * 12/2018 Arditti Ilitzky .......... H04B 1/10
2019/0268029 A1 * 8/2019 Hahn ....................... H04B 1/40
2023/0016762 A1 * 1/2023 Shih ......................... H04B 1/68

* cited by examiner

INTERFERENCE MITIGATION AND MULTI-MOMENT FILTERING

PRIORITY CLAIM

This application is a divisional of U.S. patent application Ser. No. 16/644,750, titled "Interference Mitigation and Multi-Moment Filtering," filed on Mar. 5, 2020, which itself is a national stage application of International Application No. PCT/US2017/053865, titled "Interference Mitigation and Multi-Moment Filtering," filed Sep. 28, 2017, both of which are hereby incorporated by reference in their entirety as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

Various embodiments relate generally to methods and devices for interference mitigation and multi-moment filtering.

BACKGROUND

Wireless receivers in terminal devices are commonly optimized to handle a desired information signal that is corrupted by white Gaussian noise (WGN). However, the performance of these receivers may degrade considerably when the desired information signal is mixed with radio frequency interference (RFI). This RFI can be generated locally at the platform (e.g., by clocks, buses, and other digital signaling sources), from another external device (such as from other devices using the same or an adjacent frequency band), or even from self-interference (e.g., due to adjacent band leakage, such as for frequency duplexing systems). The RFI can have varying source-dependent dynamics and, in many cases, can degrade receiver performance to the point of completely blocking communications.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings.

DESCRIPTION

Figure 1:
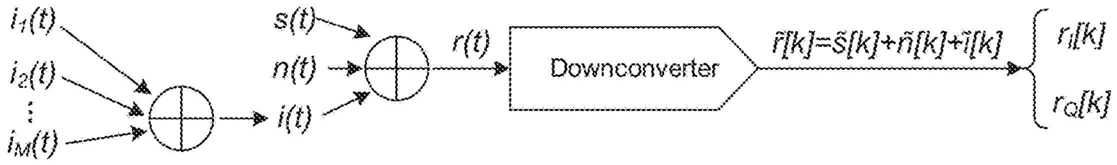
FIG. 1 shows an example of radio frequency interference (RFI) according to some aspects.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e. one or more. Any term expressed in plural form that does not expressly state “plurality” or “multiple” likewise refers to a quantity equal to or greater than one. The terms “proper subset”, “reduced subset”, and “lesser subset” refer to a subset of a set that is not equal to the set, i.e. a subset of a set that contains less elements than the set.

Any vector and/or matrix notation utilized herein is exemplary in nature and is employed solely for purposes of explanation. Accordingly, aspects of this disclosure accompanied by vector and/or matrix notation are not limited to being implemented solely using vectors and/or matrices, and that the associated processes and computations may be equivalently performed with respect to sets, sequences, groups, etc., of data, observations, information, signals, samples, symbols, elements, etc.

As used herein, “memory” are understood as a non-transitory computer-readable medium in which data or information can be stored for retrieval. References to “memory” included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, registers, shift registers, processor registers, data buffers, etc., are also embraced herein by the term memory. A single component referred to as “memory” or “a memory” may be composed of more than one different type of memory, and thus may refer to a collective component comprising one or more types of memory. Any single memory component may be separated into multiple collectively equivalent memory components, and vice versa. Furthermore, while memory may be depicted as separate from one or more other components (such as in the drawings), memory may also be integrated with other components, such as on a common integrated chip or a controller with an embedded memory.

The term “software” refers to any type of executable instruction, including firmware.

The term “terminal device” utilized herein refers to user-side devices (both portable and fixed) that can connect to a core network and/or external data networks via a radio access network. “Terminal device” can include any mobile or immobile wireless communication device, including User Equipments (UEs), Mobile Stations (MSs), Stations (STAs), cellular phones, tablets, laptops, personal computers, wearables, multimedia playback and other handheld or body-mounted electronic devices, consumer/home/office/commercial appliances, vehicles, and any other electronic device capable of user-side wireless communications. Without loss of generality, in some cases terminal devices can also include application-layer components, such as application processors or other general processing components, that are directed to functionality other than wireless communications. Terminal devices can optionally support wired communications in addition to wireless communications. Furthermore, terminal devices can include vehicular communication devices that function as terminal devices.

The term “network access node” as utilized herein refers to a network-side device that provides a radio access network with which terminal devices can connect and exchange information with a core network and/or external data networks through the network access node. “Network access nodes” can include any type of base station or access point, including macro base stations, micro base stations, NodeBs, evolved NodeBs (eNBs), Home base stations, Remote Radio Heads (RRHs), relay points, Wi-Fi/WLAN Access Points (APs), Bluetooth master devices, DSRC RSUs, terminal devices acting as network access nodes, and any other electronic device capable of network-side wireless communications, including both immobile and mobile devices (e.g., vehicular network access nodes, mobile cells, and other movable network access nodes). As used herein, a “cell” in the context of telecommunications may be understood as a sector served by a network access node. Accordingly, a cell may be a set of geographically co-located antennas that correspond to a particular sectorization of a network access node. A network access node can thus serve one or more cells (or sectors), where the cells are characterized by distinct communication channels. Furthermore, the term “cell” may be utilized to refer to any of a macrocell, microcell, femtocell, picocell, etc. Certain communication devices can act as both terminal devices and network access nodes, such as a terminal device that provides network connectivity for other terminal devices.

Various aspects of this disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. For purposes of this disclosure, radio communication technologies may be classified as one of a Short Range radio communication technology or Cellular Wide Area radio communication technology. Short Range radio communication technologies may include Bluetooth, WLAN (e.g., according to any IEEE 802.11 standard), and other similar radio communication technologies. Cellular Wide Area radio communication technologies may include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA; including High Speed Downlink Packet Access (HSDPA), High Speed Uplink Packet Access (HSUPA), HSDPA Plus (HSDPA+), and HSUPA Plus (HSUPA+)), Worldwide Interoperability for Microwave Access (WiMax) (e.g., according to an IEEE 802.16 radio communication standard, e.g., WiMax fixed or WiMax mobile), etc., and other similar radio communication technologies. Cellular Wide Area radio communication technologies also include “small cells” of such technologies, such as microcells, femtocells, and picocells. Cellular Wide Area radio communication technologies may be generally referred to herein as “cellular” communication technologies.

The terms “radio communication network” and “wireless network” as utilized herein encompasses both an access section of a network (e.g., a radio access network (RAN) section) and a core section of a network (e.g., a core network section). The term “radio idle mode” or “radio idle state” used herein in reference to a terminal device refers to a radio control state in which the terminal device is not allocated at least one dedicated communication channel of a mobile communication network. The term “radio connected mode” or “radio connected state” used in reference to a terminal device refers to a radio control state in which the terminal device is allocated at least one dedicated uplink communication channel of a radio communication network.

Unless explicitly specified, the term “transmit” encompasses both direct (point-to-point) and indirect transmission (via one or more intermediary points). Similarly, the term “receive” encompasses both direct and indirect reception.

Furthermore, the terms "transmit", "receive", "communicate", and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e. unidirectional or bidirectional communication in one or both of the incoming and outgoing directions. The term "calculate" encompass both 'direct' calculations via a mathematical expression/formula/relationship and 'indirect' calculations via lookup or hash tables and other array indexing or searching operations.

The presence of RFI (e.g., platform-generated, generated by external systems, and/or by other radio access technologies operating on the same or adjacent band) in a received signal may corrupt desired information signals and cause performance degradation at wireless receivers. In the case of platform-generated RFI, this RFI may commonly be generated by clocks, buses, and other digital signaling sources (in particular those that are high-speed) of the host system (i.e., the platform hosting the wireless chip, such as a laptop or a cell phone) that produce varying dynamics (idle, active, different stress levels), and may appear at the antenna port as analog electrical interference. Many host systems may have more than one RFI source, each of which may generate interference according to its own statistically distinct process. The presence of RFI from multiple sources may result in a non-stationary process with multiple different short-term behaviors that are generally non-Gaussian but correlated.

This problem is exacerbated as host systems become more highly integrated, support higher data rates, and target smaller form factors.

FIG. 1 shows an exemplary illustration of RFI according to some aspects. As shown in FIG. 1, M different RFI sources may generate respective interference signals $i_1(t)$, $i_2(t), \ldots, i_M(t)$, which may sum to form RFI signal i(t). RFI signal i(t) may therefore be a superposition of the M individual interference signals $i_m(t)$, m=1, . . . , M, which each may or may not be present in i(t) at any given time (i.e. each of the M individual interference signals $i_m(t)$, m=1, . . . , M, can vary between being active and inactive at different times). As each $i_m(t)$ may be generated by a different RFI source, each $i_m(t)$ may be a distinct statistical process.

RFI signal i(t) may appear at the antenna port-level of a communication device (although it is generated locally), and where it may additively combine with the desired information signal s(t) and thermal noise n(t) to yield the received signal r(t). The desired information signal s(t) may be any type of information signal, such as a signal generated by the modulation and encoding of digital data according to a particular modulation and coding scheme. The thermal noise n(t) can be characterized as white Gaussian noise. A front-end may then digitize and downconvert (e.g., as an IQ demodulator) r(t) to obtain discrete complex baseband signal $\tilde{r}[k]$ (or $r_I[k]$ and $r_Q[k]$ in IQ format), which will include contributions from each of s(t), n(t), and i(t).

Wireless receivers may generally be designed to mitigate white Gaussian noise such as thermal noise n(t), such as through the use of specialized detection, estimation, and demodulation techniques and error-correcting codes. The RFI i(t), however, may be more difficult to filter as it contains contributions from multiple statistically distinct sources that each produce a different short-term behavior.

Figure 2:
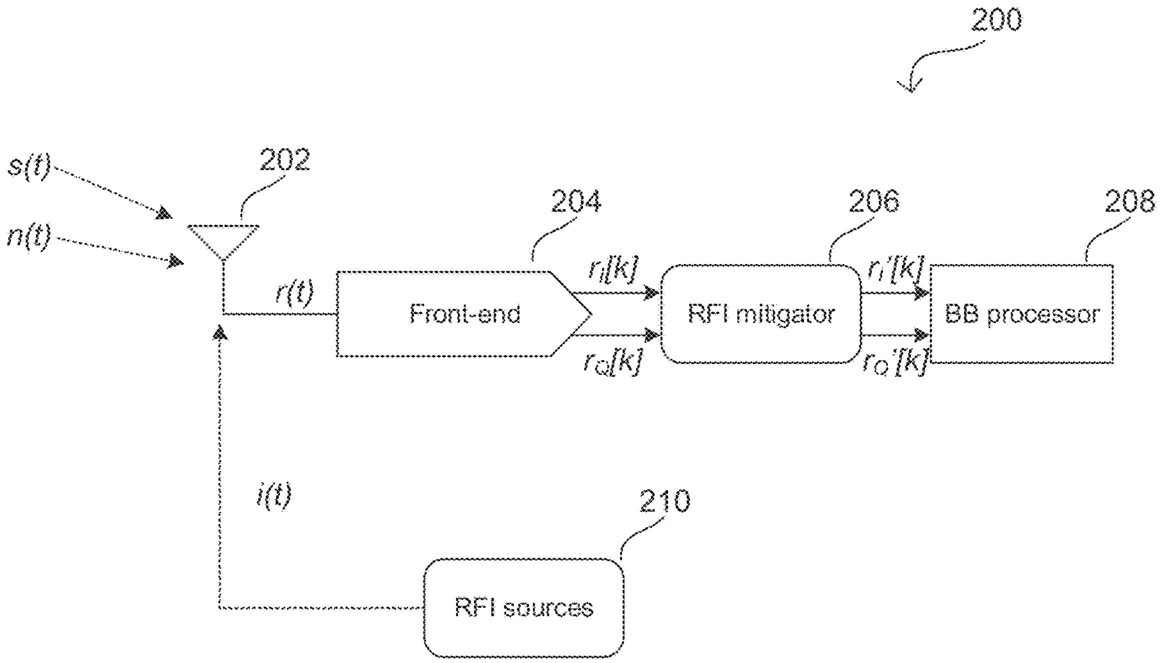
FIG. 2 shows an example of RFI in a communication device according to some aspects.

FIG. 2 shows an exemplary internal configuration of communication device 200 according to some aspects. As shown in FIG. 2, communication device 200 may include antenna system 202, front-end 204, RFI mitigator 206, and baseband processor 208. RFI sources 210 may be external to communication device 200, such as part of a host system that communication device 200 is a component of (e.g., where communication device 200 is a wireless chip in a laptop, cell phone, or other host system), may be part of another external system, or may be independent communication systems using the same or adjacent frequency bands (e.g., for a different radio access technology), and/or may be self-interference from communication device 200 (e.g., caused by transmissions by communication device 200). Although not explicitly shown in FIG. 2, in some aspects communication device 200 may include one or more additional hardware and/or software components, such as processors/microprocessors, controllers/microcontrollers, other specialty or generic hardware/processors/circuits, peripheral device(s), memory, power supply, external device interface (s), subscriber identity module(s) (SIMs), user input/output devices (display(s), keypad(s), touchscreen(s), speaker(s), external button(s), camera(s), microphone(s), etc.), or other related components.

Communication device 200 may receive wireless signals with antenna system 202, which may be a single antenna or an antenna array that includes multiple antennas. As shown in FIG. 2, the received signal r(t) (analog and radio frequency) at antenna system 202 may be a combination of desired information signal s(t), thermal noise n(t), and RFI i(t). As previously indicated, RFI i(t) may be generated by RFI sources 210, which may be part of the host system, from an independent communication device using a different radio access technology on the same or adjacent frequency band, from an external system, or part of communication device 200. In some aspects, RFI sources 210 may be clocks, buses (e.g., a DDR or PCI bus), or other digital signaling source that produces RFI.

Front-end 204 may receive r(t) from antenna system 202 and perform analog and digital RF front-end processing on r(t) to produce baseband samples r[k] (e.g., In-Phase/Quadrature (IQ) samples $r_I[k]$ and $r_Q[k]$) to provide to RFI mitigator 206. Front-end 204 may include analog and digital reception components such as an amplifier (e.g., a Low Noise Amplifier (LNA)), an RF demodulator (e.g., an RF IQ demodulator), and an analog-to-digital converter (ADC), which front-end 204 may utilize to perform the conversion of r(t) to the digitized complex baseband domain. In the following description, it is assumed that the RFI mitigator 206 may process the digitized complex baseband signal as a whole r[k], or both of its components separately $r_I[k]$ and $r_Q[k]$. Therefore, both cases will be treated generically by denoting the digitized baseband signal being processed as r[k].

Front-end 204 may then provide r[k] to RFI mitigator 206. As will be detailed, RFI mitigator 206 may be configured to perform interference mitigation on r[k] to obtain clean received signal r'[k] (in the form of digitized baseband samples) in which the effect of i(t) is reduced. RFI mitigator 206 may then provide r'[k] to baseband processor 208 for further baseband processing. Baseband processor 208 may include digital signal processing circuitry and a protocol processor, which baseband processor 208 may utilize to perform physical layer and protocol stack functions on r'[k]. In some aspects, communication device 200 may also include an application processor responsible for the transport and application layers, where baseband processor 208 may interface with the application processor. RFI mitigator 206 may therefore perform blind interference mitigation on baseband samples r[k] before they are processed by baseband processor 208. As this interference mitigation processing by RFI mitigator 206 may correct r[k] by removing the effects of downconverted ditigized RFI i[k], receiver performance may be improved.

Figure 3:
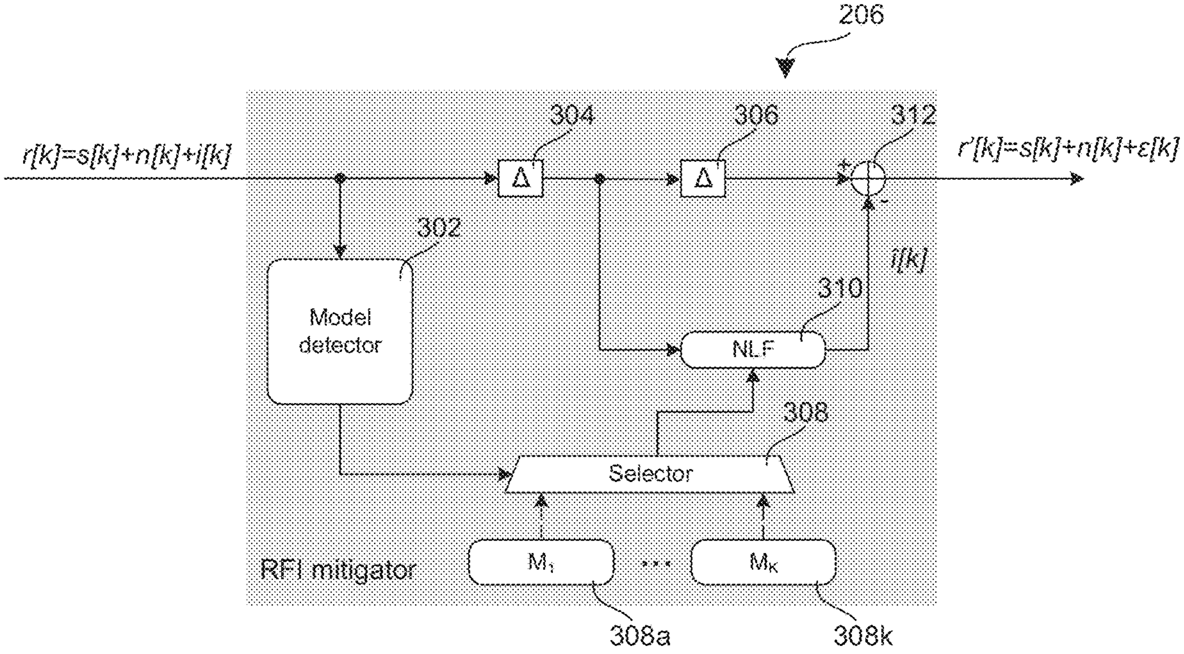
FIG. 3 shows an exemplary internal configuration of an RFI mitigator with model detection according to some aspects.

FIG. 3 shows an exemplary internal configuration of RFI mitigator 206 according to some aspects. As shown in FIG. 3, RFI mitigator 206 may receive baseband samples r[k] (or, equivalently, $r_I[k]$ and $r_Q[k]$ in IQ representation), which may include contributions s[k], n[k], and i[k] from the desired information signal s(t), thermal noise n(t), and interference i(t) (which may in turn be composed of interference signals $i_m(t)$, m=1, . . . , M, from M RFI sources), respectively. RFI mitigator 206 may then use non-linear filter 310 to filter out s[k] and n[k] from r[k] to isolate the estimated RFI i[k] as i[k]. RFI mitigator 206 may then subtract the estimated RFI i[k] from r[k] with subtractor 312, which may be realized as a software subtractor (e.g., a processor executing an instruction that defines the substitution operation $r[k]-\hat{i}[k]$) or a hardware subtractor (e.g., a digital subtraction logic circuit with at least two input terminals). The resulting clean signal r'[k] will thus include the desired information signal s[k], thermal noise n[k], and the RFI residue ε[k]. Accurate estimation of i[k] will yield a smaller ε[k] in r'[k], thus yielding better interference mitigation results. The resulting clean signal r'[k] will thus include the desired information signal s[k], thermal noise n[k], and the RFI residue ε[k]. High filtering accuracy by nonlinear filter 310 will produce a small RFI residue ε[k], thus resulting in a cleaner signal r'[k]. In some cases, the higher the accuracy of nonlinear filter 310, the more likely the residue ε[k] is Gaussian and white, which baseband processor 208 may be more suited to handle. Communication device 200 may then subsequently process r'[k] to optimally detect information signal s[k] in the presence of thermal noise [k], such as by using standard white Gaussian noise mitigation techniques at baseband processor 208. If nonlinear filter 310 is optimal, and ε[k] is also Gaussian and white, then the subsequent blocks in communication device 200 (e.g., baseband processor 208) may also be optimal in reducing its effect on information signal detection.

As mitigation performance depends on the ability of nonlinear filter 310 to estimate i[k], it can be important for nonlinear filter 310 to use a statistical model that accurately characterizes the RFI sources that generate i(t). As shown in FIG. 3, RFI mitigator 206 may include model detector 302, selector 308, and models 308*a*-308*k*, which may be configured to select a statistical model for nonlinear filter 310 to use in its filtering algorithm for generating $\hat{i}[k]$. In particular, model detector 302 may be configured to receive and evaluate r[k] to select one of models 308*a*-308*k* that best fits the current behavior of r[k] (in other words, the observations). Model detector 302 may then provide a model selection signal to selector 308 that identifies the selected model of models 308*a*-308*k*. Selector 308 may then provide the selected model to nonlinear filter 310, which may tune its filtering algorithm to the selected model.

Accordingly, in some aspects RFI mitigator 206 may have a predetermined set of models (e.g., models 308*a*-308*k*) that are available for selection and use during runtime. Model detector 302 may therefore be configured to evaluate the current observations (e.g. r[k]) that depend on i(t) in order to select one of the predetermined set of models that provides a suitable statistical fit to the interference currently being observed. In some aspects, each models 308*a*-308*k* may therefore be tailored towards a different statistical distribution of interference, thus enabling model detector 302 to select one of models 308*a*-308*k* (that fits the interference in the current observations) for nonlinear filter 310 to use in its filtering algorithm. In some aspects, models 308*a*-308*k* may be generated offline (in other words, prior to runtime), such as with model synthesis or selection from a library of available models. Models 308*a*-308*k* may be designed to statistically fit the RFI sources that contribute to i[k]. For example, during an offline RFI characterization procedure, a designer may input different stress patterns into a test device (e.g., a prototype or a final product of communication device 200) and observe the resulting RFI to obtain RFI measurements. This can include feeding the stress patterns into RFI sources 210, such as by generating different clock signals with a clock (or multiple clocks) of RFI sources 210 and by feeding different bus signals into a bus (or multiple buses) of RFI sources, and measuring the resulting RFI (which corresponds to i(t)). This process can also include using other stress patterns to generate and measure RFI using radio access technologies sharing the same or adjacent bands (e.g., by wirelessly generating the RFI with another test device, and measuring the RFI as seen at the original test device), and/or to generate and measure self-generated RFI (e.g., by wirelessly generating and then measuring the self-generated RFI at the same test device). The designer can then determine (e.g., with a computerized statistical analysis program) statistical features that characterize the various interference generated by RFI sources 210. For example, the designer can determine probability density functions (PDF), short-term auto-covariance functions (ACF), and/or higher-order cumulant functions based on the RFI measurements produced by the various different stress patterns. As a given RFI source may produce different behaviors for different stress patterns, in some cases the designer may determine more than one statistical feature for a given RFI source (for example, a given bus may produce statistically different interference when driven by different stress patterns).

The designer can then obtain models 308*a*-308*k* by synthesizing statistical models that fit these statistical features (e.g., fit to the PDF, ACF, and/or higher-order cumulant functions), where each model can characterize a particular behavior of a given RFI source or a combination of distinct RFI sources. In some aspects, models 308*a*-308*k* may be state-space models that are represented by a set of differential equations (discrete-time), where the value of each state variable depends on a prior value of that variable (for example, the value of state variable x[n] at time n depends on the value of x[k] at time k<n) and any inputs to the model (if any). The test device may generate such differential equations for each state variable of each model based on the RFI measurements, thus providing a full statistical model-based representation of a behavior of an RFI source. Once synthesized, models 308*a*-308*k* may be stored in RFI mitigator 206. In some aspects, models 308*a*-308*k* may be stored in a memory as software (e.g., data representing the state-space model stored as digital data in a memory), while in other aspects models 308*a*-308*k* may be coded into digital logic circuitry (e.g., either hard-coded into silicon, or coded with reconfigurable digital logic, such as by storing in memory configuration values for different models and re-using the same digital logic circuitry for different models by loading the configuration values for different models as needed). After receiving a model selection signal from model detector 302 that identifies a particular model, selector 308 may then retrieve the selected model from the memory to provide to nonlinear filter 310 or interface the coded digital logic circuitry for the selected model with nonlinear filter 310.

In various aspects, models 308*a*-308*k* may be chaotic or stochastic models, which can both be represented by state-space models. Stochastic models assume a state-space model is driven by a white Gaussian noise source, i.e. there is an input to the system connected to the white Gaussian noise source. Some cases of nonlinear filtering for stochastic models may use the noise source, such as in Monte Carlo or particle filters. However, in many cases, the Gaussian noise source may not need to be evaluated (e.g., no random number generator may be used). Instead, the nonlinear filtering algorithm may use the covariance matrix of the "assumed" white Gaussian driving noise source (i.e., Q, as further detailed below). This covariance matrix can then be used to alter the estimation process used by the filter (i.e., the higher the covariance of this assumed driving white Gaussian noise source, the larger the correction that will be applied for the model-based predicted value). Chaotic systems, on the other hand, do not have such an external driving source as an input, and can instead be considered deterministic systems that appear stochastic when analyzed mathematically. Although this disclosure is not limited to either approach, chaotic systems may in some cases be advantageous due to the absence of any external driving source. In particular, as all such external driving sources inherently have some uncertainty, there will be a higher mean-square estimation error when a stochastic model is used by nonlinear filter 310. Lacking such external driving sources, chaotic models may therefore theoretically be able to achieve a reduced lower bound of estimation error than stochastic models.

With continued reference to FIG. 3, model detector 302 may therefore be configured to analyze the current observations in r[k] to determine which of models 308*a*-308*k* to select for use by nonlinear filter 310. For example, model detector 302 may be configured to use a set of runtime classification rules to determine which of models 308*a*-308*k* provides the best fit to the current RFI or, alternatively, whether there is only negligible RFI in r[k]. In some aspects, the classification rules used by model detector 302 may be based on higher-order statistical (or "cumulant") analysis. For example, as previously described each of models 308*a*-308*k* may be based on statistical features (PDFs, ACFs, and/or higher-order cumulant functions) unique to the RFI source that they are tailored to. Model detector 302 may therefore analyze r[k] to detect whether r[k] is exhibiting statistical characteristics that match with any of the statistical features of models 308*a*-308*k*. If model detector 302 determines r[k] to match the statistical features of any of models 308*a*-308*k*, model detector 302 may select the corresponding model and specify the selected model to selector 308. If model detector 302 determines that r[k] does not contain RFI (i.e., contains only negligible RFI), model detector 302 may instruct selector 308 and nonlinear filter 310 to disable nonlinear filter 310, thus causing RFI mitigator 206 to deliver uncorrected baseband samples r'[k]=r[k] to baseband processor 208. This feature is described in detail regarding FIG. 6, and in some aspects can be likewise implemented into FIGS. 3 and/or 4. Accordingly, while FIGS. 3 and/or 4 may not explicitly show this functionality in full, some aspects FIGS. 3 and 4 may include it.

In some aspects, model detector 302 may be structurally realized as a processor configured to retrieve and execute program code that defines this statistical analysis of r[k] and subsequent model detection (as described herein) in the form of executable instructions. In other aspects, model detector 302 may be structurally realized as dedicated hardware circuitry is configured to execute this statistical analysis of r[k] and subsequent model detection (as described herein) with digital logic circuitry.

When model detector 302 selects one of models 308*a*-308*k*, selector 308 may retrieve and provide the selected model to nonlinear filter 310. In some aspects, selector 308 may be a software selector (e.g., a processor executing program code that receives a model selection signal and retrieves data for the selected model or interfaces the selected model with nonlinear filter 310), while in other aspects selector 308 may be a hardware selector (e.g., a multiplexer or other digital logic circuitry configured to respond to a model selection signal to retrieve data or provide an interface to nonlinear filter 310.

Nonlinear filter 310 may then utilize the selected model in conjunction with the observations r[k] to filter out s[k] and n[k] from r[k], and consequently to estimate i[k] (as i[k]). Although not limited to any particular model-based filtering algorithm, in some aspects nonlinear filter 310 may utilize an extended Kalman filter (EKF), an unscented Kalman filter (UKF), a Gauss-Hermite filter (GHF), a quadrature Kalman filter (QKF), or another model-based filtering algorithm.

For example, nonlinear filter 310 may utilize a two-stage prediction and correction process to obtain each estimate i[k], where both the current state and the uncertainty of the state are tracked and updated over time based on measurements. In the prediction stage, nonlinear filter 310 may predict an estimate of the state variables for the next time step (a predicted state estimate) based on the current values of the state variables and the currently selected model (either chaotic or stochastic) (in other words, without consideration of the observation r[k]). Nonlinear filter 310 may also predict the covariance of the predicted state estimate error (in other words, the uncertainty of the predicted state estimate). The model used by nonlinear filter 310 in the prediction stage defines how the state at time n (x[k=n]) can be used to generate the state at time n+1 (x[k=n+1]), based on x[n] and the driving/process noise input at time n (if any). This can be referred to as the state evolution operator. For Markov Processes, the evolution operator can be separated in an operator that depends on the current state only, plus an operator that depends on the noise input only. The model also defines how the outputs are generated based on the state at time n (x[k=n]), and the measurement noise at time n. This can be referred to as the measurement operator or, equivalently, the output operator. The model may also define the expected covariances for the driving/process noise and measurement noise (separately). Note that when the model doesn't define these parameters, then these become "free parameters" of the model (e.g., part of θ as described below regarding FIG. 4), and then the adaptation rule may adapt/estimate them.

The prediction stage of nonlinear filter 310 may therefore use the state evolution operator (i.e., the part dependent on the current state only). Some filtering algorithms may also use the covariance matrix (Q, as further described below) of the driving/process noise, which is generally always used to quantify the uncertainty of the prediction but not necessarily the predicted value itself.

Next, nonlinear filter 310 may execute the correction stage. The correction stage of nonlinear filter 310 filter uses the measurement operator and the covariance of the measurement noise, and in some implementations may use other parts of the model as well (i.e. the state evolution operator or the process noise covariance). In the correction stage, nonlinear filter 310 may receive the current observation r[k] and subsequently apply r[k] to correct the predicted state estimate. As there is inherently some statistical measurement noise in the observation r[k], nonlinear filter 310 may use the measurement covariance (e.g., the uncertainty of the measurement caused by measurement noise). In some aspects, nonlinear filter 310 may assume the measurement covariance as known a priori, while in other aspects nonlinear filter 310 (or, alternatively, another component of RFI mitigator 206) may estimate the measurement covariance. Nonlinear filter 310 may then use the predicted error covariance (reflecting the uncertainty of the prediction) and the measurement covariance (reflecting the uncertainty of the measurement) to determine an updated state estimate (or, equivalently, a corrected state estimate). For example, nonlinear filter 310 may determine the updated state estimate as a combination of the predicted state estimate and the measurement, such as a mixture of the predicted state estimate and a transformation of the measurement, dependent on their relative covariances. For example, the predicted state estimate may have a different dimension than the measurement, and may therefore be "transformed" into the space of the state vector. For instance, the measurement equation can be expressed as $y=Hx+w$,w here the state vector is x of dimension N, the measured vector is y of dimension M, the measurement noise vector is w of dimension M, and the measurement operator matrix is H of dimension N×M, with N>M.

In addition to the updated state estimate, nonlinear filter 310 may also determine an updated error covariance (or, equivalently, a corrected error covariance), which is the covariance of the updated state estimate error (also known as the a posteriori error covariance matrix) that characterizes the uncertainty of the updated state estimate. This nonlinear filtering approach is only one of example of the filtering algorithm that can be used by nonlinear filter 310 to determine $\hat{i}[k]$, and other filtering algorithms may equivalently be implemented by a designer depending on their desired complexity and accuracy. Furthermore, while nonlinear filter 310 is described herein as being nonlinear, in some aspects nonlinear filter 310 may be replaced with a linear filter (although this may in some cases lead to performance degradation due to the nonlinear nature of RFI).

Nonlinear filter 310 may repeat this two-stage prediction and correction process each time step k to iteratively update the state estimate and error covariance (i.e., the state estimate error covariance) using the state estimate and error covariance from the prior time step (k−1). Nonlinear filter 310 may thus determine an estimated RFI $\hat{i}[k]$ for each time step, which in general may be the estimate of the output (i.e. the estimate of the interference component of the measurement r[k]). Thus, $\hat{i}[k]$ is in general a transformation of the updated state estimate $\hat{x}[k]$. For example, in the linear output operator case (where $y=Hx$), estimated RFI $\hat{i}[k]=H\hat{x}[k]$.

Nonlinear filter 310 may provide $\hat{i}[k]$ to subtractor 312. Subtractor 312 may subtract $\hat{i}[k]$ from r[k] to obtain a cleaned sample r'[k] in which only the uncanceled residue ε[k] remains from i[k]. Delay units 304 and 306 may align each sample of $\hat{i}[k]$ with the corresponding sample of r[k] to account for processing delays. As shown in FIG. 3, delay unit 304 may compensate for the processing delays of model detector 302 while delay unit 306 may compensate for the processing delays of nonlinear filter 310.

As previously indicated, in some aspects models 308*a*-308*k* may be synthesized offline, and may remain fixed during runtime. While model detector 302 may still be able to select any of models 308*a*-308*k* at any given time, model detector 302 may still only have a finite and static set of models to select from when classifying the RFI source based on r[k]. Such approaches may be well-suited for cases where at least one of models 308*a*-308*k* accurately fits the current RFI source but may nevertheless suffer when none of models 308*a*-308*k* offers a good fit. If models 308*a*-308*k* do not thoroughly characterize all RFI sources seen during runtime, there may be a degradation in mitigation performance.

This may likewise be true for the filtering algorithm used by nonlinear filter 310, which may generally be fixed to obtain i[k] in the same procedure over time. However, there may be different scenarios, such as different Interference-to-Signal-and-Noise Ratios (ISNR) conditions or model errors, that could warrant the use of a different filtering algorithm.

Accordingly, in some aspects of this disclosure, RFI mitigator 206 may be configured to use parametric adaptation to adapt the models and/or filtering algorithms during runtime. This can enable RFI mitigator 206 to dynamically adjust the modeling and filtering to achieve a better fit with the RFI that is actually being observed, which can in turn improve the accuracy of $\hat{i}[k]$—therefore reducing ε[k]—and thus enhance mitigation performance.

Figure 4:
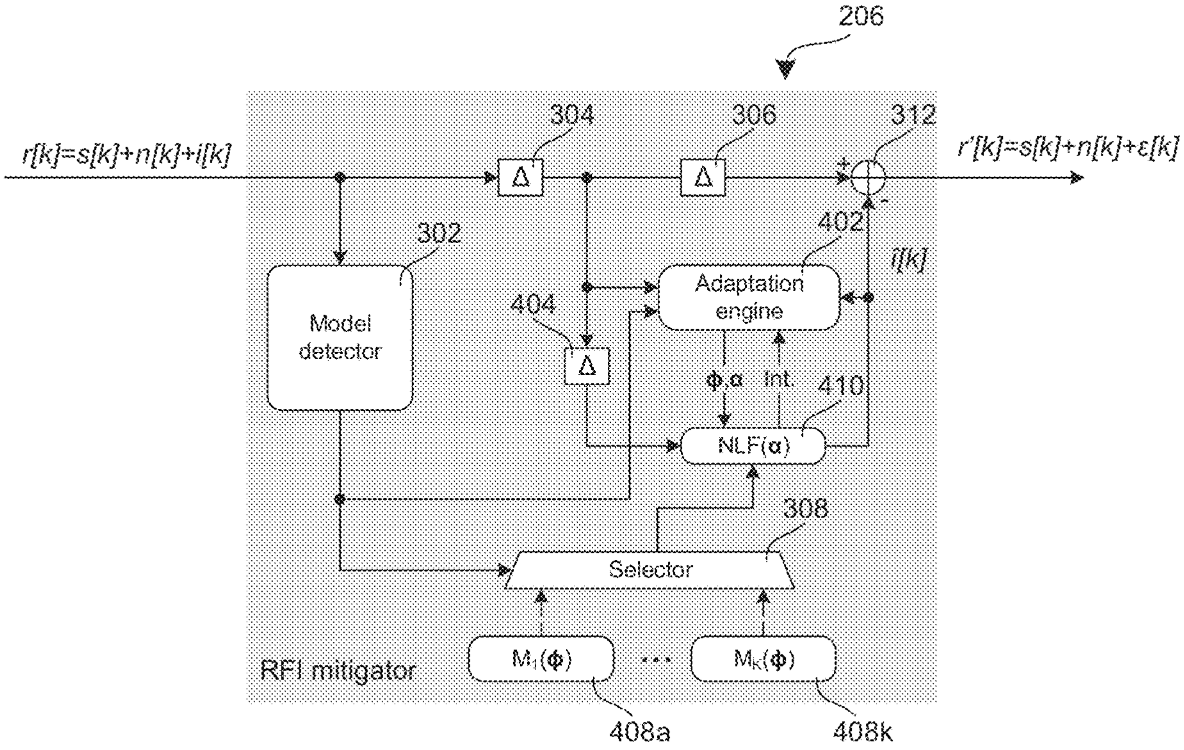
FIG. 4 shows an exemplary internal configuration of an adaptive RFI mitigator with model detection according to some aspects.

FIG. 4 shows an exemplary internal configuration of RFI mitigator 206 configured with parametric adaptation according to some aspects. As shown in FIG. 4, RFI mitigator 206 may include similar components as in FIG. 3, including model detector 302, delay units 304 and 306, selector 308, and subtractor 312. RFI mitigator 206 may additionally include adaptation engine 402, and may use parametric models 408*a*-408*k* instead of models 308*a*-308*k* and parametric nonlinear filter 410 instead of nonlinear filter 310. RFI mitigator 206 may also include delay unit 404, which compensates for the adaptation engine delay and thus aligns the r[k] input to nonlinear filter 310 with the parameters α and ϕ.

Adaptation engine 402 may be configured to adapt model parameters ϕ (for parametric models 408*a*-408*k*) and/or algorithm parameters α (for parametric nonlinear filter 410), which may enable RFI mitigator 206 to adapt its RFI estimation to fit different types of RFI that were not pre-characterized offline. In particular, adaptation engine 402 may tap as its inputs the model selection signal of model detector 302, the delayed sample r[k] from delay unit 304, the internal variables of parametric nonlinear filter 410 (e.g., the predicted values of the previous or current time step, the updated values of the previous or current time step, etc.), and $\hat{i}[k]$. Adaptation engine 402 may then adapt model parameters ϕ and algorithm parameters α based on these inputs to produce updated model and algorithm parameters ϕ and a that are better tailored to the RFI sources currently influencing i[k]. Adaptation engine 402 may then provide the adapted model and algorithm parameters ϕ and α to parametric nonlinear filter 410, which may then utilize the ϕ and α in its filtering algorithm.

RFI mitigator 206 may therefore use parametric models and algorithms, or in other words, models and algorithms that are defined by and can be tuned by certain parameters. While some aspects described herein may refer to parametric adaptation of both the model parameters ϕ and the algorithm parameters α, in other aspects RFI mitigator 206 may only adapt model parameters ϕ (and, optionally, may only use parametric models but not parametric algorithms) or may only adapt algorithm parameters α (and, optionally, may only use parametric algorithms but not parametric models). The specific types and numbers of parameters of ϕ and α will depend on the particular model and algorithm implemented in RFI mitigator 206. For example, some parametric models are only single parameter models, and will therefore only have a single parameter ϕ in ϕ that, when inserted into the state-space model, completely defines the model. Other parametric models may use multi-variable models, and will have multiple parameters in (that collectively define the state-space model.

As previously described, RFI mitigator 206 of FIG. 3 may use models 308*a*-308*k* that are each pre-designed to characterize a specific RFI source. In some cases, these models may be non-parametric and may be tailored to a specific statistical distribution (e.g., fitted to the PDF and ACF of the corresponding RFI source). In some aspects, parametric models 408*a*-408*k* of RFI mitigator 206 of FIG. 4 may span entire families of statistical distributions (instead of a single statistical distribution). A basic example is a Gaussian distribution that is defined by its mean and variance (the parameters), and can be fit to different Gaussian distributions (bell curves) by tuning the mean and variance. This concept can be expanded to any other type of statistical distribution, where the parameters of the parametric model representing the statistical distribution can be adapted to fit a particular desired statistical distribution. Adaptation of the model parameters ϕ of a given model can fit the model to different statistical distributions within the family. Adaptation engine 402 may therefore be configured to observe r[k], $\hat{i}$[k], and internal variables of parametric nonlinear filter 410 in order to adaptively fit the model (by adapting its parameters ϕ) selected by model detector 302 to the current RFI conditions. Adaptation engine 402 enables RFI mitigator 206 to filter and keep track of non-stationary RFI sources, that is, RFI source whose short-term statistical characterization slowly varies in time.

Similarly, instead of using a fixed filtering algorithm as in some cases of FIG. 3, adaptation engine 402 may be configured to tune estimation performance of parametric nonlinear filter 410 by adapting its algorithm parameters α. For example, adaptation engine 402 may be configured to adapt operation of parametric nonlinear filter 410 to different scenarios, such as for different Interference-to-Signal-and-Noise Ratios (ISNRs) or model errors. This may enable RFI mitigator 206 to adaptively adjust its filtering algorithm to better meet the current scenario.

Figure 5:
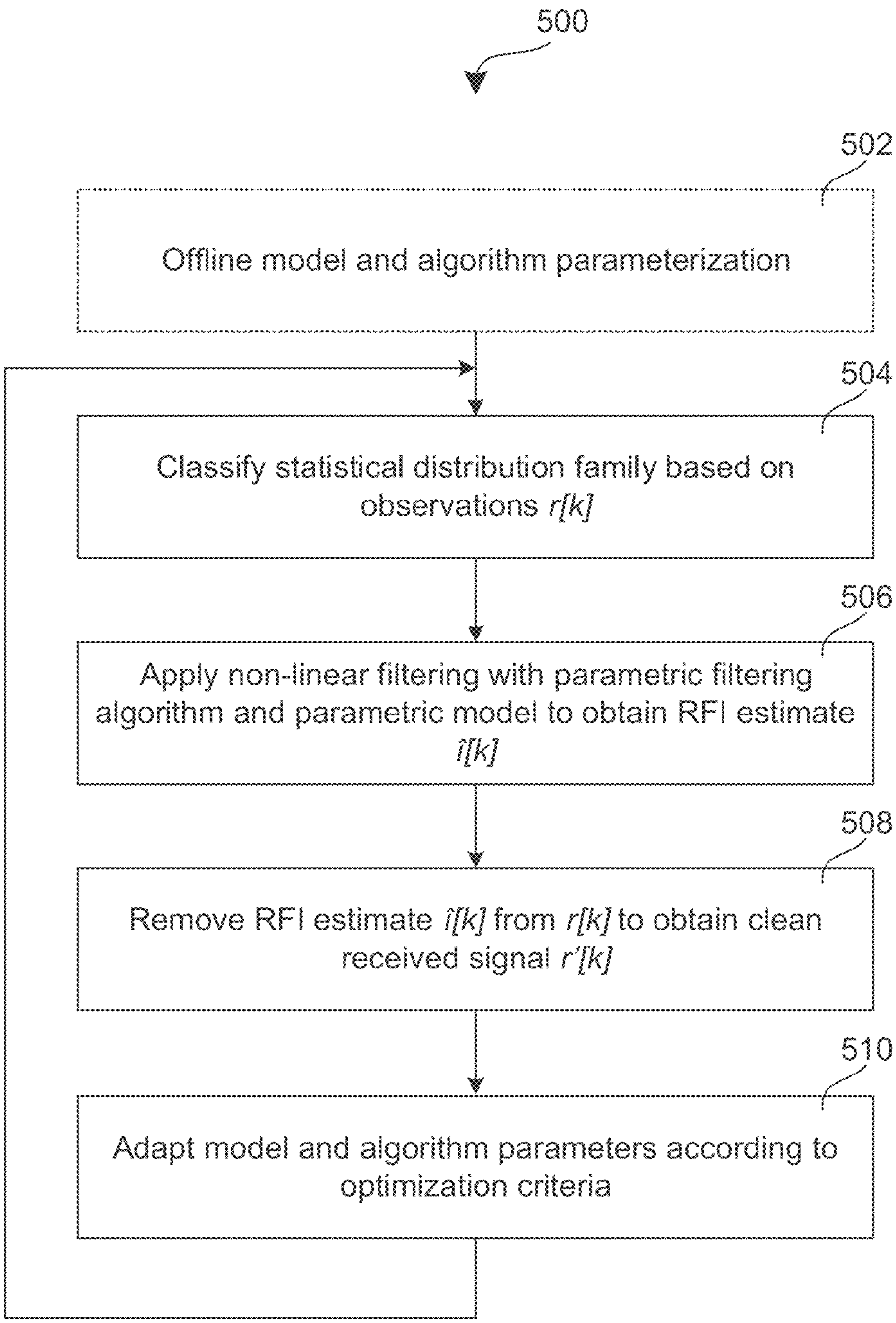
FIG. 5 shows an exemplary method for performing adaptive RFI mitigation according to some aspects.

FIG. 5 shows method 500 describing the operation of RFI mitigator 206 according to some aspects. As shown in FIG. 5, RFI mitigator 206 may first undergo offline model and algorithm parameterization in stage 502. As previously indicated, parametric models 408*a*-408*k* and the parametric filtering algorithm used by parametric nonlinear filter 410 may be parameterized. For example, a designer may select a set of models 408*a*-408*k* that each have a distinct set of model parameters ϕ (e.g., different numbers and/or different types), where each individual model is designed to pre-characterize a particular statistical distribution family. In some exemplary cases, the designer may select the specific statistical distribution families based on a series of stress tests applied to a test device (e.g., a prototype or working model of communication device 200). For example, the designer may input each of a plurality of stress patterns into the test device (e.g., feed each stress pattern through RFI sources 210) and obtain measurements for the resulting RFI (e.g., as seen at the antenna port-level where r[k] is present). Once measurements for each of the plurality of stress patterns have been obtained, the designer can perform a statistical analysis to obtain a statistical feature (e.g., PDF, ACF, or higher-order cumulant functions) of the RFI generated by each stress pattern (e.g., with a computerized statistical analysis program). In some aspects, the designer may partition the measurements into short-term segments and obtain the statistical features for each of the short-term segments, which can be advantageous for capturing the short-term behavior of the RFI sources.

After the statistical features have been obtained, the designer may group similar statistical features into clusters (e.g., having similar PDFs and/or ACFs), where each cluster defines a distinct statistical distribution family of RFI behavior. The designer can then select (e.g., from an existing library of models) or synthesize a parametric model (e.g., with a computerized model synthesis program) for each cluster, where the parametric model for each cluster has a set of parameters ϕ that are tunable to fit a range of statistical features within the statistical distribution family of the cluster. The designer may also design a runtime classification rule that can evaluate r[k] to determine which (if any) statistical distribution family of RFI behavior is present in r[k]. While the statistical analysis and runtime classification rule design may be controlled by a designer, the designer may utilize a computerized procedure to perform the mathematical analysis, such as to compute the statistical features, synthesize the corresponding parametric models 408*a*-408*k*, and to determine the runtime classification rule. Once this procedure is complete, the designer can store the resulting parametric models in RFI mitigator 206 as parametric models 408*a*-408*k* (e.g., as software models in the form of data on a memory or as hardware models in the form of hard-coded or reconfigurable digital logic circuitry) and store the runtime classification rule in model detector 302.

As previously indicated, the filtering algorithm used by nonlinear filter 310 may also be parametric. The designer may therefore also select one or more parametric filtering algorithms to store in nonlinear filter 310, where each parametric filtering algorithm has a set of algorithm parameters α that are tunable to fit different RFI scenarios (e.g., different ISNR conditions or model errors).

After the offline configuration of RFI mitigator 206 in stage 502 is complete, RFI mitigator 206 may be operated during runtime of communication device 200. With reference to FIG. 2, communication device 200 may thus receive a wireless signal including desired information signal s(t) and thermal noise n(t) that is corrupted by RFI signal i(t) at antenna system 202. Front-end 204 may therefore perform downconversion and digitization on the resulting analog radio-frequency signal r(t) to obtain baseband signal r[k] (composed of $r_I$[k] and $r_Q$ [k] in IQ form), which front-end 204 may provide to RFI mitigator 206.

RFI mitigator 206 may then obtain an estimate $\hat{i}$[k] for the RFI and remove $\hat{i}$[k] from r[k] to obtain a clean received signal r'[k] in stages 504-510, which may be a continuous and iterative procedure over each of a sequence of time steps k (e.g., over each sample of r[k]) and may or may not be performed in the specific order shown in FIG. 5.

In particular, model detector 302 may receive observations r[k] and statistically evaluate r[k] according to its runtime classification rules. For example, as previously indicated parametric models 408*a*-408*k* may each be tailored to a different statistical distribution family. The runtime classification rules used by model detector 302 may therefore be configured to classify the current RFI as one of the statistical distribution families to which parametric models 408*a*-408*k* are tailored. For example, the runtime classification rules may specify statistical features (e.g., PDFs, ACFs, and/or higher-order statistical cumulants) for each statistical distribution family, or may specify common characteristics of the statistical features for each statistical distribution family (e.g., common parameters of PDFs and ACFs of processes that fall within the statistical distribution family).

Model detector 302 may therefore be configured to (e.g., with either corresponding executable instructions or digital logic circuitry) determine and track the statistical features of the RFI in r[k] over time, and to compare the statistical features of the RFI in r[k] to the statistical features of the statistical distribution families characterized by parametric models 408*a*-408*k* to determine whether there is a match.

The runtime classification rules may also define what constitutes a match between the statistical features of the RFI in r[k] to any of the statistical features of the statistical distribution families. For example, the runtime classification rules may specify a numerical similarity threshold for a similarity metric (e.g., any metric that can measure how similar PDFs, ACFs, and/or higher-order cumulant functions are to each other). Model detector 302 may then determine the similarity metric between the statistical features of the RFI in r[k] and each of the statistical distribution families and, if any of the similarity metrics are above the numerical similarity threshold, may determine that the parametric model corresponding to the statistical distribution family matches with the RFI in r[k]. Alternatively, in some aspects model detector 302 may be configured to identify which statistical distribution family produces the highest similarity metric with the statistical features of the RFI in r[k], and to determine that the corresponding parametric model matches with the RFI in r[k]. Other approaches in which model detector 302 numerically compares the statistical similarity of the RFI in r[k] with the statistical features of parametric models 408*a*-408*k* according to runtime classification rules are also within the scope of this disclosure.

In some aspects, model detector 302 may be configured to use higher-order statistical cumulants to classify the RFI in r[k] as one of the statistical distribution families represented by parametric models 408*a*-408*k*. In particular, both the thermal noise n[k] and the desired information signal s[k] can be considered Gaussian (as an information signal, e.g., OFDM signals, generally appear Gaussian across its bandwidth). As these higher-order statistical cumulants are blind to Gaussian components, model detector 302 may be able to isolate the statistical effects of i[k] from that of n[k] and s[k] in the observations r[k] by calculating the higher-order cumulants of r[k]. The runtime classification rules may also specify the higher-order cumulants attributed to the statistical distribution families represented by parametric models 408*a*-408*k*. Accordingly, model detector 302 may be configured to (e.g., with executable instructions or digital logic circuitry) compare the higher-order statistical cumulants of r[k] with those of the statistical distribution families represented by parametric models 408*a*-408*k* to determine whether there are any matches (e.g., by identifying the statistical distribution family producing the highest similarity metric or producing a similarity metric above a numerical similarity threshold).

If model detector 302 determines that there is a statistical match between the RFI in r[k] and one of parametric models 408*a*-408*k*, model detector 302 may provide a corresponding model selection signal to selector 308 that identifies the matching parametric model. Selector 308 may then provide the selected parametric model to parametric nonlinear filter 410 (e.g., by retrieving the data for the parametric model from a memory, or by interfacing parametric nonlinear filter 410 with the digital logic circuitry of the selected parametric model). This may conclude stage 504 of method 500. In some aspects, model detector 302 may also be configured to determine that there is negligible (including none) RFI in r[k]. For example, in some aspects model detector 302 may have a runtime classification rule that defines when negligible RFI is present in r[k], such as the absence of any higher-order statistical cumulants in r[k] or the lack of any suitable matches (e.g., above a numerical similarity threshold) between parametric models 408*a*-408*k* and the RFI in r[k]. In these cases, model detector 302 may not select any of parametric models 408*a*-408*k*, and may instead deactivate parametric nonlinear filter 410. Accordingly, parametric nonlinear filter 410 will not perform any filtering on r[k] and will not generate an RFI estimate $\hat{i}[k]$. Subtractor 312 will then provide $r'[k]=r[k]\approx s[k]+n[k]$ (since $\varepsilon[k]=i[k]$ and i[k] is negligible).

Continuing to stage 506, parametric nonlinear filter 410 may then apply non-linear filtering with the parametric filtering algorithm and the parametric model to obtain RFI estimate $\hat{i}[k]$ for the current time step k. As shown in FIG. 4, parametric nonlinear filter 410 may receive input from selector 308, delay unit 404, and adaptation engine 402. In particular, selector 308 may provide the selected parametric model (selected by model detector 302 in stage 504) of parametric models 408*a*-408*k*. Parametric nonlinear filter 410 may then tune itself to the model, for example, by using the state-space representation (that defines the progression of state variables over time, and the generation of the output based on the current state variables values) of the selected parametric model as the basis for state estimates (both the predicted and updated estimate) and the error covariances (both predicted and updated).

Delay unit 404 may provide a delayed sample of r[k] to parametric nonlinear filter 410, where r[k] is also delayed by delay unit 304. This use of delay compensates for processing latency arising from model detector 302 and adaptation engine 402. In some aspects, delay unit 404 may be optional, and its presence may depend on the processing latency introduced by adaptation engine 402.

Adaptation engine 402 may provide model parameters $\phi$ and algorithm parameters $\alpha$ to parametric nonlinear filter 410. As RFI mitigator 206 repeats method 500 over each of a sequence of time steps k, adaptation engine 402 may have previously updated the model parameters $\phi$ and the algorithm parameters $\alpha$ according to an adaptation scheme. The specific model parameters $\phi$ (e.g., the number and type) may depend on the specific features of the selected parametric model. For example, one or more of parametric models 408*a*-408*k* may have a different number of parameters (e.g., a single-parameter model vs. a multi-parameter model) and/or different types of parameters (e.g., a first parametric model having parameters that impact different model behavior than the parameters in a second parametric model). The parametric models can be basic models (such as the unified chaotic system) or more complex, multi-parameter models (such as the generalized Lorenz canonical form), where the specific parametric models can be selected by a designer based on the statistical distribution families that the designer intends to represent with parametric models 408*a*-408*k*.

The algorithm parameters $\alpha$ may depend on the specific parametric filtering algorithm that is employed by parametric nonlinear filter 410. As previously described, parametric nonlinear filter 410 may perform a prediction and correction stage and obtain an updated state estimate and an updated error covariance. The algorithm parameters $\alpha$ may therefore be parameters used in the calculations for the prediction and correction stages, and, as previously described, may be adaptable to adjust to different scenarios. While algorithm parameters $\alpha$ can be algorithm parameters for any parametric filtering algorithm, one example is the sigma vectors, or signal samples, of an Unscented Kalman Filter (UKF)

Accordingly, parametric nonlinear filter 410 may receive model parameters $\phi$ and algorithm parameters $\alpha$ and insert these parameters into the calculations used for the prediction and correction stages. Nonlinear parametric filter 410 may then execute the prediction and correction stages using the adapted parametric model and parametric filtering algorithm in stage 506, including using the current state estimate of the model and the current error covariance to obtain a predicted state estimate and predicted error covariance (the prediction stage) and subsequently using r[k] as a measurement (along with its measurement noise covariance) to correct the predicted state estimate and predicted error covariance and obtain an updated state estimate and updated error covariance.

The parametric nonlinear filter 410 operation uses a stochastic or chaotic parametric model 408*a*-408*k*, which in some aspects may be represented by an evolution operator and a measurement or output operator. Note that, in the most general setting, the continuous time evolution operator may be composed of two functions in $F(X, t; \phi_F)$ and $G(X, t; \phi_G)$, where F(•) corresponds to the deterministic part of the evolution also known as "drift", and G(•) corresponds to the random part of the evolution also known as "diffusion", and the evolution operator is parameterized by the model parameters $\phi_F$ and $\phi_G$. The generic evolution operator of a Markov stochastic process can therefore be expressed, for the continuous time case, as $dX(t)/dt=F(X(t), t)+G(X(t), t)w(t)$, where G(•) is a weighting factor for the process noise w(t). Furthermore, the process noise w(t) is characterized by the process noise covariance matrix Q(t) (note that the process noise may be present for stochastic models but not inherently necessary for chaotic models). While this presents the general case, in many practical cases G(X, t) can be assumed independent of X, i.e. G(X, t)=G(t). Accordingly, the G(•) operator for a given time instant t will be a constant-valued matrix that can be absorbed as part of process noise covariance matrix Q(t), therefore in such cases G(•) can be ignored. While various aspects presented herein may use this assumption, other aspects that expressly account for G(•) may be used in the same manner and are therefore also within the scope of this disclosure. Following the same lines, in the most general setting, the continuous time measurement or output operator is represented by the function $H(X, t; \phi_H)$, which is parameterized by the model parameters $\phi_H$. The generic measurement operator of a Markov stochastic process can therefore be expressed, for the continuous time case, as $Z(t)=H(X, t; \phi_H)+v(t)$, where v(t) represents the measurement noise (independent of X by assumption) and is characterized by the measurement noise covariance matrix R(t). In some cases, Q and R may be considered model parameters as well.

This procedure of stage 506 will now be described in the exemplary case of a discrete time extended Kalman filter; however, this disclosure is not limited to extended Kalman filters, and other filtering algorithms can be similarly incorporated for use by parametric nonlinear filter 410. Parametric nonlinear filter 410 may first calculate a predicted state estimate and predicted error covariance in the prediction stage. In particular, using the updated state estimate $\hat{X}_{k-1|k-1}$ (which may be a vector of state variables that represent the estimated state of the model) from the previous time step (k−1), parametric nonlinear filter 410 may determine a predicted state estimate for time step k as $\hat{X}_{k|k-1}=F(\hat{X}_{k-1|k-1}, k)$, where F(•) is the evolution operator (defining the deterministic progression of the state over time). This predicted state estimate $\hat{X}_{k|k-1}$ will have some inherent uncertainty, which parametric nonlinear filter 410 may quantify as the predicted error covariance $$P_{k|k-1} = F_k P_{k-1|k-1} F_k^T + Q_k$$

with $F_k$ being the evolution operator matrix defined as $$F_k = \left.\frac{\partial F(x, k)}{\partial x}\right|_{x=\hat{X}_{k-1|k-1}}$$

and $Q_k$ being the covariance of the process noise $w_k$ assumed to drive the evolution of the unknown X that is being estimated as $\hat{X}$.

Parametric nonlinear filter 410 may then advance to the correction stage following completion of this prediction stage. In the correction stage, parametric nonlinear filter 410 may use an observation r[k] (equivalently, a measurement) to correct the predicted state estimate $\hat{X}_{k|k-1}$ to obtain an updated state estimate $\hat{X}_{k|k}$. While r[k] may be a scalar in the present case, the observation vector can be expressed generally as $z_k$. Each element of observation vector $z_k$ may depend on, and thus reflect, the actual value of multiple state variables in $\hat{X}_k$ (i.e., there may not be a one-to-one correspondence between each scalar measurement value in $z_k$ and a single state variable in $\hat{X}_k$). The relationship between the observation vector $z_k$ and the state variables of $\hat{X}_k$ can be quantified as the output operator H(•), where $z_k=H(X_k, k)+v_k$ and $v_k$ is the measurement noise.

Parametric nonlinear filter 410 may therefore calculate a measurement residual $\tilde{y}_k=z_k-H(\hat{X}_{k|k-1}, k)$, or in other words, the difference between the actual measurement $z_k$ and the predicted output $H(\hat{X}_{k|k-1}, k)$ (as given by applying the output operator H(•) to the predicted state estimate $\hat{X}_{k|k-1}$). Parametric nonlinear filter 410 may then calculate the uncertainty of the measurement residual (the residual covariance) as $$S_k = H_k P_{k|k-1} H_k^T + R_k$$

where $R_k$ is the covariance of the measurement noise $v_k$ (the measurement noise covariance) and where $H_k$ is the linearization of the output operator H(•) given as $$H_k = \left.\frac{\partial H(x, k)}{\partial x}\right|_{x=\hat{X}_{k|k-1}}.$$

Parametric nonlinear filter 410 may then update the predicted state estimate $\hat{X}_{k|k-1}$ based on the measurement residual $\tilde{y}_k$. As the measurement residual $\tilde{y}_k$ represents the difference between the actual measurement and the predicted output, parametric nonlinear filter 410 can then use $\tilde{y}_k$ to calculate an update to the predicted state estimate $\hat{X}_{k|k-1}$ (in other words, to correct the model-only prediction of $\hat{X}_{k|k-1}$ using an actual observed measurement $z_k$). However, both the predicted state estimate $\hat{X}_{k|k-1}$ and the measurement residual $\tilde{y}_k$ inherently have some uncertainty as represented by the predicted error covariance $P_{k|k-1}$ and the residual covariance $S_k$. Accordingly, parametric nonlinear filter 410 may calculate a gain (the Kalman gain) and combine $\hat{X}_{k|k-1}$ and $\tilde{y}_k$ using this Kalman gain, where the magnitude of the Kalman gain depends on the relative covariances of $\hat{X}_{k|k-1}$ and $\tilde{y}_k$. The resulting updated state estimate $\hat{X}_{k|k}$ will therefore depend on both $\hat{X}_{k|k-1}$ and $\tilde{y}_k$, where the relative contributions of $\hat{X}_{k|k-1}$ and $\tilde{y}_k$ to $\hat{X}_{k|k}$ depends on their relative covariances. Expressed mathematically, parametric nonlinear filter 410 may calculate the Kalman gain $$K_k \text{ as } K_k = P_{k|k-1} H_k^T S_k^{-1}.$$

Parametric nonlinear filter 410 may then weight the measurement residual $\tilde{y}_k$ with the Kalman gain $K_k$ and calculate the updated state estimate as $\hat{X}_{k|k}=\hat{X}_{k|k-1}+K_k\tilde{y}_k$. Parametric nonlinear filter 410 may then calculate the updated error covariance (representing the uncertainty of the updated state estimate) as $P_{k|k}=(I-K_kH_k)P_{k|k-1}$ Once parametric nonlinear filter 410 has obtained the updated state estimate $\hat{X}_{k|k}$ and updated error covariance $P_{k|k}$ for the current time step k, parametric nonlinear filter 410 may use the updated state estimate to obtain an RFI estimate $\hat{i}[k]$. For example, parametric nonlinear filter 410 may use the output operator H(•) to transform $\hat{X}_{k|k}$ into the expected output i[k] as i[k]=H($\hat{X}_{k|k}$, k). This may conclude stage 506. Parametric nonlinear filter 410 may then provide i[k] to subtractor 312, and may retain updated state estimate $\hat{X}_{k|k}$ and updated error covariance $P_{k|k}$ for use in the next time step (k+1).

Subtractor 312 may then subtract $\hat{i}[k]$ from r[k] in stage 508 to remove $\hat{i}[k]$ from r[k] and obtain cleaned received signal r'[k] (for the current time step k of the received signal). As shown in FIG. 4, subtractor 312 may receive r[k] after it is delayed by both delay unit 304 (compensating for delay model detector 302) and delay unit 306 (compensating for delay accumulated in adaptation engine 402 and in parametric nonlinear filter 410), which aligns r[k] with $\hat{i}[k]$ in time.

RFI mitigator 206 may repeat this process over each of a plurality of time steps k, thus producing a cleaned received signal r'[k]=s[k]+n[k]+ε[k] (composed of a cleaned sample r'[k] calculated for each time step k). The size of ε[k], and consequently the mitigation performance of RFI mitigator 206, depends on the accuracy of RFI estimate $\hat{i}[k]$ relative to the actual RFI i[k].

As shown in FIG. 4, adaptation engine 402 may receive as input r[k] (from delay unit 304), the model selection signal (from model detector 302), internal variables (from parametric nonlinear filter 410), and the RFI estimate i[k] (from parametric nonlinear filter 410). Adaptation engine 402 may then adapt the model parameters ϕ and the algorithm parameters α (or, in some aspects, only one of the model parameters ϕ or the algorithm parameters α) based on these inputs in stage 510. In some aspects, adaptation engine 402 may adapt model parameters ϕ and the algorithm parameters α at each time step k, while in other aspects adaptation engine 402 may only adapt model parameters ϕ and the algorithm parameters α intermittently (e.g., not at every time step k). Adaptation engine 402 may provide updated model parameters ϕ and updated algorithm parameters α to parametric nonlinear filter 410, which parametric nonlinear filter 410 may use in its subsequent execution of stage 506 to determine i[k] for a later time step k.

Adaptation engine 402 may generally attempt to optimize the mitigation efficiency against the currently observed RFI in r[k] by tracking which model and algorithm parameters ϕ and α lead to estimation optimality. For example, when the estimation of $\hat{i}[k]$ by parametric nonlinear filter 410 is optimal, the measurement residual $\tilde{y}_k$ (the error in the prediction of the next measurement) should be a zero-mean white Gaussian noise process (an innovation process).

There exist various different adaptation schemes that adaptation engine 402 can use to control the adaptation of model and algorithm parameters ϕ and α, which may generally offer a tradeoff between computational complexity and accuracy. For example, various different theoretical, analytical, and heuristic-based approaches can be used. Least-mean squares (LMS) and Recursive Least Squares (RLS) are two exemplary adaptation schemes that can be incorporated into the framework of RFI mitigator 206. For example, LMS and RLS can be used when the algorithm parameters α to be adapted (with all other variables fixed) represent linear problems. In other aspects, adaptation engine 402 may use a data-trained model, such as a neural network, which, for example, can be trained offline to select optimal parameters under all known scenarios (e.g., ISNRs, RFI statistics, etc.). In some aspects, adaptation engine 402 may utilize nonlinear methods, such as nonlinear least-squares (which, in some cases, may be less feasible for power-efficient implementation).

The multi-linear variants of LMS can also be used, such as when adapting multiple non-orthogonal parameter sets, one of the parameter sets can be adapted at a time while the other parameter sets remain fixed.

Exemplary adaptation schemes can be found in A. H. Jazwinski, "*Stochastic Processes and Filtering Theory*" (New York: Academic Press Inc., 1970), Boizot N. and Busvelle E., "*Adaptive-gain observers and applications.* Published in *Nonlinear Observers and Applications*" (Springer. Chapter 3), and as well as any other applicable schemes found in similar literature. Any of these adaptation schemes, as well other established adaptation schemes, may be incorporated into adaptation engine 402 as it adaptation scheme.

Generally speaking, adaptation engine 402 may customize the adaptation scheme used in stage 510 to the specific characteristics of the selected parametric model (indicated by model detector 302 in the model selection signal). For example, adaptation engine 402 may consider the type and number of the model parameters ϕ of the selected parametric model, such as how each parameter affects the model dynamics. Adaptation engine 402 may also use any one or more of predicted state estimates ($\hat{X}_{k|k-1}$, and/or past values of $\hat{X}_{k|k-1}$), updated state estimates ($\hat{X}_{k|k}$, and/or past values of $\hat{X}_{k|k}$), measurement residuals ($\tilde{y}_k$, and/or past values of $\tilde{y}_k$), predicted error covariances ($P_{k|k-1}$, and/or past values of $P_{k|k-1}$), and updated error covariances ($P_{k|k}$, and/or past values of $P_{k|k}$). Adaptation engine 402 may also evaluate r[k] and i[k] in adapting the model and algorithm parameters ϕ and α.

In some aspects, the adaptation scheme used by adaptation engine 402 may be based on the measurement residuals ($\tilde{y}_k$), i.e., the difference between the actual measurements and the predicted state estimates calculated by parametric nonlinear filter 410 in the correction stage. Adaptation engine 402 may tap these measurement residuals from parametric nonlinear filter 410 and observe one or more statistical properties of them as an optimality criterion (in other words, to quantitatively evaluate performance of parametric nonlinear filter 410) as part of stage 510. For example, the adaptation scheme of "*Stochastic Processes and Filtering Theory*" uses a tuning parameter $\hat{D}$ for a linear system model, which analyzes the difference between the expected theoretical and experimental values for the scalar measurement residuals. This adaptation scheme can be incorporated into adaptation engine 402. This tuning parameter $\hat{D}$, however, can have a drawback in that it is very sensitive to the measurement residual samples. One solution can be for adaptation engine 402 to smooth $\hat{D}$ (e.g., averaged over N past samples). However, this could be costly and computationally restrictive as considerable amounts of stored data may be needed to get a significant estimation. In some aspects, adaptation engine 402 can address this by using an autoregressive approach to estimate the statistics involved (e.g., including the sample mean)

In some aspects, adaptation engine 402 may be configured to use a heuristic adaptation scheme. For example, adaptation engine 402 may be configured to scale $\hat{D}$ by a gain. Adaptation engine 402 may determine the gain using a) a function of the experimental two-dimensional auto-covariance (i.e., relating two distinct sampling times) of the measurement residuals (compared to "*Stochastic Processes and Filtering Theory*," which is only based on the experimental covariance), and b) the sigmoidal response described in "*Adaptive-gain observers and applications*. Published in *Nonlinear Observers and Applications.*"

In some aspects, adaptation engine 402 may calculate the statistics involved in the adaptation scheme using autoregressive methods, which can reduce computation cost.

Adaptation engine 402 may therefore continue to adapt model parameters $\phi$ and algorithm parameters $\alpha$ as parametric nonlinear filter 410 determines RFI estimates $\hat{i}[k]$ over a sequence of time steps k and subtractor 312 produces cleaned received signal r'[k]. RFI mitigator 206 may provide r'[k] to baseband processor 208. Baseband processor 208 may then process r'[k] to reduce the effects of n[k] and $\varepsilon[k]$ (e.g., with specific processing and error-correcting codes) and proceed to process the desired information signal s[k] according to the physical layer and protocol stack functions. While FIG. 2 shows RFI mitigator 206 as a separate component from baseband processor 208, this is only an example and in some aspects RFI mitigator 206 may be included as part of baseband processor 208.

Both thermal noise n(t) and desired information signal s(t) can in some realizations be characterized as white Gaussian processes (at least over the bandwidth of s(t)) while RFI i(t) may conversely be non-Gaussian process. The ability of RFI mitigator 206 to effectively mitigate i(t) may depend on this fact that i(t) is statistically independent of both n(t) and s(t), as this may enable RFI mitigator 206 to isolate i(t) from n(t) and s(t) for estimation and subsequent removal.

This statistical independence between i(t) on one hand and n(t) and s(t) on the other is generally preserved when front-end 204 is operating in its linear region of operation. This linear region of operation of front-end 204 is typically dependent on the quality of front-end 204, where high-performance front-ends have larger linear regions of operation than lower-performance front-ends. However, regardless of quality, there may generally be some input signal power levels that will cause a front-end to enter a nonlinear region of operation. For example, there may be a sudden spike of power in interference (e.g., caused by an individual component $i_m(t)$ of i(t) or some combined additive behavior of multiple components $i_m(t)$) that, when it passes through front-end 204, causes front-end 204 to behave in a nonlinear manner. In addition to heavily disrupting the desired information signal s(t), and potentially making it lose its orthogonality, this nonlinear operation of front-end 204 can create spectrum regrowth and generate cross-terms in the received signal that transform the RFI into multiplicative and statistically-dependent interference. These cross-terms (products of s(t), n(t), and i(t)) may appear as "new" terms, where s[k], n[k], and i[k] will still be part of the received signal r[k] but will be joined by the new cross-terms that depend on multiple of i[k], s[k], and n[k]. The resulting statistical dependence of these cross-terms can severely impact the estimation accuracy of $\hat{i}[k]$ by nonlinear filter 310/parametric nonlinear filter 410. Mitigation performance may suffer, which can cause additional problems downstream when baseband processor 208 attempts to process r'[k]. For example, a forward error corrector in baseband processor 208 may be tailored for correcting errors arising from white Gaussian noise (such as that of thermal noise n(t)). If a signal corrupted by non-WGN is input into the forward error corrector, its output may become irreversibly corrupted.

These interference spikes can, in most cases, be characterized as short-term effects that dissipate nearly instantaneously. Accordingly, in some aspects of this disclosure RFI mitigator 206 may be configured to use on/off clipping to improve mitigation performance even when front-end 204 is operating in a nonlinear region. In some aspects, RFI mitigator 206 may be configured with both on/off clipping and parametric adaptation, while in other aspects RFI mitigator may be configured with only one of on/off clipping or parametric adaptation. While the following description may refer to nonlinear filter 310 and models 308*a*-308*k*, this description therefore equivalently applies for parametric nonlinear filter 410 and parametric models 408*a*-408*k*.

Figure 6:
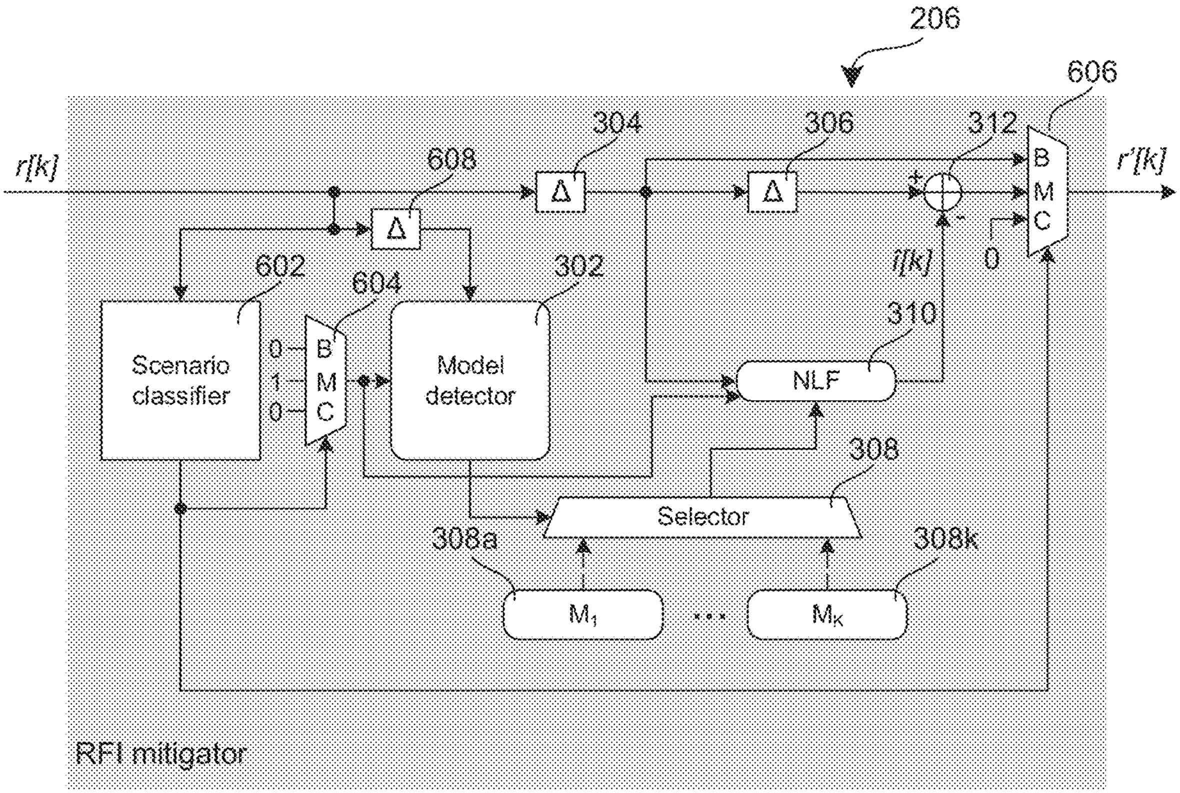
FIG. 6 shows an exemplary internal configuration of an RFI mitigator with model detection and on/off clipping according to some aspects.

FIG. 6 shows an exemplary internal configuration of RFI mitigator 206 according to some aspects. As shown in FIG. 6, RFI mitigator 206 may include model detector 302, delay unit 304, delay unit 306, selector 308, models 308*a*-308*k* (or, alternatively, parametric models 408*a*-408*k*), nonlinear filter 310 (or, alternatively, parametric nonlinear filter 410), and subtractor 312, which may be configured in the manner shown and described for FIG. 3 (or, alternatively, FIG. 4). RFI mitigator 206 may further include scenario classifier 602, selector 604, selector 606, and delay unit 608. In some aspects, selectors 604 and 606 may be software or hardware multiplexers configured to receive multiple inputs (e.g., three inputs in the example of FIG. 6) and a selection signal and to provide one of the inputs as its output according to the selection signal. In some aspects, scenario classifier 602 may be structurally realized as a processor configured to retrieve and execute program code that defines the analysis and classification of r[k] (as described herein) in the form of executable instructions. In other aspects, scenario classifier 602 may be structurally realized as dedicated hardware circuitry is configured to execute this analysis and classification of r[k] (as described herein) with digital logic circuitry. Delay unit 608 may compensate for the delay of scenario classifier 602, in particular to align the enable signal to model detector 302 with the input r[k] to model detector 302. Delay unit 304 may then compensate for the delay of both scenario classifier 602 and model detector 302.

There may generally be three RFI scenarios of RFI mitigator 206: no RFI, additive RFI, or multiplicative RFI. RFI mitigator 206 may experience a no RFI scenario when there is no RFI (e.g., no non-Gaussian behavior) detected in r[k], thus meaning that r(t) is purely Gaussian (either white or colored, i.e., s(t) and n(t)). RFI mitigator 206 may experience additive RFI if front-end 204 is operating in its linear region of operation and there is RFI (e.g., non-Gaussian, and generally having moderate power) detected in r(t) that is additively mixed with Gaussian components (e.g. s(t) and n(t)). Lastly, RFI mitigator 206 may experience multiplicative RFI if front-end 204 is operating outside of its linear region of operation and r(t) is a nonlinear mixture of non-Gaussian and Gaussian components, i.e. RFI power has spiked and front-end 204 is operating in a non-linear region. This multiplicative RFI is generally assumed to be short-term (in other words, to have a short duration).

Scenario classifier 602 may be configured to analyze r[k] to determine which of these possible operation scenarios corresponds to the current RFI scenario of RFI mitigator 206. As shown in FIG. 6, scenario classifier 602 may then provide a selection signal to selectors 604 and 606 that instructs selectors 604 and 606 to select a certain input as its output. Selector 604 may be configured to provide its output as an enable signal to model detector 302 and nonlinear filter 310, and accordingly may control whether model detector 302 and nonlinear filter 310 are enabled (e.g., when there is an additive RFI scenario) or disabled (e.g., when there is a no RFI or a multiplicative RFI scenario). Selector 606 may be configured to provide its output as the cleaned received signal r'[k], and may control whether uncleaned received signal r[k] (e.g., for no RFI), cleaned received signal r[k]-$\hat{i}$[k](e.g., for additive RFI), or a clipped, zero-valued signal (e.g., for multiplicative RFI) is provided as the output of RFI mitigator 206.

In some aspects (and not explicitly shown in FIG. 6), scenario classifier 602 may receive sideband status indications from front-end 204 to enhance the classification process, such as the current gain settings for the receiver, received signal strength indications, or status signals probing the receiver internals. Scenario classifier 602 may then use such information to classify the current RFI scenario.

Figure 7:
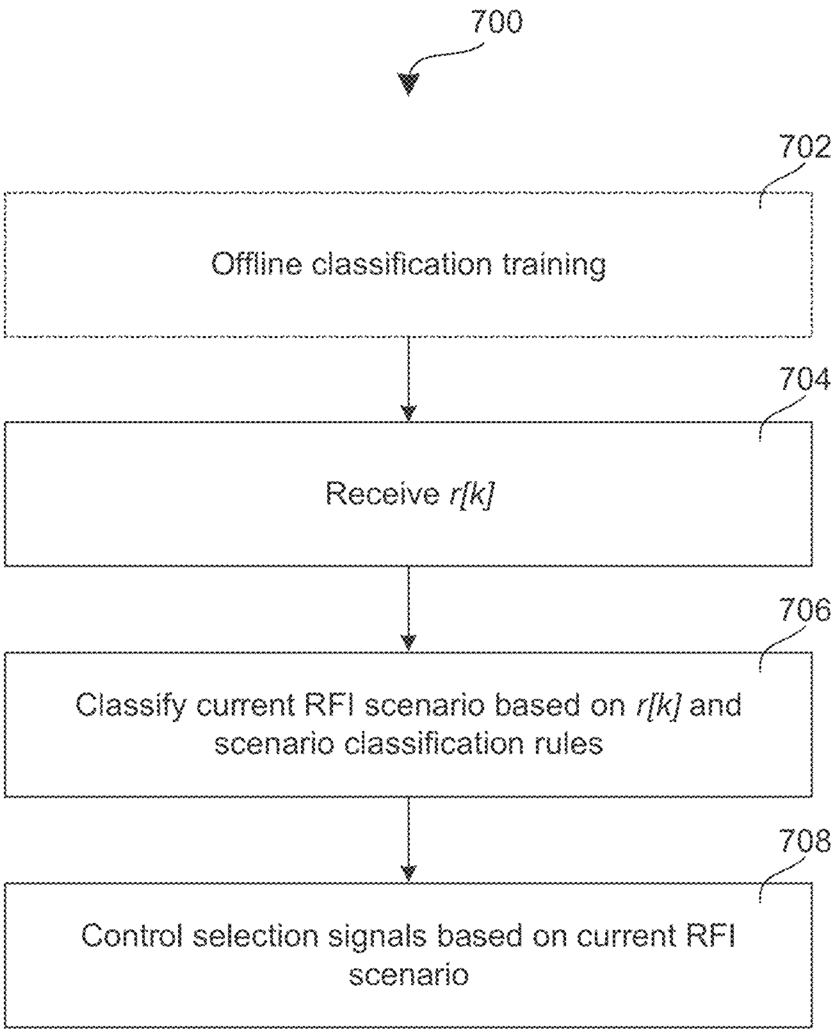
FIG. 7 shows an exemplary method of RFI mitigation with on/off clipping according to some aspects.

FIG. 7 shows method 700 illustrating an exemplary process for performing RFI mitigation according to some aspects. RFI mitigator 206 of FIG. 7 may perform method 700 to perform RFI mitigation with on/off clipping, in which RFI mitigator 206 may selectively choose to clip its output (e.g., provide samples having a value of "0") based on the current RFI scenario of RFI mitigator 206.

As shown in FIG. 7, RFI mitigator 206 may first undergo offline classification training in stage 702. In particular, a designer may utilize a test device (e.g., a prototype or a final product of communication device 200) to develop scenario classification rules for scenario classifier 602 to use during runtime to classify the current RFI scenario. As previously indicated, scenario classifier 602 may be configured to receive and evaluate r[k](optionally in addition to other sideband status signals from front-end 204) to classify the current RFI scenario as no RFI, additive RFI, or multiplicative RFI, and to subsequently provide a selection signal to selectors 604 and 606 based on the current RFI scenario.

Scenario classifier 602 may therefore be configured with algorithmic logic (e.g., in the form of executable instructions or digital logic circuitry) defining operations to mathematically evaluate r[k] to classify the current RFI scenario.

The designer may therefore implement the offline classification training in stage 702 to develop the scenario classification rules with which scenario classifier 602 can classify RFI scenarios. In some aspects, the offline classification training can be a heuristic approach. In one example, the offline classification training can be a data-aided training model such as a neural network or support vector machine (SVM). To enable supervised training of scenario classifier 602, the designer may use a large training data set that combines many distinct information signals s(t) with many distinct RFI signals i(t), optionally over a range of different ISNR conditions. Accordingly, the designer can generate a set of test signals including a wide range of information signals s(t) and RFI signals i(t) offline (optionally over a range of ISNR conditions), and can then input these test signals into the test device and observe the resulting received signal r(t) as measurements. The designer will then manually determine which RFI scenario is caused by each test signal, e.g., whether there is no RFI in r(t) (e.g., i(t) is negligible), whether the test signal causes front-end 204 to behave nonlinearly, or whether front-end 204 remains in its linear region of operation when receiving the test signal. The designer may therefore assign an RFI scenario to each test signal, and can save the resulting measurements corresponding to each test signal as offline test data for the classifier. The designer can then use the offline test data to train a neural network, SVM, or other type of data-aided trained model (e.g., with a computerized model training program). Once the designer has obtained the data-aided trained model, the designer can load the data-aided training model into scenario classifier 602 as its scenario classification rules. The data-aided training model may generally use the offline test data and the corresponding manually-entered RFI scenario to classify subsequent received signals r(t) as fitting one of the three RFI scenarios. Scenario classifier 602 may therefore use the data-aided training model to determine mathematical similarities between received signals r(t) (in the form of r[k]) and the offline test data and to subsequently classify the current RFI scenario.

In some aspects, scenario classifier 602 may be configured to use higher-order statistics as the scenario classification rules. For example, the designer may input a set of test signals into the test device and perform a statistical analysis (e.g., with a computerized statistical analysis program) to derive statistical features of input signals that are consistent with no RFI, additive RFI, and multiplicative RFI. Scenario classifier 602 may then be configured with scenario classification rules by which scenario classifier 602 performs a statistical analysis on r[k] to determine its statistical features, compare the statistical features to the statistical features from the offline classification that are consistent with each RFI scenario, and decide which RFI scenario presents the best fit with the statistical features of r[k].

In some aspects, scenario classifier 602 may be configured to use diversity metrics as the scenario classification rules. This can be described as a statistical diversity-majority approach. For its operation, a set of independent diversity metrics can be established by a designer, who can then measure their values for each of the RFI scenarios (no RFI, additive RFI, and multiplicative RFI) offline (e.g., with a test device). The designer can take and record multiple measurements per RFI scenario (e.g., with varying ISNRs, varying RFI statistics, etc.). Using these measurements for all RFI scenarios, the designer can define (e.g., with a computerized analysis program) scenario classification rules on a per-metric basis based on the values of its corresponding diversity metric. In some aspects, the scenario classification rules can include a tolerance margin for robustness (e.g., like a hysteresis margin).

These diversity metrics can be based on any combination of statistical measures, such as power spectral density, PDF, ACF, etc. For example, in some aspects the normalized ACF can be used as the diversity metric by taking N features corresponding to the correlation intervals with N predefined correlation coefficient values (e.g., $\rho_1$=0.95, $\rho_2$=0.85, . . . , $\rho_N$=0.3). Depending on the nature of the involved signals, the combination of statistical measures and/or the number of diversity metrics can be adapted accordingly.

In other aspects, the scenario classification rules can be derived based on pre-characterized information of front-end 204. For example, by testing the response of front-end 204 of a range of input signal powers in stage 702, a designer can determine the response of front-end 204 and thus identify the power level region where front-end 204 transitions from linear to nonlinear behavior. Front-end 204 may also be instrumented with at least one probe (e.g., at least a power detector or envelope detector, with its own A/D conversion, that taps the input of the first active device in the receive chain of front-end 204, e.g. the LNA). The probe can be tuned to have linear operation in at least the power-level region where the operation of front-end 204 transitions between linear and nonlinear. As front-end 204 is pre-characterized, the power levels that will imply nonlinear operation are known in advance. A signal power threshold can then be used as a scenario classification rule of scenario classifier 602, where signal power levels s of r[k] (as measured by the probe in front-end 204) above the signal power threshold can trigger a classification of nonlinear operation and signal powers below the signal power threshold can trigger a classification of linear operation.

In these cases, scenario classifier 602 may also be configured with a scenario classification rule to differentiate between RFI and no-RFI scenarios. For example, as previously indicated, information signals (e.g., OFDM/OFDMA/SC-FDMA) can, in some cases, be characterized as Gaussian signals (at least within their bandwidth), while RFI can be assumed to be non-Gaussian. Accordingly, scenario classifier 602 can be configured to perform a Gaussianity test that statistically evaluates r(t) to quantify the level of Gaussian characteristics that it exhibits. A designer can therefore determine a Gaussianity metric in stage 702 corresponding to the Gaussianity test. Scenario classifier 602 may then be configured to use the Gaussianity metric as a scenario classification rule. Scenario classifier 602 may therefore be configured to perform the Gaussianity test on r[k] and compare the test result to the Gaussianity metric. If the test result is in agreement with the configured Gaussianity metric (e.g., within a predefined threshold), scenario classifier 602 may conclude that r[k] is primarily Gaussian and thus does not include RFI, i.e., a no RFI scenario. If the test result is not in agreement with the Gaussianity metric (e.g., outside of a predefined threshold), scenario classifier 602 may conclude that r[k] is primarily non-Gaussian and thus includes RFI, i.e., an additive or multiplicative RFI operation scenario.

This offline classification training in stage 702 may therefore be used to develop scenario classification rules that scenario classifier 602 can use during runtime to classify the current RFI scenario as no RFI, additive RFI, or multiplicative RFI. Once the designer has determined the scenario classification rules (e.g., a data-aided trained model, set of signal power and Gaussianity metric, or other scenario classification rule), the scenario classification rules can be loaded into scenario classifier 602 (e.g., as executable instructions or digital logic circuitry). Scenario classifier 602 may thus be configured to perform scenario classification as part of on/off clipping.

RFI mitigator 206 may then be put into operation as part of communication device 200, and accordingly may be configured to process received signal r[k] to obtain cleaned receive signal r'[k] to provide to baseband processor 208. With continued reference to FIG. 7, scenario classifier 602 may be configured to receive r[k] in stage 704. Scenario classifier 602 may then classify the current RFI scenario based on r[k] and the scenario classification rules (e.g., as determined in the offline classification training in stage 702) in stage 706. In aspects where scenario classifier 602 is using a pre-characterized front-end approach, scenario classifier 602 may also receive instrumentation data (from the probe of front-end 204) for use in classification (not explicitly shown in FIG. 7).

In some aspects where the scenario classification rules are based on diversity metrics, scenario classifier 602 may analyze received signal r[k] in stage 704 and calculate the diversity metrics (those relevant to the scenario classification rules) in stage 706. Scenario classifier 602 may then, for each decision metric, evaluate the actual measured value of the diversity metric against its corresponding runtime classification rule. Scenario classifier 602 may then classify the current RFI scenario in stage 706 based on what the majority of the diversity metrics indicate. For example, not all diversity metrics may agree on the RFI scenario, and scenario classifier 602 may then render the final RFI scenario decision based on a majority rule (e.g., which RFI scenario the majority of the diversity metrics align with).

In some aspects where the scenario classification rules are a data-aided trained model (e.g., a neural network, SVM, or other similar model), scenario classifier 602 may feed r[k] (e.g., a single sample or a window of samples) into the data-aided trained model, which may be implemented in scenario classifier 602 as, for example, executable instructions or digital logic circuitry. The data-aided trained model may then classify r[k] based on its training (derived offline in stage 702) as a no RFI scenario, an additive RFI scenario, or a multiplicative RFI scenario in stage 706. In another example, if the scenario classification rules are based on higher-order statistics, scenario classifier 602 may perform a statistical analysis (e.g., implemented in scenario classifier as executable instructions or digital logic circuitry) on r[k] to determine its statistical features. Scenario classifier 602 may then compare the statistical features of r[k] to the statistical features defined in the scenario classification rules that correspond to each RFI scenario, and determine which RFI scenario provides the best fit with the statistical features of r[k].

In some aspects where scenario classifier 602 is using a signal power threshold as a scenario classification rule, scenario classifier 602 may be configured to tap the input of the first active device in front-end 204 (e.g., in place of r(t)), which can be, for example, a low noise amplifier of front-end 204. As previously described, front-end 204 may include a probe that is a power or envelope detector, and scenario classifier 602 may receive the measured signal levels of this probe. If the signal power level is greater than the signal power threshold, scenario classifier 602 may classify the current RFI scenario as multiplicative RFI. If the signal power level is less than the signal power threshold, scenario classifier 602 may proceed to perform a Gaussianity test (as previously described above) on r[k] to determine whether r[k] is Gaussian or non-Gaussian. In an exemplary Gaussianity test, scenario classifier 602 may be configured to calculate the $3^{rd}$ and/or $4^{th}$ order cumulants (the test results) online in stage 706, and then compare the cumulant results to the Gaussianity metric (which represents the runtime classification rule). The Gaussianity metric can be, for example, the 0-value, where scenario classifier 602 can compare the $3^{rd}$ and/or $4^{th}$ order cumulants (the test results) to zero and determine whether the magnitude of the difference is greater than or equal to a predefined threshold. If the magnitude of the difference is below the threshold (i.e., the test result is within the threshold of the Gaussianity metric), scenario classifier 602 may determine that r[k] is Gaussian, while if the magnitude of the difference is above the threshold (i.e., the test result is outside of the threshold from the Gaussianity metric), scenario classifier 602 may determine that r[k] is non-Gaussian. This comes from the theoretical fact that a Gaussian signal should have 0-valued higher order cumulants ($3^{rd}$ order and above), and thus that a cumulant value far enough from 0 (e.g., sufficiently positive or negative; considering numerical errors) can constitute basic proof of non-Gaussianity. Other Gaussianity tests can likewise be used by scenario classifier. If scenario classifier 602 determines r[k] to be Gaussian, scenario classifier 602 may classify the current RFI scenario as no RFI. If scenario classifier 602 determines r[k] to be non-Gaussian, scenario classifier 602 may classify the current RFI scenario as additive RFI.

This scenario classification rule can be expressed as:

1. If the measured signal power level is above the signal power threshold (for nonlinearity): classify the current RFI scenario as multiplicative RFI
2. If the measured signal power level is below the signal power threshold (for nonlinearity):
   a. If r[k] is non-Gaussian (based on Gaussianity test): classify as additive RFI
   b. If r[k] is Gaussian (based on Gaussianity test): classify as no RFI Scenario classifier 602 may utilize any one or more of these classification approaches and scenario classification rules (e.g., statistical diversity with higher-order cumulants, data-aided training model, or pre-characterized-front end) in stage 706. In some aspects, the pre-characterized front-end approach (using added instrumentation in the probe of front-end 204) may be to enhance the performance of another classification approach (e.g., to improve the classification accuracy of data-aided training models and/or statistical diversity with higher-order cumulants).

After classifying the current RFI scenario, scenario classifier 602 may then control the selection signals to selectors 604 and 606 based on the current RFI scenario. For example, if scenario classifier 602 classifies the current RFI scenario as a no RFI scenario, scenario classifier 602 may select a bypass operation mode ("B" in FIG. 6) for RFI mitigator 206 and provide a bypass selection signal to selectors 604 and 606 in stage 708. As shown in FIG. 6, selector 604 may therefore select "0" (i.e., low) as the enable signal for model detector 302 and nonlinear filter 310, which will disable model detector 302 and nonlinear filter 310. Selector 606 may therefore select r'[k]=r[k], or in other words, may select the uncleaned received signal r[k] as the output of RFI mitigator 206.

Accordingly, when scenario classifier 602 determines that there is no RFI, RFI mitigator 206 may 'bypass' model detector 302 and nonlinear filter 310 and refrain from performing mitigation on r[k]. As there is no (or only negligible) RFI to mitigate, performance may not be impacted. Power consumption can also be reduced as model detector 302 and nonlinear filter 310 are disabled.

If scenario classifier 602 classifies the current RFI scenario as additive RFI, scenario classifier 602 may select a mitigate operation mode ("M" in FIG. 6) and provide a mitigate selection signal to selectors 604 and 606 in stage 708. As shown in FIG. 6, selector 604 may provide a "1" (or high) enable signal to model detector 302 and nonlinear filter 310, which will enable model detector 302 and nonlinear filter 310. Model detector 302 and nonlinear filter 310 may therefore perform RFI mitigation as shown and described above. Selector 606 may also select input "M" as its output, which is the cleaned signal $r[k]-\hat{i}[k]$ produced by nonlinear filter 310 and subtractor 312.

Accordingly, when there is additive RFI, scenario classifier 602 may control RFI mitigator 206 to perform its RFI mitigation. As front-end 204 is operating in its linear region, it can be assumed that i(t) is statistically independent from s(t) and n(t), and thus that RFI mitigation can be performed without introducing errors related to cross-terms.

If scenario classifier 602 classifies the current RFI scenario as multiplicative RFI, scenario classifier 602 may select a clip operation mode ("C" in FIG. 6) and provide a clip selection signal to selectors 604 and 606 in stage 708. As shown in FIG. 6, selector 604 may provide a "0" (or low) enable signal to model detector 302 and nonlinear filter 310, which will disable model detector 302 and nonlinear filter 310. Selector 606 may select a clipped signal (e.g., a sample of "0") as the output of RFI mitigator 206.

Accordingly, when there is multiplicative RFI, model detector 302 and nonlinear filter 310 may be disabled and RFI mitigator 206 thus will not perform any RFI mitigation. As opposed to a bypass operation mode for no RFI (in which RFI mitigator 206 outputs uncleaned received signal r[k] as its output), RFI mitigator 206 may output a clipped signal of r'[k]=0 for multiplicative RFI. As previously described, the mitigation performance of RFI mitigator 206 depends on the statistical independence of i(t) from s(t) and n(t). However, nonlinear behavior of front-end 204 can generate multiplicative and statistically-dependent RFI that in most cases cannot be removed by an RFI mitigator. Moreover, attempting to perform RFI mitigation on signals having these cross-terms can in many cases yield even worse results when baseband processor 208 attempts to process the resulting signals.

Accordingly, RFI mitigator 206 can address these shortcomings by clipping the signal provided to baseband processor 208. Instead of receiving a signal with cross-terms and statistically-dependent RFI, baseband processor 208 may receive a clipped, zero-valued signal (in other words, where each sample is "0"). Even though some information in r'[k] will be clipped to 0, the nonlinearity can be assumed to very short term in nature (e.g., caused by an instantaneous spike in RFI). Accordingly, baseband processor 208 will still be able to recover some or all of the original baseband data by performing FEC on r'[k]. In other words, as the nonlinearities are brief, the error-correcting encoding of r[k] will still enable baseband processor 208 to recover lost data. As the FEC decoding components of baseband processor 208 are tuned for correction of Gaussian noise, and are not well-suited for error correction in the presence of multiplicative RFI, the FEC at baseband processor 208 may not function properly during periods when front-end 204 is operating nonlinearly. RFI mitigator 206 may therefore clip r'[k] during these periods and allow baseband processor 208 to recover any lost data with FEC. De-interleavers, rate-dematchers and channel decoders are example of FEC components in the baseband processor 208 than can help recover the information of the short-term clipped intervals of r'[k].

Accordingly, incorporation of scenario classifier 602 in RFI mitigator 206 may in some cases provide additional resilience against interference. As described herein, RFI mitigator 206 may be able to respond to nonlinear behavior by front-end 204 by clipping the baseband signal provided to baseband processor 208, thus avoiding potential downstream decoding errors caused by attempting to decode signals corrupted by RFI cross-terms. This on/off clipping may have little or practically no latency and may also avoid propagating the blocking of the electronic circuitry to baseband processor 208.

In some aspects, scenario classifier 602 may also tap an automatic gain control (AGC) component of front-end 204, and may use this information as part of the scenario classification rules used to classify the current RFI scenario in stage 706. For example, depending on the number of power or envelope detectors in front-end 204, in addition to their probing locations within front-end 204, AGC data may be able to assist scenario classifier 602 in evaluating the current signal power levels. For instance, if the signal power level at the input signal r(t) is not high (e.g., where the LNA is operating in a linear region), but other components in the receive chain of front-end 204 are configured to amplify the received signal (e.g., these are gain stages, with a specific gain configuration at this current time), the signal may become amplified so much as to drive some other component into a nonlinear region (e.g., the ADC). Accordingly, scenario classifier 602 may use this AGC data (which gives the gain configurations for all gain stages in front-end 204), in conjunction with the signal power level of r(t), to predict if any internal stages of front-end 204 are driven into nonlinear operation.

In some aspects, scenario classifier 602 may repeatedly perform the process of stages 704-708, and thus may continuously receive and evaluate r[k] over a sequence of time steps k to classify the current RFI scenario. Scenario classifier 602 may therefore be configured to change its classification of the current RFI scenario over time as r[k] changes. Stochastic and chaotic nonlinear filtering techniques such as those described above for nonlinear filter 310 and parametric nonlinear filter 410 are generally solid solution candidates for filtering in RFI mitigation. Nonlinear filters for this purpose have been generally designed to operate with high and strictly positive ISNRs (assuming strictly white Gaussian noise) with an acceptable degradation up to a breaking point (i.e. a lower ISNR or SNR where the experienced performance degradation is no longer tolerable and the filtered signal may be more corrupted than the original signal).

One constraint that can contribute to these breaking points is that many model-based sub-optimal nonlinear filters are single-moment, or instantaneous, algorithms. In other words, these nonlinear filters process information corresponding to a single sampling time (one moment) of the received signal at each estimation cycle (time step k). Various nonlinear filters, such as EKFs, UKFs, GHFs, and QKFs, operate on this single-moment basis. These single-moment filters assume that the posterior estimate of the immediately previous cycle was optimal, and thus that the next estimate can be obtained using only the previous cycle's posterior estimate and the measurement at the current moment in time. However, there are only a very limited number of problems that have closed-form solutions, and thus only a very limited number of problems which can calculate optimal posterior estimates. Accordingly, for the generic case, there is no optimal nonlinear filtering algorithm, and therefore the use of only a single moment can result in performance degradation. This may particularly be true for mitigation of colored Gaussian noise with unknown (and potentially time varying) coloring, which may be especially problematic for single-moment nonlinear filters to estimate.

In some aspects of this disclosure, RFI mitigator 206 may be configured to use multi-moment nonlinear filtering to obtain the RFI estimate $\hat{i}[k]$. In particular, as opposed to using only a single moment in time for each estimation cycle, RFI mitigator 206 may use multiple moments of time. In some aspects, RFI mitigator 206 may also use a complexity reduction heuristic that renormalizes the nonlinear filter's predicted error covariance while still producing a statistically equivalent result to simultaneously processing multiple moments in time. In some aspects, RFI mitigator 206 may also use chaotic filter models (as opposed to stochastic) as quasideterministic Markov models of non-Gaussian processes, which can minimize the filtering error variance. While the following description refers to these multi-moment nonlinear filtering techniques in an RFI mitigation context, these approaches can be used for filter-based estimation of any non-Gaussian process.

In general, the aspects of multi-moment nonlinear filtering described herein can provide a robust non-Gaussian weak-signal estimation technique. This multi-moment nonlinear filtering is more general than many existing techniques, as it can estimate signals having a random structure as opposed to existing techniques that can only detect signals with known structures. Moreover, this multi-moment nonlinear filtering is more robust and can endure both white and colored (with unknown coloring) Gaussian noise where existing solutions can only withstand white Gaussian noise or colored Gaussian noise with known coloring. This multi-moment nonlinear filtering can also be adaptive, such as by implementing it in concert with an adaptation engine such as adaptation engine 402 of FIG. 4.

Additionally, these approaches of multi-moment nonlinear filtering are feasible for implementation in real-time low-power DSP, while many existing solutions require higher computing power and/or sophisticated analog components. It is also reusable for multiple applications, and can be used to extend the capabilities of model-based nonlinear filtering algorithms to extend strong filtering accuracy to SNR regions below the breaking point of a corresponding single-moment filter and/or to extend robustness to colored Gaussian noise of unknown coloring.

Furthermore, this multi-moment nonlinear filtering can be implemented as an extension of many single-moment model-based filtering algorithms, and therefore can be readily incorporated on top of various filters such as EKFs, UKFs, GHFs, QKFs, etc. This can improve robustness to negative SNR ranges and colored Gaussian noise of unknown coloring.

Figure 8:
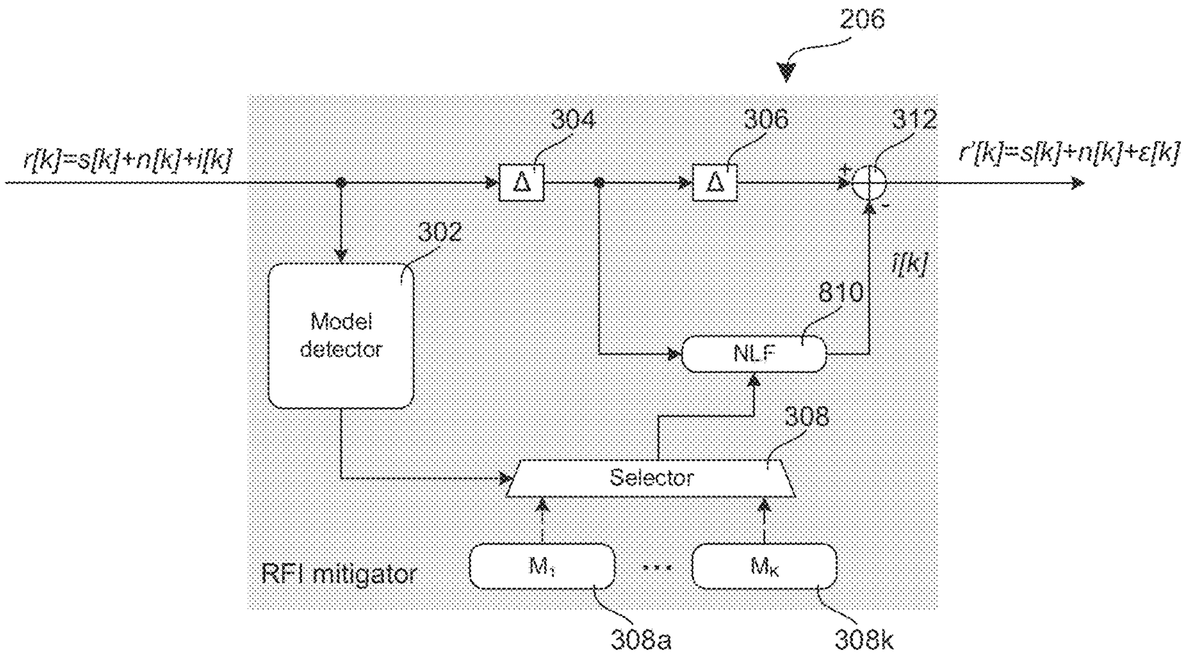
FIG. 8 shows an exemplary internal configuration of an RFI mitigator with multi-moment nonlinear filtering according to some aspects.

FIG. 8 shows an exemplary internal configuration of RFI mitigator 206 configured for multi-moment nonlinear filtering according to some aspects. As shown in FIG. 8, RFI mitigator 206 may include model detector 302, delay units 304 and 306, selector 308, models 308*a*-308*k* (or, alternatively, parametric models 408*a*-408*k*), and subtractor 312. RFI mitigator 206 may further include multi-moment nonlinear filter 810. In some aspects, RFI mitigator 206 may be configured for parametric adaptation, and may include parametric models 408*a*-408*k* and adaptation engine 402 while multi-moment nonlinear filter 810 may be a parametric multi-moment nonlinear filter. In some aspects, RFI mitigator 206 may additionally or alternatively be configured for on/off clipping, and may include scenario classifier 602 and selectors 606 and 608.

Multi-moment nonlinear filter 810 of RFI mitigator 206 may therefore be configured to perform multi-moment nonlinear filtering on r[k] to produce RFI estimate i[k]. Model detector 302 may function in the manner shown and described above, and may thus evaluate r[k] and select one of models 308*a*-308*k* for multi-moment nonlinear filter 810 to use to determine i[k].

Figure 9:
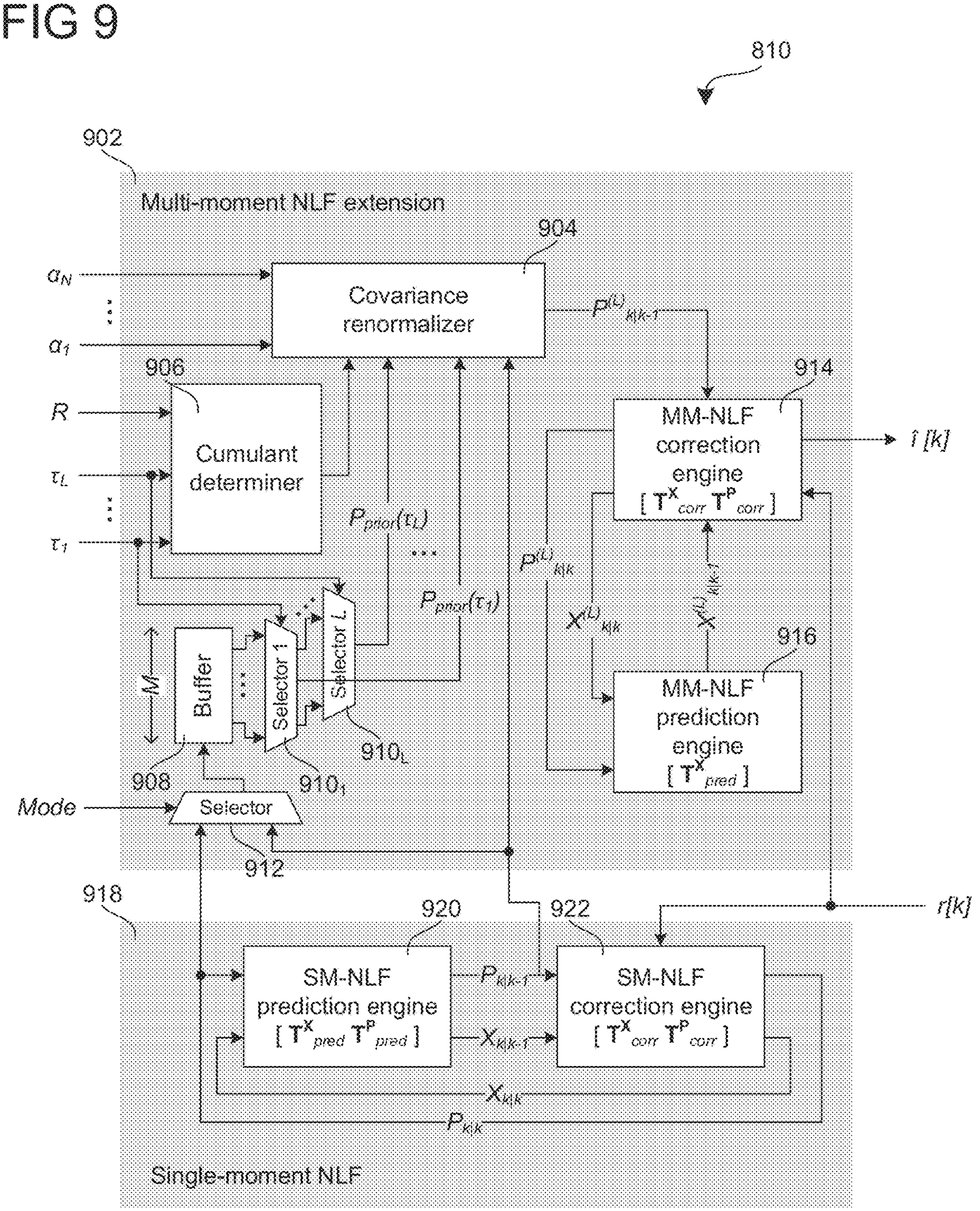
FIG. 9 shows an exemplary internal configuration of a multi-moment nonlinear filter according to some aspects.

FIG. 9 shows an exemplary internal configuration of multi-moment nonlinear filter 810 according to some aspects. As shown in FIG. 9, multi-moment nonlinear filter 810 may include multi-moment nonlinear filter extension 902 and single-moment nonlinear filter 918. In some aspects, multi-moment nonlinear filter extension 902 and single-moment nonlinear filter 918 may be structurally realized as software, such as one or more processors configured to retrieve (from a memory) and execute program code that defines their functionality (as shown and described herein) in the form of executable instructions. For example, the one or more processors can retrieve and execute a single-moment nonlinear filter instruction set that defines the single-moment nonlinear filtering algorithm as executable instructions and can retrieve and execute a multi-moment nonlinear filter instruction set that defines the multi-moment nonlinear filtering extension algorithm as executable instructions. In some aspects, multi-moment nonlinear filter extension 902 and single-moment nonlinear filter 918 can be structurally realized as hardware, such as digital logic circuitry that defines the multi-moment nonlinear filtering algorithm and the single-moment nonlinear filtering algorithm as digital logic. The digital logic circuitry can include separate sections dedicated to the multi-moment nonlinear filtering extension algorithm and the single-moment nonlinear filtering algorithm. In some aspects, multi-moment nonlinear filter extension 902 and single-moment nonlinear filter 918 can be structurally realized as a combination of hardware and software, such as an integrated circuit including one or more processors that interface with digital logic circuitry that is configured to execute the functionality of multi-moment nonlinear filter extension 902 and single-moment nonlinear filter 918 (as described herein) with a combination of hardware logic and software instructions. In one example, multi-moment nonlinear filter extension 902 and single-moment nonlinear filter 918 can be implemented as Application specific instruction processors (ASIP) with instruction set extensions tuned to accelerate the multi-moment nonlinear filtering algorithm operations.

Similar to as described above, multi-moment nonlinear filter extension 902 and single-moment nonlinear filter 918 may both execute a prediction stage (to determine a model-only predicted state estimate and predicted error covariance) and a correction stage (to determine an updated state estimate and updated error covariance). However, instead of determining an RFI estimate i[k] (as in the case of nonlinear filter 310 and parametric nonlinear filter 410), single-moment nonlinear filter 918 may provide an error covariance (either predicted or updated) to multi-moment nonlinear filter extension 902 at each time step k. Multi-moment nonlinear filter extension 902 may store these single-moment error covariances in a buffer and, at each time step k, select a subset of the buffered single-moment error covariances to use for determining a multi-moment predicted error covariance. As described below in connection with FIG. 10, this includes a cumulant determination and covariance renormalization procedure in which multi-moment nonlinear filter extension 902 uses the selected single-moment error covariances to determine the multi-moment predicted error covariance. Multi-moment nonlinear filter extension 902 may also execute a multi-moment prediction stage using the multi-moment updated state estimate and multi-moment updated error covariance from the previous time step (k−1) to obtain a multi-moment predicted state estimate. Multi-moment nonlinear filter extension 902 may then use the multi-moment predicted error covariance and the multi-moment predicted state estimate to obtain a multi-moment updated state estimate and multi-moment updated error covariance for the current time step k. Multi-moment nonlinear filter extension 902 may then determine an RFI estimate sample i[k] for the current time step k based on the multi-moment updated state estimate. Single-moment nonlinear filter 918 may then repeat its prediction and correction stage for the next time step (k+1) to produce a new error covariance for storage in buffer while multi-moment nonlinear filter extension 902 may repeat the moment selection, cumulant determination, covariance renormalization, and prediction and correction stages.

Figure 10:
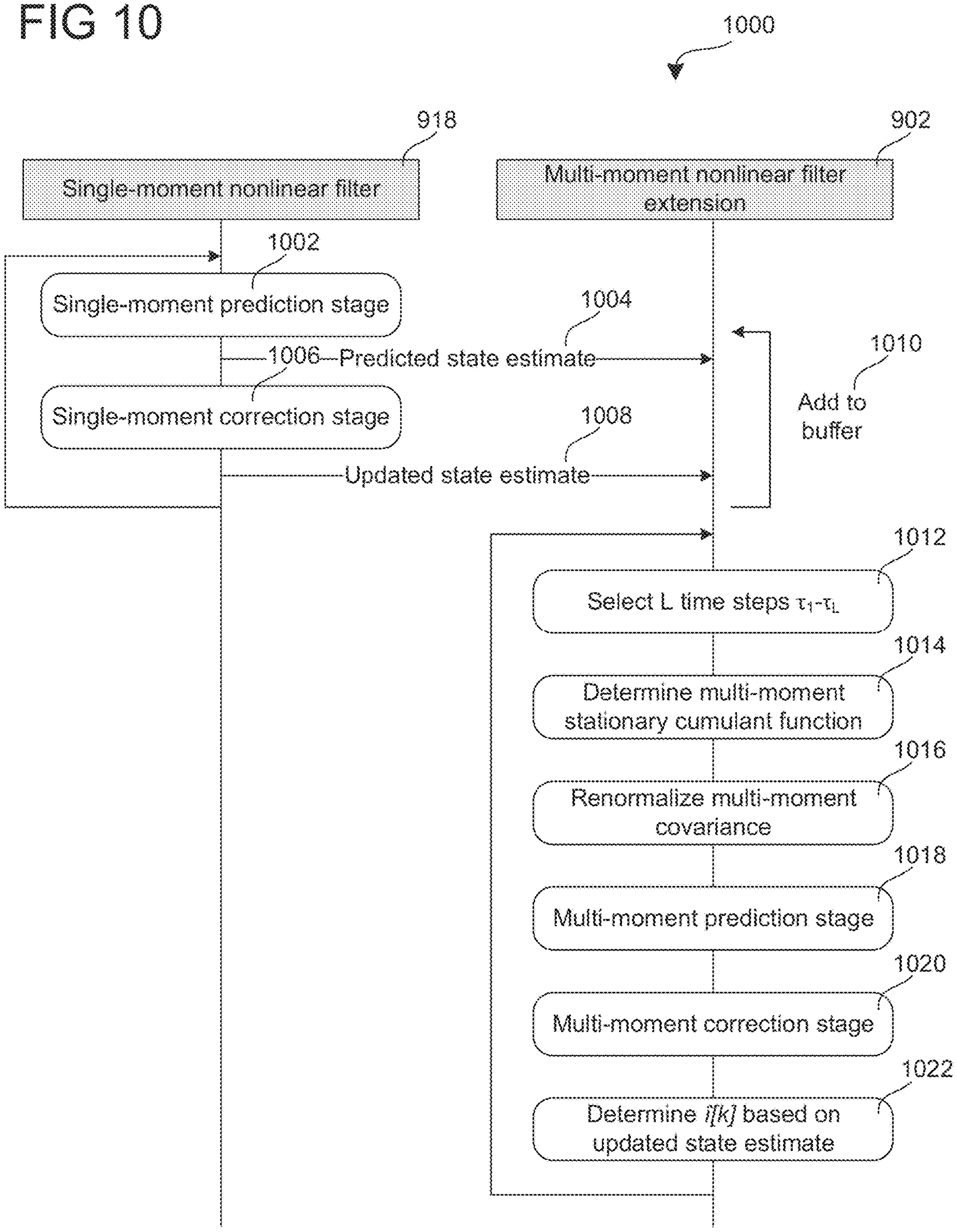
FIG. 10 shows an exemplary method of performing multi-moment nonlinear filtering according to some aspects.

FIG. 10 shows process 1000 illustrating a multi-moment nonlinear filtering procedure according to some aspects. As shown in FIG. 10, multi-moment nonlinear filter extension 902 and single-moment nonlinear filter 918 may perform process 1000. Accordingly, single-moment nonlinear filter 918 may perform a single-moment prediction stage in stage 1002 and a single-moment correction stage in stage 1002. Single-moment nonlinear filter 918 may use Markov model-based nonlinear filtering in the single-moment prediction and correction stages, where a process evolution model provides a model for the prediction stage and a process measurable output model provides a model for the correction stage. In some aspects, single-moment nonlinear filter 918 can use the Fokker-Plank-Kolmorogov (FPK) forward operator for the process evolution model, where the FPK forward operator rules how the PDF for the stochastic process state X[k] (the state vector X at time step k) evolves from X[k] to X[k+1] in the discrete case and from X(t) to X(t+τ) (for a real positive τ) in the continuous case. The FPK forward operator is defined by the evolution operator F(X, k), which gives the deterministic portion of the FPK forward operator, and the process noise covariance Q(k), which gives the stochastic portion of the FPK.

Single-moment nonlinear filter 918 may define the process measurable output model (for the correction stage) with the output operator H(X, k), which gives the deterministic portion of the output, and the measurement noise covariance R(k), which gives the stochastic portion of the output. This process measurable output model determines what can be observed when performing measurements of the process r[k], and how these measurements correspond to the current state X[k].

Single-moment nonlinear filter 918 may execute the single-moment prediction stage in stage 1002 and the single-moment correction stage in stage 1006 using this process evolution model and process measurable output model. In particular, single-moment nonlinear filter 918 may use F(X, k) and Q(k) to evolve (or predict) the PDF of the stochastic process state X[k], and thus to obtain a predicted state estimate $X_{k|k-1}$ and a predicted error covariance $P_{k|k-1}$. For example, single-moment nonlinear filter 918 may be configured to execute a state prediction operator $$T^{X}_{pred}[X, P; F, Q, k]$$

and an error covariance prediction operator $$T^{P}_{pred}[X, P; F, Q, k]$$

that calculate the predicted state estimate $X_{k|k-1}$ and the predicted error covariance $P_{k|k-1}$ as a function of X, P, F, Q, and k. This procedure may be similar to that described above for parametric nonlinear filter 410 regarding extended Kalman filtering. Single-moment nonlinear filter 918 may therefore execute the state prediction operator $$T^X_{pred}$$

and the error covariance prediction operator $$T^P_{pred}$$

only using the model (i.e., without using a measurement from the current time step), and thus only using the current updated values of X and P as calculated in the prior time step (k−1). As shown in FIG. 9, single-moment nonlinear filter prediction engine 920 may be configured to execute the state prediction operator $$T^X_{pred}$$

and the error covariance prediction operator $$T^P_{pred}$$

in stage 1002 to obtain $X_{k|k-1}$ and $P_{k|k-1}$. Single-moment nonlinear filter prediction engine 920 may be configured as software (e.g., an instruction set configured for execution by a processor that defines execution of $$T^X_{pred}$$

and $$T^P_{pred}$$

as executable instructions) or hardware (e.g., digital logic circuitry that is coded with hardware logic defining execution of $$T^X_{pred}$$

and $$T^P_{pred}).$$

).

Single-moment nonlinear filter 918 may also execute the correction stage in stage 1006 to obtain an updated state estimate $X_{k|k}$ and an updated error covariance $P_{k|k}$. Similar to that described above for parametric nonlinear filter 410, single-moment nonlinear filter 918 may use the prediction stage outputs $X_{k|k-1}$ and $P_{k|k-1}$, the output operator H(X, k), the measurement noise covariance R(k) to predict the output (e.g., by applying H to the predicted state estimate $X_{k|k-1}$), compare the predicted output to an actual measurement r[k](e.g., to obtain a measurement residual $\tilde{y}_k$ based on the difference), and, based on the output prediction error (e.g., the measurement residual), correct the predicted state estimate $X_{k|k-1}$ (e.g., by calculating a gain and adding the measurement residual weighted by the gain to the predicted state estimate). Single-moment nonlinear filter 918 may also correct the predicted error covariance (e.g., based on the gain used to correct the predicted state estimate) to obtain an updated error covariance.

Single-moment nonlinear filter 918 may therefore execute a state correction operator $$T^X_{corr}[X, P, r; H, R, k]$$

and an error covariance correction operator $$T^P_{corr}[X, P, r; H, R, k]$$

in stage 1006, where the state correction operator $$T^X_{corr}$$

and the error covariance correction operator $$T^P_{corr}$$

define the calculation of the updated state estimate $X_{k|k}$ and the updated error covariance $P_{k|k}$ from X, P, r, H, R, and k. As shown in FIG. 9, single-moment nonlinear filter correction engine 922 may be configured to execute the state correction operator $$T^X_{corr}$$

and the error covariance correction operator $$T^P_{corr}$$

in stage 1006 to obtain $X_{k|k}$ and $P_{k|k}$. Single-moment nonlinear filter prediction engine 922 may be configured as software (e.g., an instruction set configured for execution by a processor that defines execution of $$T^X_{corr}$$

and $$T^P_{corr}$$

as executable instructions) or hardware (e.g., digital logic circuitry that is coded with hardware logic defining execution of $$T^{X}_{corr}$$

and $$T^{P}_{corr}).$$

).

Single-moment nonlinear filter 918 may utilize any type of single-moment nonlinear filtering algorithm to calculate $X_{k|k-1}$, $P_{k|k-1}$, $X_{k|k}$, and $P_{k|k}$ in stages 1002 and 1006, and accordingly may use operators $$T^{X}_{pred}, T^{P}_{pred}, T^{X}_{corr},$$

and $$T^{P}_{corr}$$

that are defined by the particular single-moment nonlinear filtering algorithm. For example, the operators by an EKF were previously shown and described above as an example of a model-based nonlinear filter. The various model-based nonlinear filtering algorithms, including, without limitation, EKFs, UKFs, GHFs, and QKFs, may each have their own unique definitions for operators $$T^{X}_{pred}, T^{P}_{pred}, T^{X}_{corr},$$

and $$T^{P}_{corr}$$

that define how $X_{k|k-1}$, $P_{k|k-1}$, $X_{k|k}$, and $P_{k|k}$ are calculated in the prediction and correction stages. Single-moment nonlinear filter 918 may use any such single-moment nonlinear filtering algorithm, and thus may be configured with the operators corresponding to the employed single-moment nonlinear filtering algorithm.

As shown in FIG. 10, single-moment nonlinear filter 918 may provide the predicted error covariance $P_{k|k-1}$ and the updated error covariance $P_{k|k}$ to multi-moment nonlinear filter extension 902 in stages 1004 and 1008. Multi-moment nonlinear filter extension 902 may then store the predicted error covariance $P_{k|k-1}$ and the updated error covariance $P_{k|k}$ in buffer 908 in stage 1010. With reference to FIG. 9, multi-moment nonlinear filter extension 902 may receive the predicted error covariance $P_{k|k-1}$ and the updated error covariance $P_{k|k}$ at selector 912. Selector 912 may also receive a mode selection signal, which may instruct selector 912 to provide either the predicted error covariance $P_{k|k-1}$ or the updated error covariance $P_{k|k}$ as its output. Although not shown in FIG. 10, in some implementations, both the predicted error covariance $P_{k|k-1}$ and the updated error covariance $P_{k|k}$ may be forwarded and buffered simultaneously (and selector 912 may be omitted). Selector 912 may provide the selected input to buffer 908, which may store the selected input. Buffer 908 may be a first-in, first-out (FIFO buffer) of size M, and may therefore store M error covariance (predicted or updated according to the mode selection signal) from the past M time steps. Buffer 908 may then drop out of the buffer any older error covariances according to the FIFO principle, and may thus reuse the buffer storage.

Multi-moment nonlinear filter extension 902 may operate concurrent to single-moment nonlinear filter 918, and both multi-moment nonlinear filter extension 902 and single-moment nonlinear filter 918 may operate in sequence on the same measurement sample r[k] on the same estimation cycle, where time step k gives the current time step for both multi-moment nonlinear filter extension 902 and single-moment nonlinear filter 918.

Accordingly, multi-moment filter extension 902 may tap the predicted error covariance $P_{k|k-1}$ or the updated error covariance $P_{k|k}$ calculated by single-moment nonlinear filter 918 for the current time step k, and store $P_{k|k-1}$ or $P_{k|k}$ in buffer 908 in stage 1010 along with the previous M−1 error covariances (yielding M total error covariances stored in buffer 908).

Multi-moment nonlinear filter extension 902 may then use L moments (L error covariances) to generate a multi-moment predicted error covariance $$P^{(L)}_{k|k-1}$$

to use for its own correction stage. Accordingly, selectors 910$_1$-910$_L$ may receive the M past single-moment error covariances stored in buffer 908 and each select one past singe-moment error covariance based on their time step selection signals $\tau_1$ to $\tau_L$ to provide to covariance renormalizer 904 in stage 1012. The time step selection signals $\tau_1$ to $\tau_L$ may therefore identify the L time steps from the M time steps stored in buffer 908 that will be used to calculate the multi-moment predicted error covariance $$P^{(L)}_{k|k-1},$$

where $\tau_i \in [0, M]$; $i \in [1, L]$ and $M \geq L$. Accordingly, multi-moment nonlinear filter extension 902 may use up to L of the error covariances of the past M time steps to determine each multi-moment predicted error covariance $$P^{(L)}_{k|k-1}.$$

Selectors 910$_1$-910$_L$ therefore produce L prior error covariances $P_{prior}(\tau_i)=P_{k-\tau_i|k-\tau_i-1}$, i=1, . . . , L (in the case of predicted error covariances) or $P_{prior}(\tau_i)=P_{k-\tau_i|k-\tau_i}$, i=1, . . . , L (in the case of updated error covariances) at each time step k.

Cumulant determiner 906 may then determine a multi-moment stationary posterior cumulant function for the selected L time steps (as determined by time step selection signals $\tau_1$ to $\tau_L$, which each identify a past time step by their value as a delay, e.g., identify the time step $(k-\tau_l)$) in stage 1014. In some aspects, cumulant determiner 906 may be a lookup table (LUT). For example, cumulant determiner 906 may be an LUT that stores pre-calculated stationary (constant) values of the multi-moment posterior cumulant function, for example, of any dimension up to L-moments and of any order up to the K-th order, e.g., $\kappa_{i_1, \ldots, i_L}(\tau_1, \ldots, \tau_L)$, where K is a design tuning parameter that gives the maximum order allowed for the cumulants (i.e., $i_1+i_2+\ldots+i_L \le K$). The cumulant function $\kappa_{i_1, \ldots, i_L}(\tau_1, \ldots, \tau_L)$ is therefore an L-moment and up-to-K order stationary cumulant function, where the actual order of the cumulant function is order$=i_1+i_2+\ldots+i_L$, under the constraint that order $\le K$. In some aspects where cumulant determiner 906 is an LUT, the values $i_1, i_2, \ldots, i_L$ are fixed. Although in the implementation shown in FIG. 9 the order of each of the time moments for the cumulant $(i_1, i_2, \ldots, i_L)$ are fixed at design time, other aspects may implement a larger lookup table allowing the parameters $\phi\ i_1, i_2, \ldots, i_L)$ to be runtime configurable by having more configuration inputs in the multi-moment nonlinear filter, thus making it an even more parametric filter.

The LUT of cumulant determiner 906 may be indexed by the L time step selection signals $\tau_1$ to $\tau_L$, and thus may use $\tau_1$ to $\tau_L$ as the inputs for selecting the entry (each entry of the LUT having a pre-calculated stationary value of the multi-moment posterior cumulant function for a specific set of $\tau_1$ to $\tau_L$). In some aspects, the LUT may also be indexed by the parameter R, which, for example, can correspond to different ISNR values (as lower-order cumulant values can vary over different ISNRs). Accordingly, each entry of the LUT may have a pre-calculated stationary value of the multi-moment posterior cumulant function for a specific set of $\tau_1$ to $\tau_L$ and a specific SNR condition identified by R. In other aspects, cumulant determiner 906 may be a software or hardware determiner (e.g., an executable instruction set or a digital logic circuit) that is configured to numerically calculate the stationary value of the multi-moment posterior cumulant function for each time step k (based on the provided parameter R and the time step selection signals $\tau_1$ to $\tau_L$).

After determining the multi-moment stationary cumulant function value in stage 1014, cumulant determiner 906 may provide the multi-moment stationary posterior cumulant function value corresponding to the selected delays ($\tau_1$ to $\tau_L$) to covariance renormalizer 904. Covariance renormalizer 904 may be realized as hardware (e.g., digital logic circuitry that defines the functionality of covariance renormalizer 904 as described herein as hardware logic) or as software (e.g., an instruction set configured for execution by a processor that defines the functionality of covariance renormalizer 904 as described herein as executable instructions). Covariance renormalizer 904 may also receive the L prior error covariance $P_{prior}(\tau_i)$ from selectors $910_1$-$910_L$ and the current predicted error covariance $P_{k|k-1}$ from single-moment nonlinear filter 918. In some aspects, covariance renormalizer 904 may receive algorithm parameters $\alpha_1$-$\alpha_N$, which may be algorithm parameters that are adaptable, such as by an adaptation engine in the form of adaptation engine 402. In some aspects, time step parameters $\tau_1$ to $\tau_L$ (that identify the past time steps used to calculate the multi-moment posterior cumulant function) may also be adaptable parameters (e.g. assuming that the LUT has enough values and/or a method to interpolate between values).

Covariance renormalizer 904 may then heuristically renormalize the predicted error covariance $P_{k|k-1}$ into the multi-moment predicted error covariance $$P_{k|k-1}^{(L)}$$

to complete stage 1016. Stated generally, covariance renormalizer 904 may be configured to project a set of error covariances (the L prior error covariances) from previous time steps into the current time step, through the knowledge of multi-moment stationary posterior cumulant functions relating all the previous time steps with the current one.

Multi-moment nonlinear filter extension 902 may then execute its multi-moment prediction stage and multi-moment correction stage with multi-moment nonlinear filter prediction engine 916 and multi-moment nonlinear filter correction engine 914 in stages 1018 and 1020, respectively. Multi-moment nonlinear prediction engine 916 may execute the state prediction operator $$T_{pred}^{X}[X, P; F, Q, k]$$

(which duplicates the state prediction operator $$T_{pred}^{X}$$

executed by single-moment nonlinear filter prediction engine 920) in stage 1018 to produce the multi-moment predicted state estimate $$X_{k|k-1}^{(L)}$$

for the current time step k. Multi-moment nonlinear prediction engine 916 may then provide the multi-moment predicted state estimate $$X_{k|k-1}^{(L)}$$

to multi-moment nonlinear filter correction engine 914. In some aspects, multi-moment nonlinear filter prediction engine 914 may be configured as software (e.g., an instruction set configured for execution by a processor that defines execution of $$T_{pred}^{X}$$

as executable instructions) or hardware (e.g., digital logic circuitry that is coded with hardware logic defining execution of $$T_{pred}^{X}$$

).

Multi-moment nonlinear filter correction engine 914 may therefore receive the multi-moment predicted state estimate $$X_{k|k-1}^{(L)}$$

from multi-moment nonlinear filter prediction engine 916 and the multi-moment predicted error covariance $$P_{k|k-1}^{(L)}$$

from covariance renormalizer 904. Multi-moment nonlinear filter correction engine 914 may then in stage 1020 execute the state correction operator $$T_{corr}^{X}[X, P, r; H, R, k]$$

and the error covariance correction operator $$T_{corr}^{P}[X, P, r; H, R, k]$$

(which duplicate the state correction operator $$T_{corr}^{X}$$

and the error covariance correction operator $$T_{corr}^{P}$$

executed by single-moment nonlinear filter correction engine 922) using $$X_{k|k-1}^{(L)}, P_{k|k-1}^{(L)},$$

and measurement r[k] to obtain updated state estimate $$X_{k|k}^{(L)}$$

and updated error covariance $$P_{k|k}^{(L)}.$$

As multi-moment nonlinear filter correction engine 914 receives the multi-moment predicted error covariance $$P_{k|k-1}^{(L)}$$

from covariance renormalizer 940 (as opposed to from a prediction engine), multi-moment nonlinear filter prediction engine 916 may refrain from determining a predicted error covariance. In some aspects, multi-moment nonlinear filter correction engine 916 may be configured as software (e.g., an instruction set configured for execution by a processor that defines execution of $$T_{corr}^{X}$$

and $$T_{corr}^{P}$$

as executable instructions) or hardware (e.g., digital logic circuitry that is coded with hardware logic defining execution of $$T_{corr}^{x}$$

and $$T_{corr}^{P}$$

).

Multi-moment nonlinear filter correction engine 914 may then determine an RFI estimate (a sample for the current time step k) i[k] based on the updated state estimate $$X_{k|k}^{(L)}$$

in stage 1022, such as, for example, by transforming the updated state estimate $$X_{k|k}^{(L)}$$

into the expected output using output operator H(X, k), e.g., $$\hat{\imath}[k] = H\left(X_{k|k}^{(L)}, k\right).$$

With reference to FIG. 8, multi-moment nonlinear filter 810 may then provide RFI estimate $\hat{\imath}$[k] to subtractor 312, which may subtract $\hat{\imath}$[k] from r[k] to obtain cleaned received signal r'[k].

As shown in FIG. 10, single-moment nonlinear filter 918 and multi-moment nonlinear filter extension 902 may be configured to repeat the procedure of process 1000, e.g., for each time step k. Accordingly, single-moment nonlinear filter 918 and multi-moment nonlinear filter extension 918 may re-use their respective results (updated state estimates and updated error covariances) for the prediction stage in the next time step (k+1), and so forth.

While operation of multi-moment nonlinear filter 810 is described above with a focus on RFI mitigation, this is only an exemplary application of multi-moment nonlinear filtering. Accordingly, multi-moment nonlinear filter 810 can be incorporated into any application of nonlinear filtering, such as, without limitation, voice processing when polluted with Gaussian colored (unknown coloring) noise, submarine single-carrier communications, seismic signal measurements and cleansing, and electrocardiographic signal measurement and cleansing. For example, multi-moment nonlinear filtering as described herein can be incorporated on top of any single-moment model-based nonlinear filter, such as EKFs, UKFs, GHFs, and QKFs, such as by incorporating multi-moment nonlinear filter extension 902 and tapping the error covariances (prediction or updated) of the single-moment model-based nonlinear filter as input to multi-moment nonlinear filter extension 902. Accordingly, multi-moment nonlinear filtering is applicable to any application using a single-moment model-based nonlinear filter. Additionally, while described above in the context of nonlinear filtering, multi-moment filtering as described herein can likewise be applied for linear filters. Accordingly, instead of function operators F(X, k) and H(X, k), the prediction and correction engines can be configured to use matrix operators $F_k$ and $H_k$, where evolution matrix $F_k$ and output matrix $H_k$ are time-varying matrices (at time step k) that define the linearized evolution and output operators of the model. The structure of multi-moment nonlinear filter 810 as shown in FIG. 9 can then be used in the same manner for linear filtering.

In various aspects, stochastic and/or chaotic models can be used by single-moment nonlinear filter 918 and multi-moment nonlinear filter extension 902. As previously indicated, in some cases filtering accuracy can be improved by using chaotic models instead of Markov stochastic models (e.g., for both single-moment nonlinear filter 918 and multi-moment nonlinear filter extension 902), which can decrease the estimation error lower bound. Exemplary chaotic models are Lorenz, Chua, Rossler, Chen, and the Unified Chaotic System models.

Figure 11:
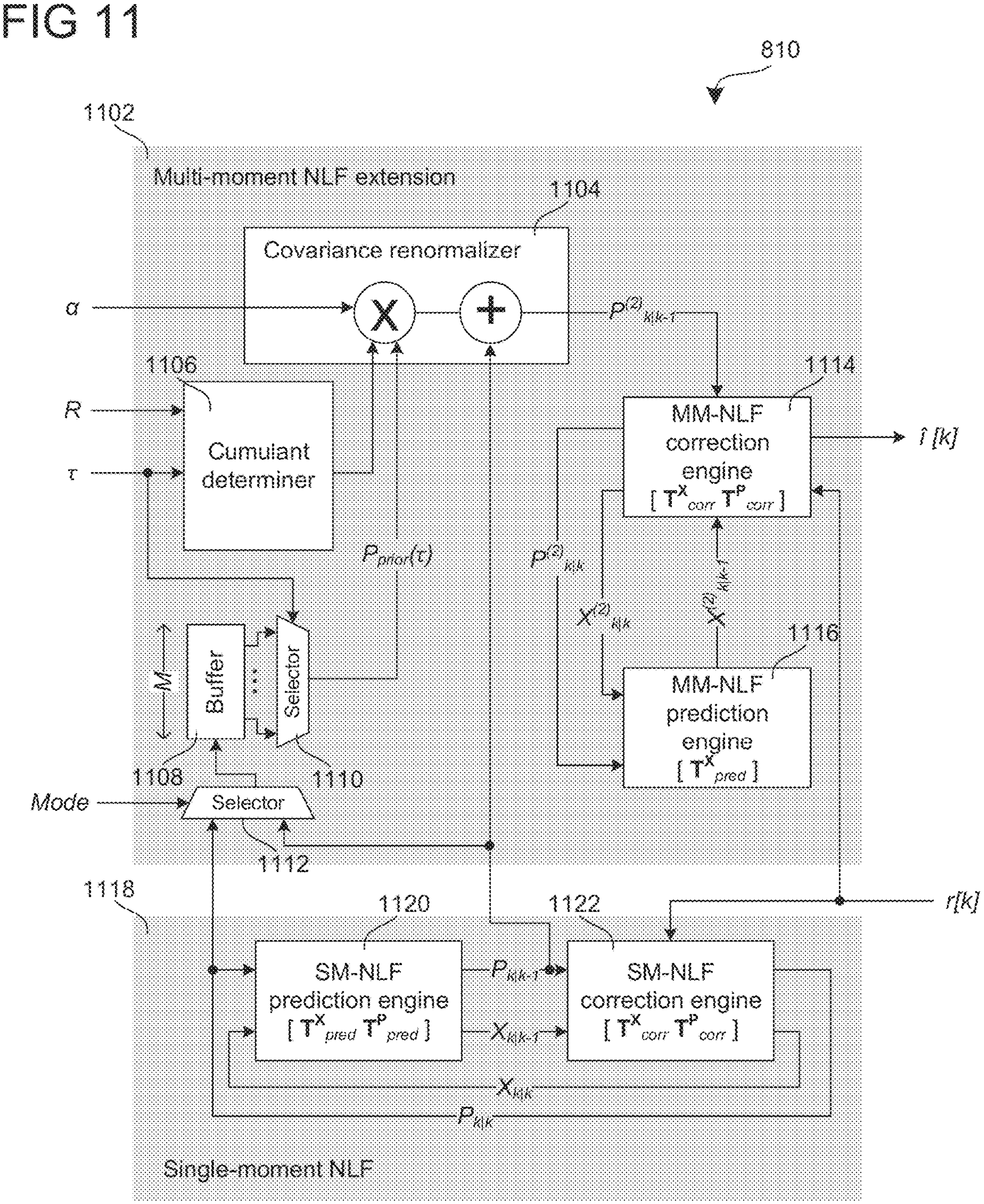
FIG. 11 shows an exemplary internal configuration of a two-moment nonlinear filter according to some aspects.

FIG. 11 shows an exemplary internal configuration of multi-moment nonlinear filter 810 for two-moment nonlinear filtering according to some aspects. Accordingly, while multi-moment nonlinear filter 810 as shown in FIG. 9 is configured for L-moment nonlinear filtering, multi-moment nonlinear filter 810 of FIG. 11 is configured for only two-moment nonlinear filtering. Single-moment nonlinear filter prediction engine 1120 and single-moment nonlinear filter correction engine 1122 may operate in the same manner shown and described for single-moment nonlinear filter prediction engine 920 and single-moment nonlinear filter correction engine 922, and accordingly may determine a predicted state estimate $X_{k|k-1}$ and predicted error covariance $P_{k|k-1}$ via execution of the prediction stage and determine an updated state estimate $X_{k|k}$ and updated error covariance $P_{k|k}$ via execution of the correction stage. Single-moment nonlinear filter prediction engine 1120 and single-moment nonlinear filter correction engine 1122 may then provide the predicted error covariance $P_{k|k-1}$ and the updated error covariance $P_{k|k}$ to multi-moment nonlinear filter extension 1102.

Selector 1112 may receive the predicted error covariance $P_{k|k-1}$ and the updated error covariance $P_{k|k}$ and, dependent on the mode selection signal, provide either $P_{k|k-1}$ or $P_{k|k}$ to size-M FIFO buffer 1108. Buffer 1108 may therefore store the past M error covariances. Selector 1110 may then select one of the M error covariances in buffer 1108 to provide to covariance renormalizer 1104. In particular, time step selection signal τ may identify a single time step $1 \le \tau \le M$ for which the corresponding error covariance $P_{prior}(\tau)$ will be used to determine the two-moment predicted error covariance $$P^{(2)}_{k|k-1}.$$

Cumulant determiner 1106 may then determine the stationary two-moment cumulant based on τ. In some aspects, cumulant determiner 1106 may be a two-moment, order-2 stationary posterior cumulant function LUT given by $\kappa_{1,1}(\tau)$ (where the cumulant function order is given by the sum of the subscripts of κ, e.g. the subscript "1,1" gives an order of 1+1=2). In some aspects, the LUT can store the cumulant value (without squaring) and covariance renormalizer 1104 can have an additional multiplier to calculate the square of the cumulant, which will scale the cumulant to have the same units as the error covariance matrix to be used for the "projection" of the error covariance matrix into the current time step. In other aspects, the LUT may store the square of the cumulant value, i.e., $[\kappa_{1,1}(\tau)]^2$, which can perform this squaring (and avoid the placement of another multiplier inside covariance renormalizer 1104.

In other aspects, cumulant determiner 1106 may be a processor for executing program code or a digital logic circuit that is configured to numerically calculate the two-moment, order-2 stationary posterior cumulant function for a given τ. In some aspects, cumulant determiner 1106 may also index the LUT and/or numerically calculate the cumulant function based on parameter R, which gives different SNR conditions.

The output of cumulant determiner 1106 is the numeric value for the cumulant for the selected delay τ and the selected SNR R (if applicable), which is, for example, $\kappa_{1,1}(\tau)$ (if cumulant determiner 1106 is configured to produce the non-squared cumulant) or $[\kappa_{1,1}(\tau)]^2$ (if cumulant determiner 1106 is configured to produce the squared cumulant).

Covariance renormalizer 1104 may receive algorithm parameter α, $\kappa_{1,1}(\tau)$ or $[\kappa_{1,1}(\tau)]^2$, $P_{prior}(\tau)$, and $P_{k|k-1}$, and apply a renormalization heuristic to obtain two-moment predicted error covariance $$P^{(2)}_{k|k-1}.$$

For example, in some aspects covariance renormalizer 1104 may perform the renormalization as a linear combination based on parameter α, such as $$P^{(2)}_{k|k-1} = P_{k|k-1} + \alpha P_{k|prior}$$

where α acts a weighting factor that defines the relative contributions of $P_{k|k-1}$ and $P_{k|prior}$ to $$P^{(2)}_{k|k-1}$$

and $P_{k|prior}=P_{prior}(\tau)\ [\kappa_{1,1}(\tau)]^2$.

Multi-moment nonlinear filter correction engine 1114 may then receive the two-moment predicted error covariance $$P^{(2)}_{k|k-1}$$

as well as the two-moment predicted state estimate $$X_{k|k-1}^{(2)},$$

which multi-moment nonlinear filter prediction engine 1116 may calculate in its prediction stage. Multi-moment nonlinear filter correction engine 1114 may then execute the correction stage to obtain a two-moment updated state estimate $$X_{k|k}^{(2)}$$

and a two-moment updated error covariance $$P_{k|k}^{(2)}.$$

Multi-moment nonlinear filter correction engine 1114 may then, for example, apply the output operator H(X, k) to the two-moment updated state estimate $$X_{k|k}^{(2)}$$

to obtain estimated signal î[k].

Although not shown explicitly in the previous figures, it is simple to observe that the multi-moment nonlinear filter can easily fall back to the single-moment nonlinear filter implementation, simply by disconnecting/disabling the multi-moment nonlinear filtering extension, and taking the RFI estimate i[k] from the correction stage in the single-moment filter. This can be a power saving feature when SNR conditions are optimal and no colored Gaussian noise is detected (i.e. only white Gaussian noise with very low power is polluting estimated signal).

This two-moment nonlinear filtering technique may be the simplest multi-moment implementation, where the multi-moment nonlinear filtering is scalable up to L moments for any L. The linear covariance renormalization of covariance renormalizer 1104 described above is a basic example, and any other error covariance renormalization heuristic can also be used. For example, linear and polynomial models as well as data-aided trained models (e.g., neural networks or SVMs that are trained offline with test data.) can also be used as the renormalization heuristic.

Although applicable in any scenario, multi-moment nonlinear filter 810 may be particularly useful in scenarios with low SNR and/or when colored Gaussian RFI is present. For example, multi-moment nonlinear filter 810 may be able to have high filtering performance even at SNRs of −10 dB while equivalent single-moment nonlinear filters are practically useless (and may deteriorate the received signal even more). Additionally, while single-moment filters can be very sensitive to colored Gaussian noise, multi-moment nonlinear filter 810 may be able to provide strong filtering results even when operating without prior knowledge of the coloring.

Figure 12:
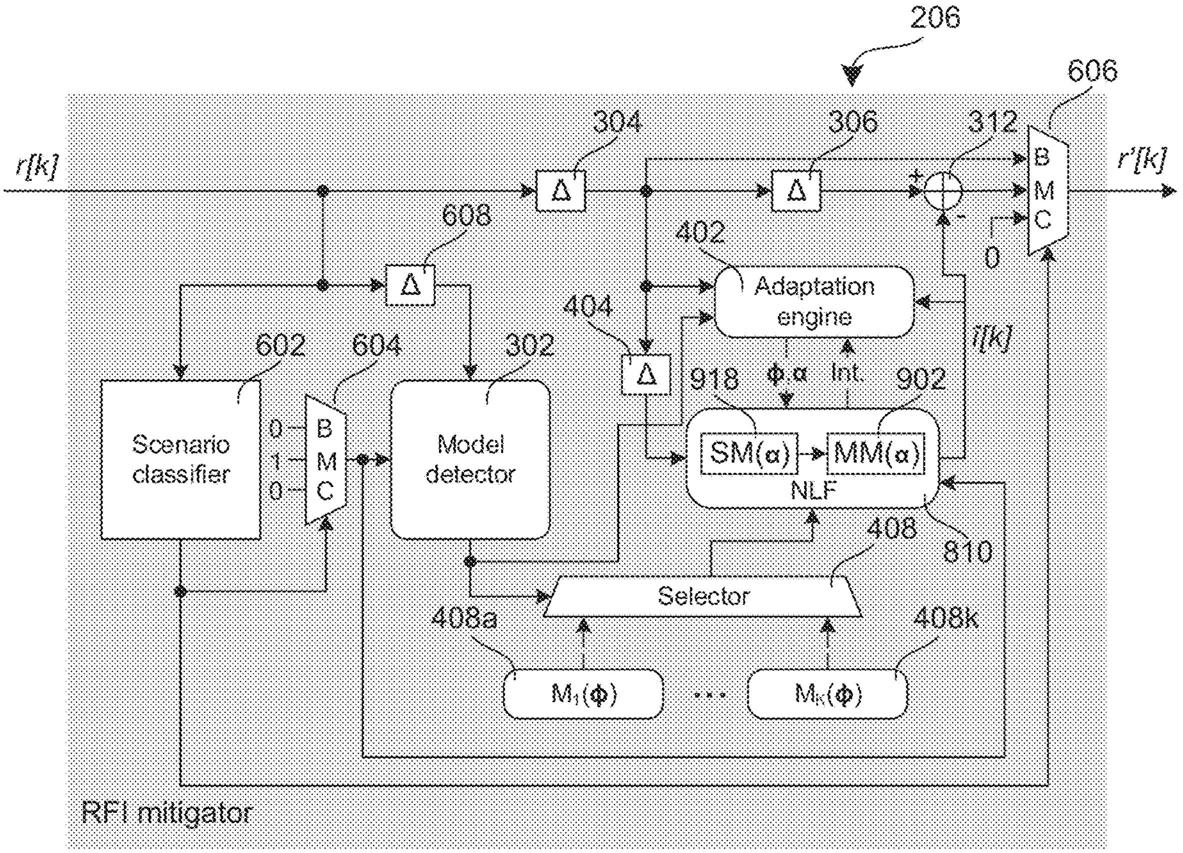
FIG. 12 shows an exemplary internal configuration of an adaptive RFI mitigator with model detection, on/off clipping, and multi-moment nonlinear filtering according to some aspects.

In some aspects, parametric adaptation, on/off clipping, and multi-moment filtering as described herein may be concurrently incorporated into RFI mitigator 206. FIG. 12 shows an exemplary internal configuration of RFI mitigator 206 according to some aspects where RFI mitigator 206 is configured for parametric adaptation, on/off clipping, and multi-moment filtering. As shown in FIG. 12, RFI mitigator 206 may include adaptation engine 402 and parametric models 408*a*-408*k* for parametric adaptation. Additionally, multi-moment nonlinear filter 810 may be parametric, and thus may use algorithm parameters α (e.g., at one or both of single-moment nonlinear filter 918 and multi-moment nonlinear filter extension 902). Adaptation engine 402 may be configured to track estimation performance by monitoring î[k] (and/or the model selection signal and internal variables of multi-moment nonlinear filter 810) and to update model parameters ϕ and/or algorithm parameters α based thereon.

RFI mitigator 206 may also include scenario classifier 602, selector 604, and selector 606 for on/off clipping. Scenario classifier 602 may therefore be configured to evaluate r[k] to classify the current RFI scenario as one of a no RFI scenario, an additive RFI scenario, or a multiplicative RFI scenario. Scenario classifier 602 may then provide selection signals to selectors 604 and 606 based on the current RFI scenario to control RFI mitigator 206 to operate according to a bypass operation mode, a mitigate operation mode, or a clip operation mode.

RFI mitigator 206 may further include multi-moment nonlinear filter 810 including single-moment nonlinear filter 918 and multi-moment nonlinear filter extension 902. Single-moment nonlinear filter 918 and multi-moment nonlinear filter extension 902 may be configured to perform multi-moment nonlinear filtering as shown and described above.

Accordingly, in some cases RFI mitigator 206 as shown in FIG. 12 may be able to adaptively tune itself to address new or changing RFI sources, to react to RFI spikes that cause nonlinear front-end behavior, and to operate in low ISNR and/or colored Gaussian noise conditions.

Figure 13:
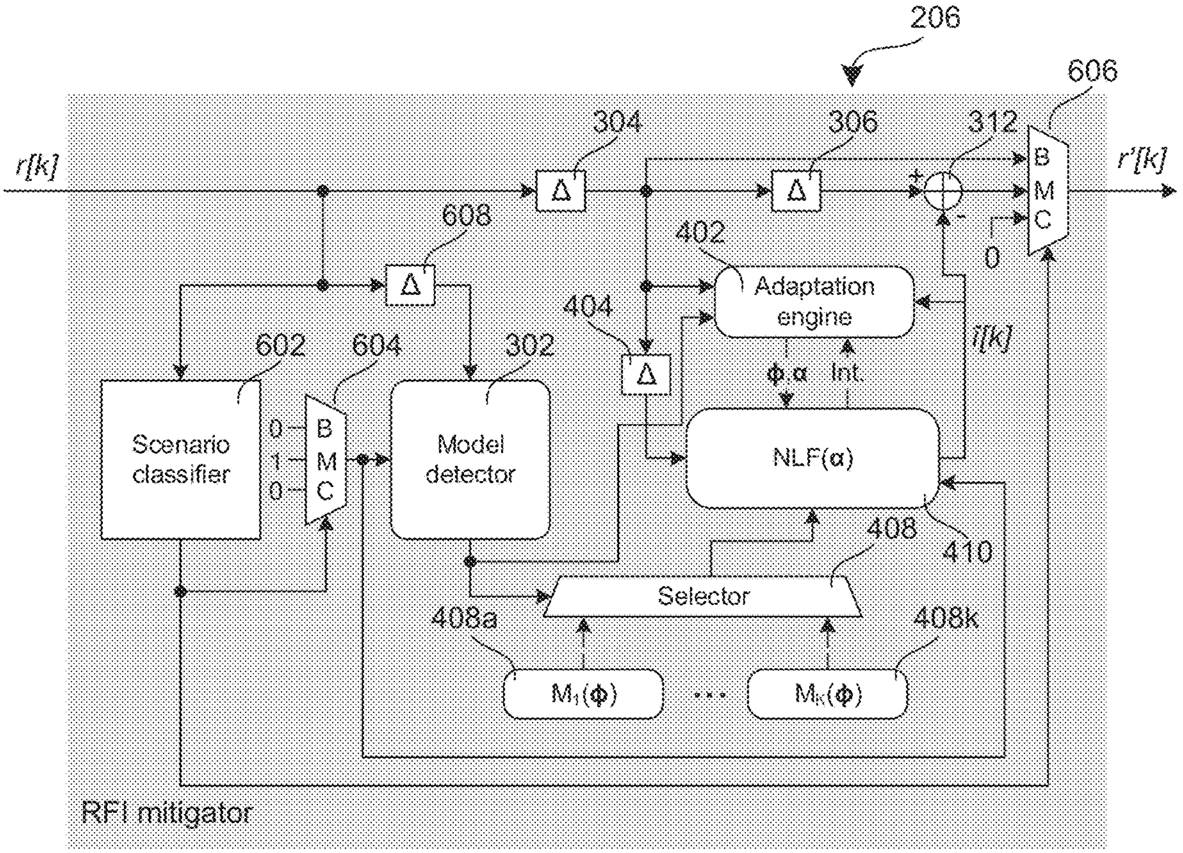
FIG. 13 shows an exemplary internal configuration of an adaptive RFI mitigator with model detection and on/off clipping according to some aspects.
Figure 14:
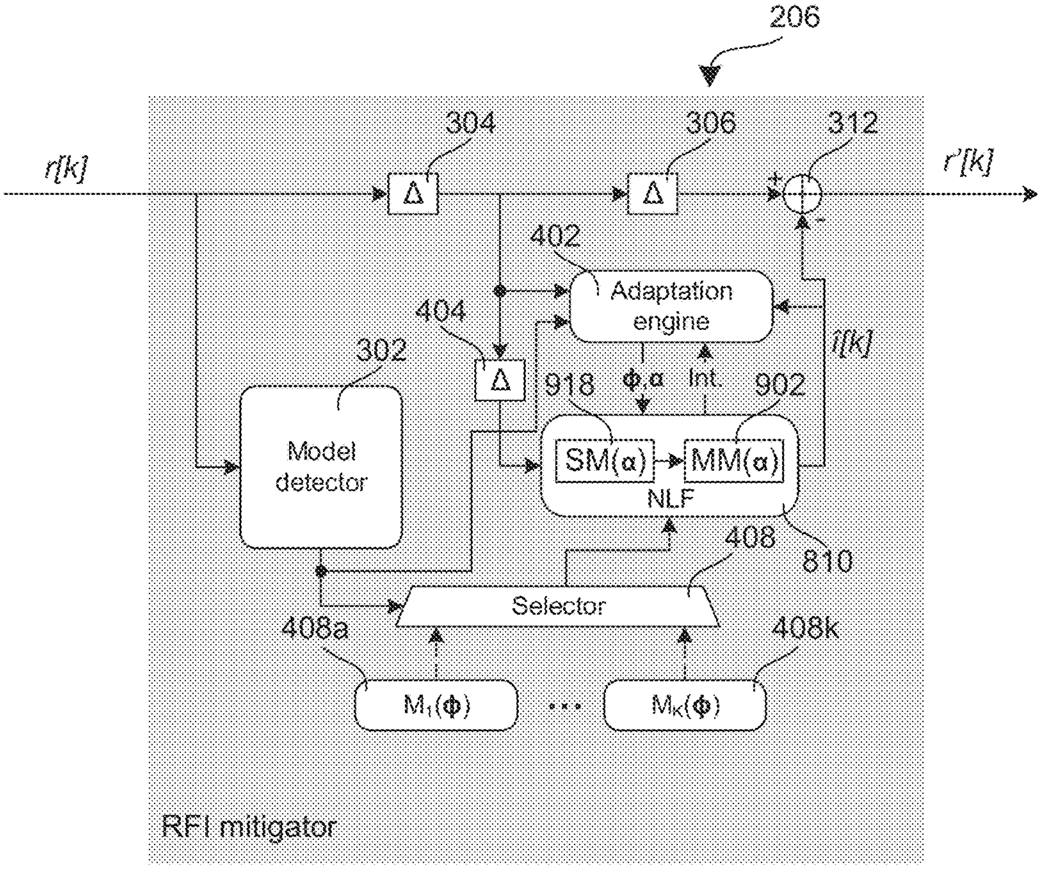
FIG. 14 shows an exemplary internal configuration of an adaptive RFI mitigator with model detection and multi-moment nonlinear filtering according to some aspects.
Figure 15:
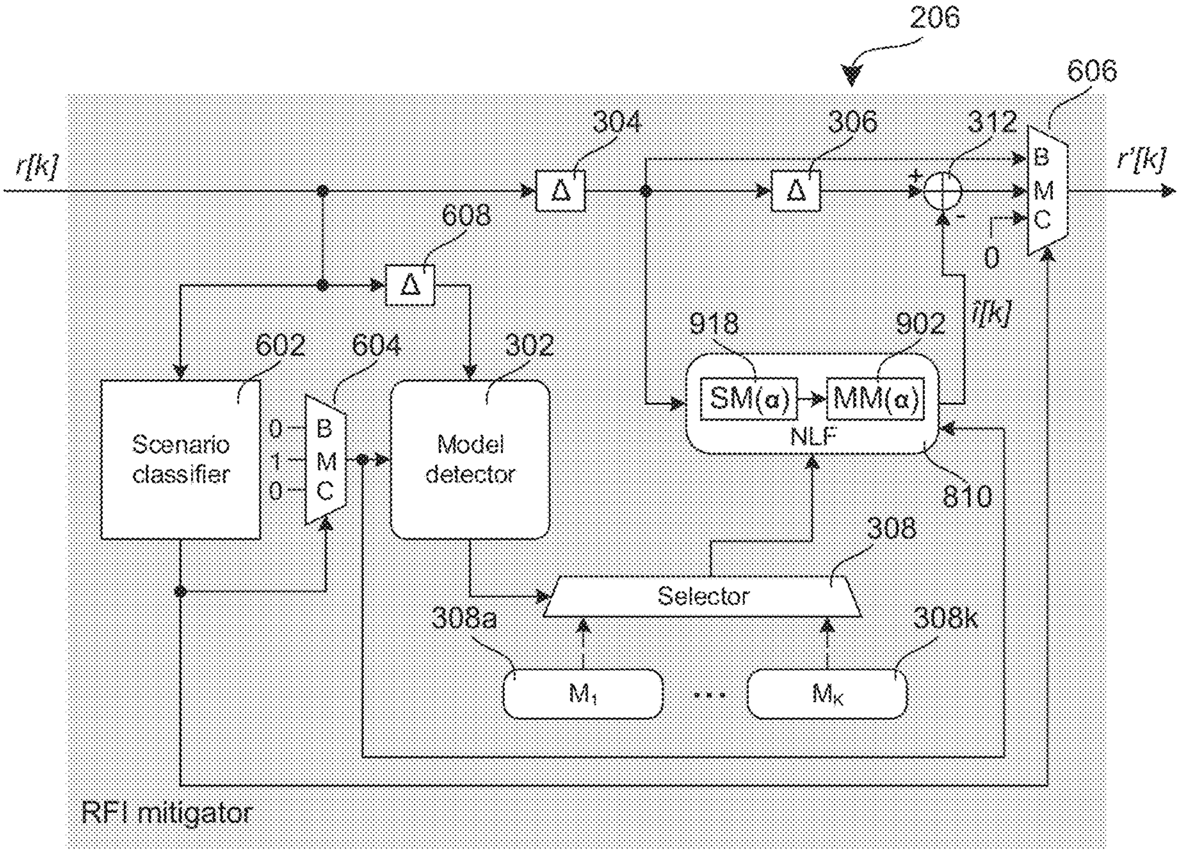
FIG. 15 shows an exemplary internal configuration of a RFI mitigator with model detection, on/off clipping, and multi-moment nonlinear filtering according to some aspects.

In various other aspects, RFI mitigator 206 may include any one or more of parametric adaptation, on/off clipping, and multi-moment filtering. For example, FIG. 4 shows an aspect where RFI mitigator 206 includes parametric adaptation, FIG. 6 shows RFI mitigator 206 with on/off clipping, FIG. 9 shows RFI mitigator 206 with multi-moment filtering, and FIG. 12 shows RFI mitigator 206 with parametric adaptation, on/off clipping, and multi-moment filtering. FIGS. 13-15 show various other aspects of RFI mitigator 206, including RFI mitigator 206 with parametric adaptation and on/off clipping in FIG. 13, RFI mitigator 206 with multi-moment filtering and parametric adaptation in FIG. 14, and RFI mitigator 206 with multi-moment filtering and on/off clipping in FIG. 15.

Figure 16:
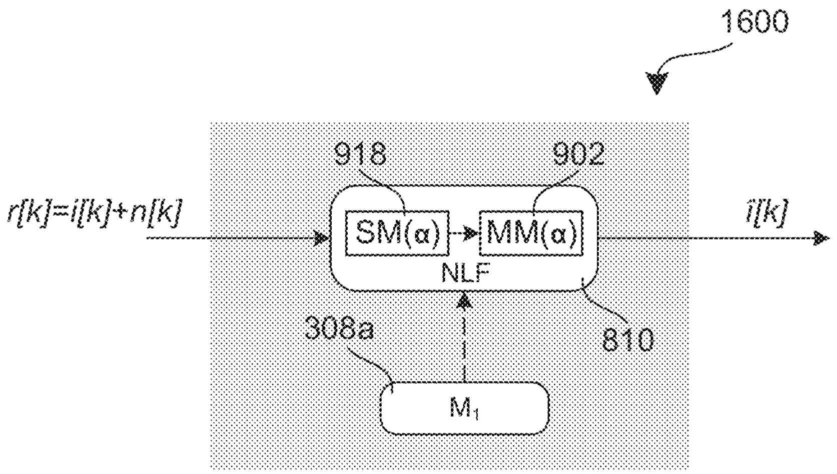
FIG. 16 shows an exemplary internal configuration of a signal processing device with a multi-moment nonlinear filter according to some aspects.

As previously indicated, in some aspects multi-moment nonlinear filter 810 may be applied for any use case of nonlinear filtering (e.g., including, but not limited to, RFI). FIG. 16 shows an exemplary internal configuration in which multi-moment nonlinear filter 810 (including both single-moment nonlinear filter 918 and multi-moment nonlinear filter extension 902) is included in device 1600. As shown in FIG. 16, device 1600 may receive an input signal r[k], which may be any type of input signal, that includes both noise signal n[k] and desired signal i[k] (where r[k] may have been previously processed and/or digitized downstream from device 1600). In some aspects, noise signal n[k] may be Gaussian noise, while desired signal i[k] may be a non-Gaussian signal. Multi-moment nonlinear filter 810 may then process r[k] using model 308*a* in the manner shown and described above for FIGS. 9 and 10 to estimate i[k] as i[k], including execution of the prediction and correction stages by single-moment nonlinear filter 918 and multi-moment nonlinear filter extension 902.

As previously indicated, several non-limiting and exemplary uses for multi-moment nonlinear filter 810 can include voice processing, submarine communications, seismic signals, and electrocardiographic signals. Multi-moment nonlinear filter 810 may therefore be configured to perform estimation for any type of signal r[k]. Although not limited to such, multi-moment nonlinear filter 810 may be particularly useful in estimating any non-Gaussian signal that is buried in Gaussian noise.

Figure 17:
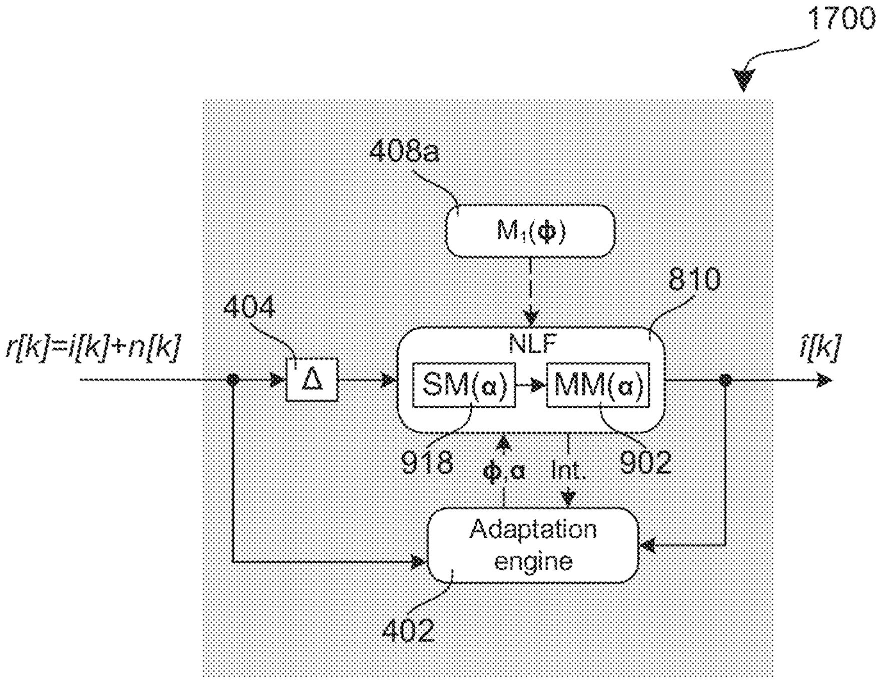
FIG. 17 shows an exemplary internal configuration of a signal processing device with an adaptive multi-moment nonlinear filter according to some aspects.

As shown in FIG. 17, this general application of multi-moment nonlinear filter 810 may also be implemented adaptively in device 1700. Adaptation engine 402 (as previously shown and described for FIG. 4) may be included, and may be configured to adaptively update model and/or filter parameters $\phi$ and $\alpha$ as used by multi-moment nonlinear filter 810. Multi-moment nonlinear filter 810 may therefore use parametric model 408*a* with model parameters $\phi$. Multi-moment nonlinear filter 810 may be configured to use the current values of model and filter parameters $\phi$ and $\alpha$ in its prediction and correction stages to produce estimates i[k] for signal i[k].

Figure 18:
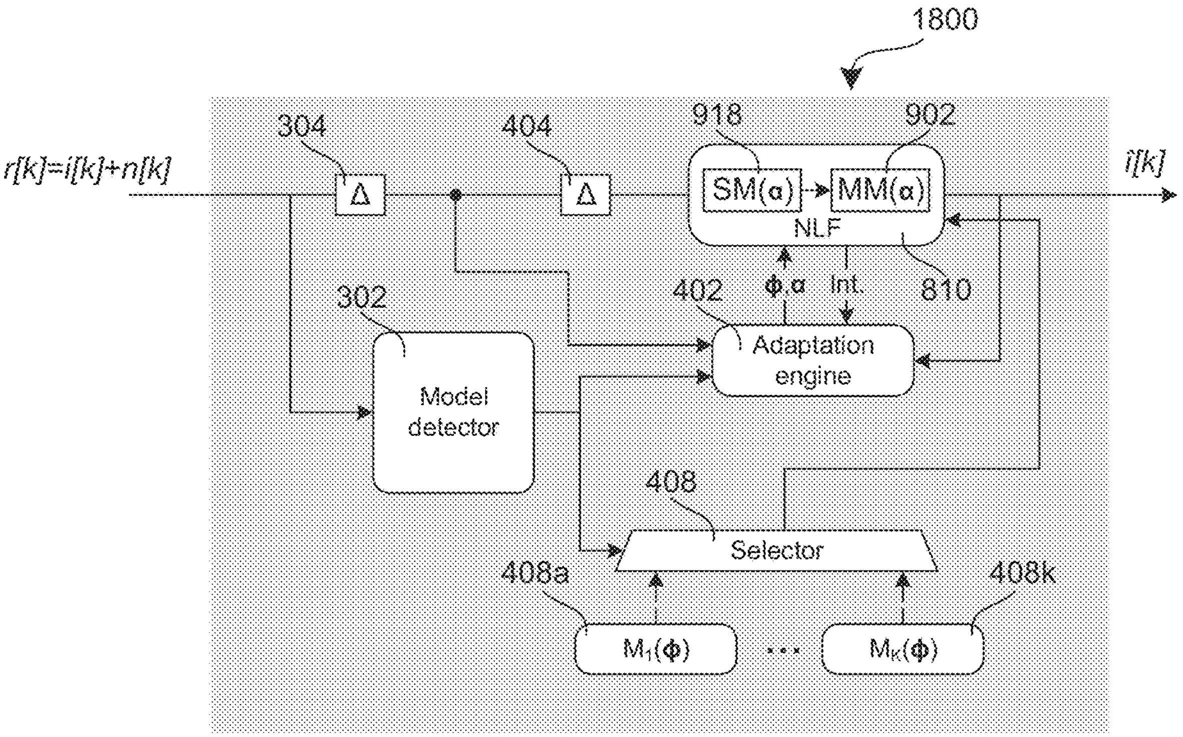
FIG. 18 shows an exemplary internal configuration of a signal processing device with an adaptive multi-moment nonlinear filter and a model detector according to some aspects.

In some aspects, the general application of multi-moment nonlinear filter 810 may further be expanded to include model detector 302 as shown in FIG. 18 for communication device 1800. As previously shown and described for FIG. 3, model detector 302 may be configured to evaluate r[k] to select one of parametric models 408*a*-408*k* for multi-moment nonlinear filter 810 to use to calculate $\hat{i}$[k]. In some aspects, one or more of parametric models 408*a*-408*k* may span entire families of statistical distributions. Model detector 302 may be configured to identify a statistical distribution family and to select one of parametric models 408*a*-408*k* that fits the identified statistical distribution family. Adaptation engine 402 may then be configured to update the model parameters $\phi$ for the selected parametric model, which may therefore fit the estimation by multi-moment nonlinear filter 810 to the statistical features of r[k] being observed by model detector 302.

Figure 19:
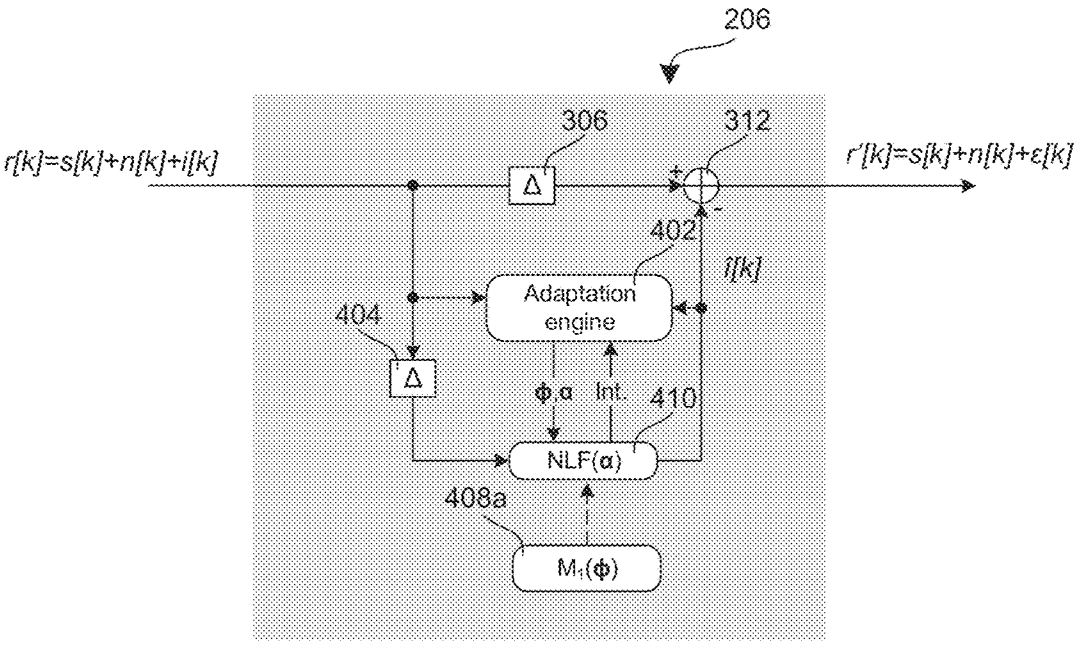
FIG. 19 shows an exemplary internal configuration of a communication device with an adaptive multi-moment nonlinear filter.

FIG. 19 shows an exemplary internal configuration of RFI mitigator 206 according to some aspects where mitigator 206 may include adaptation engine 402 and parametric nonlinear filter 410 (e.g., without model detector 302). Parametric nonlinear filter 410 may execute a parametric filtering algorithm with parametric model 408*a*, while adaptation engine 402 may be configured to track the performance of parametric nonlinear filter 410 and to adapt the model parameters $\phi$ of parametric model 408*a* and/or the algorithm parameters $\alpha$ of parametric nonlinear filter 410 based on the performance. Adaptation engine 402 may adapt the model parameters $\phi$ of parametric model 408*a* to fit parametric model 408*a* to a particular statistical distribution within the statistical distribution family that parametric model 408*a* is able to be tuned to. Adaptation engine 402 may adapt the algorithm parameters $\alpha$ to change how much emphasis the correction stage of parametric nonlinear filter 410 places on the measurements of r[k], such as how much emphasis the correction stage places on the measurement residual when updating the predicted state estimate from the prediction stage.

In some implementations, any of the aspects described above may use a continuous-discrete (CD) nonlinear filter or CD nonlinear smoother as described in WIPO International Publication Number WO2017/111800A1. This may reduce the oversampling rate requirements of the nonlinear filter, and by extension reduce power usage and design complexity. Accordingly, as described in WO2017/111800A1, the nonlinear filter of any aspect described herein may execute a prediction block at a "continuous time" processing rate and a correction block at a "discrete time" sampling rate. The nonlinear filter may therefore run at a processing rate greater than or equal to the Nyquist rate. However, this use of CD may enable the usage of lower sampling rates (e.g., less than 64 times the Nyquist rate) without a substantial drop in performance mitigation. This is applicable to the nonlinear filter of any aspect described herein.

Various aspects of this disclosure include a signal processing device. The signal processing device includes a single moment prediction and correction engine (e.g., 920 and 922, or 1120 and 1122) configured to receive a signal including a target signal, and to execute a single-moment filter, based on a current measurement sample of the signal and a model of the target signal, to obtain a single-moment state estimate and a single-moment state estimate error covariance for the target signal, a covariance renormalizer (e.g., 904 or 1104) configured to determine a multi-moment state estimate error covariance for the target signal based on a prior single-moment state estimate error covariance, corresponding to a sample prior to the current measurement sample, and the single-moment state estimate error covariance, and a multi-moment prediction and correction engine (e.g., 914 and 916, or 1114 and 1116) configured to execute a multi-moment filtering extension based on the current measurement sample and the multi-moment state estimate error covariance to obtain a multi-moment state estimate, and further configured to determine an estimate for the target signal based on the multi-moment state estimate.

Various aspects provide a communication device including a model detector (e.g., 302) configured to receive a signal including an interference signal, determine one or more statistical features of the signal, and select, from a plurality of models, a model that fits the one or more statistical features of the signal, a filter (e.g., 310, 410, 810) configured to execute model-based filtering with the selected model to determine an estimated interference signal, and an adaptation engine (e.g., 402) configured to track performance of the model-based filtering and to adapt the model-based filtering or the selected model based on the performance.

Various aspects provide a communication device including a scenario classifier (e.g., 602) configured to determine whether a signal received by the communication device includes an interference signal and to determine whether a front-end receiving the signal is operating linearly, a selector (e.g., 606) configured to select between a cleaned signal and a clipped signal as an output signal of the communication device, wherein the scenario classifier is further configured to if the front-end is operating linearly and the signal includes the interference signal, control the selector to provide the cleaned signal as the output signal, and if the front-end is not operating linearly, control the selector to provide the clipped signal as the output signal.

Various aspects provide a communication device including a filter (e.g., 310, 410, 810) configured to receive a signal comprising an interference signal, and to execute a parametric filtering algorithm with a parametric model on the signal to determine an estimated interference signal; and an adaptation engine (e.g., 402) configured to: track performance of the parametric filtering algorithm, adapt, based on the performance, one or more model parameters of the parametric model that fit the parametric model to a statistical distribution of the interference signal, and adapt, based on the performance, one or more algorithm parameters of the parametric filtering algorithm.

Figure 20:
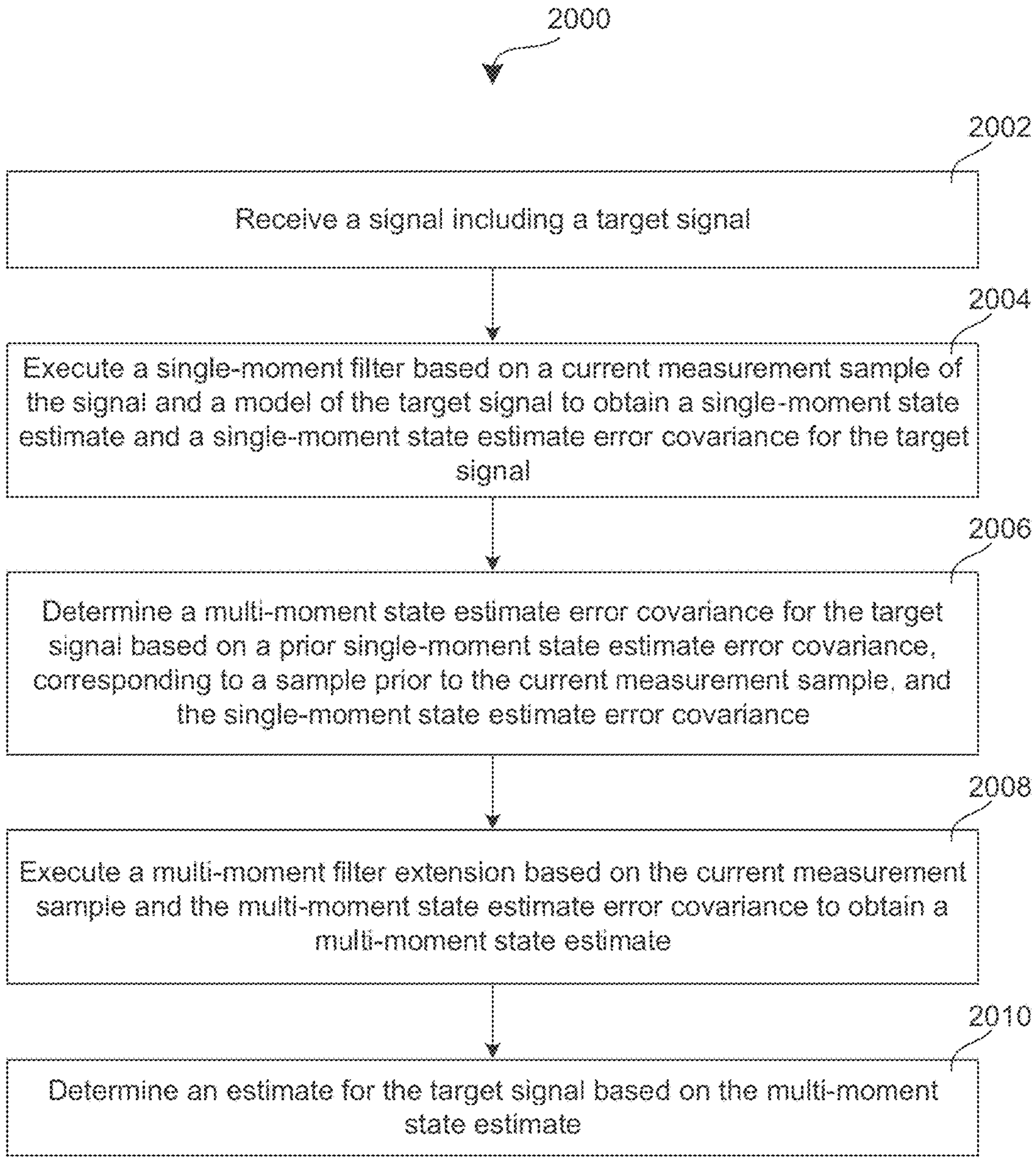
FIG. 20 shows a first exemplary method of processing signals according to some aspects.

FIG. 20 shows method 2000 for processing signals. As shown in FIG. 20, method 2000 includes receiving a signal including a target signal (2002), executing a single-moment filter based on a current measurement sample of the signal and a model of the target signal to obtain a single-moment state estimate and a single-moment state estimate error covariance for the target signal (2004), determining a multi-moment state estimate error covariance for the target signal based on a prior single-moment state estimate error covariance, corresponding to a sample prior to the current measurement sample, and the single-moment state estimate error covariance (2006), executing a multi-moment filter extension based on the current measurement sample and the multi-moment state estimate error covariance to obtain a multi-moment state estimate (2008), and determining an estimate for the target signal based on the multi-moment state estimate (2010).

Figure 21:
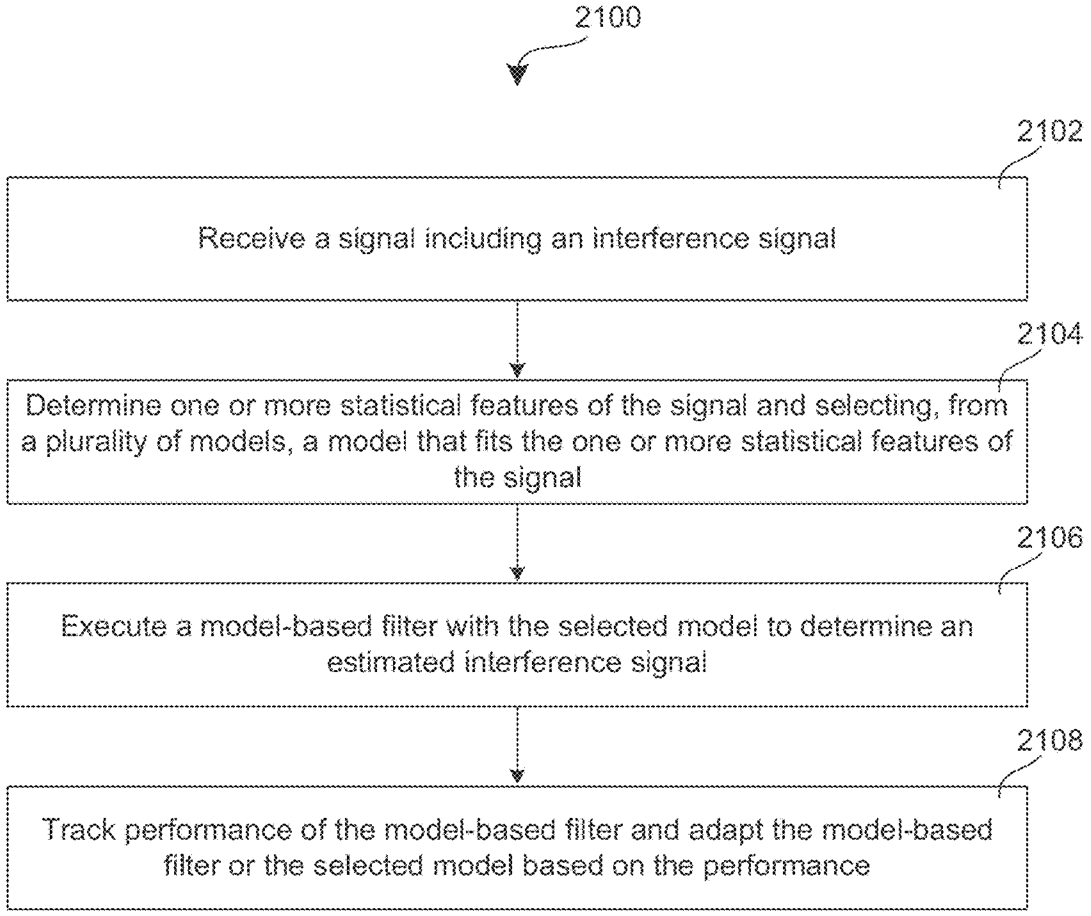
FIG. 21 shows a second exemplary method of processing signals according to some aspects.

FIG. 21 shows method 2100 for processing signals. As shown in FIG. 21, method 2100 includes receiving a signal including an interference signal (2102), determining one or more statistical features of the signal and selecting, from a plurality of models, a model that fits the one or more statistical features of the signal (2104), executing a model-based filter with the selected model to determine an estimated interference signal (2106), and tracking performance of the model-based filter and adapting the model-based filter or the selected model based on the performance (2108).

Figure 22:
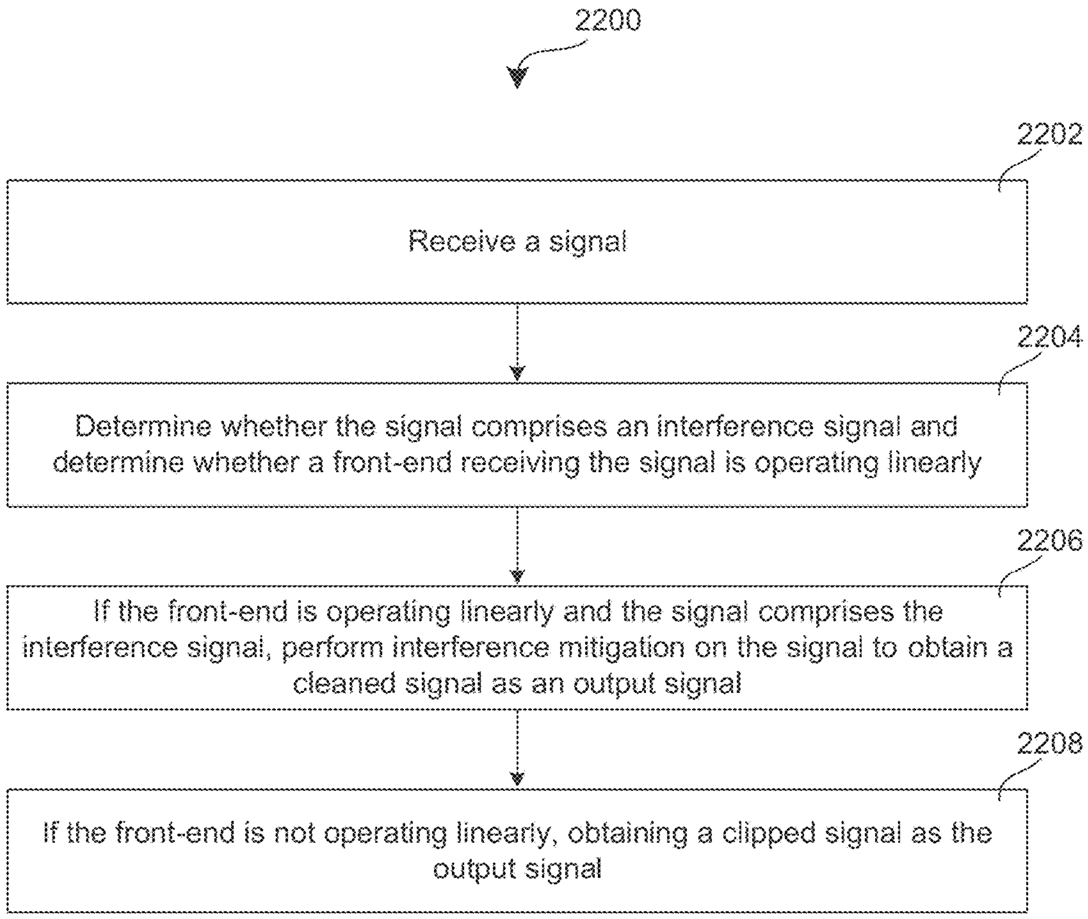
FIG. 22 shows a third exemplary method of processing signals according to some aspects.

FIG. 22 shows method 2200 for processing signals. As shown in FIG. 22, method 2200 includes receiving a signal (2202), determining whether the signal includes an interference signal and determining whether a front-end receiving the signal is operating linearly (2204), if the front-end is operating linearly and the signal includes the interference signal, performing interference mitigation on the signal to obtain a cleaned signal as an output signal (2206), and if the front-end is not operating linearly, obtaining a clipped signal as the output signal (2208).

Figure 23:
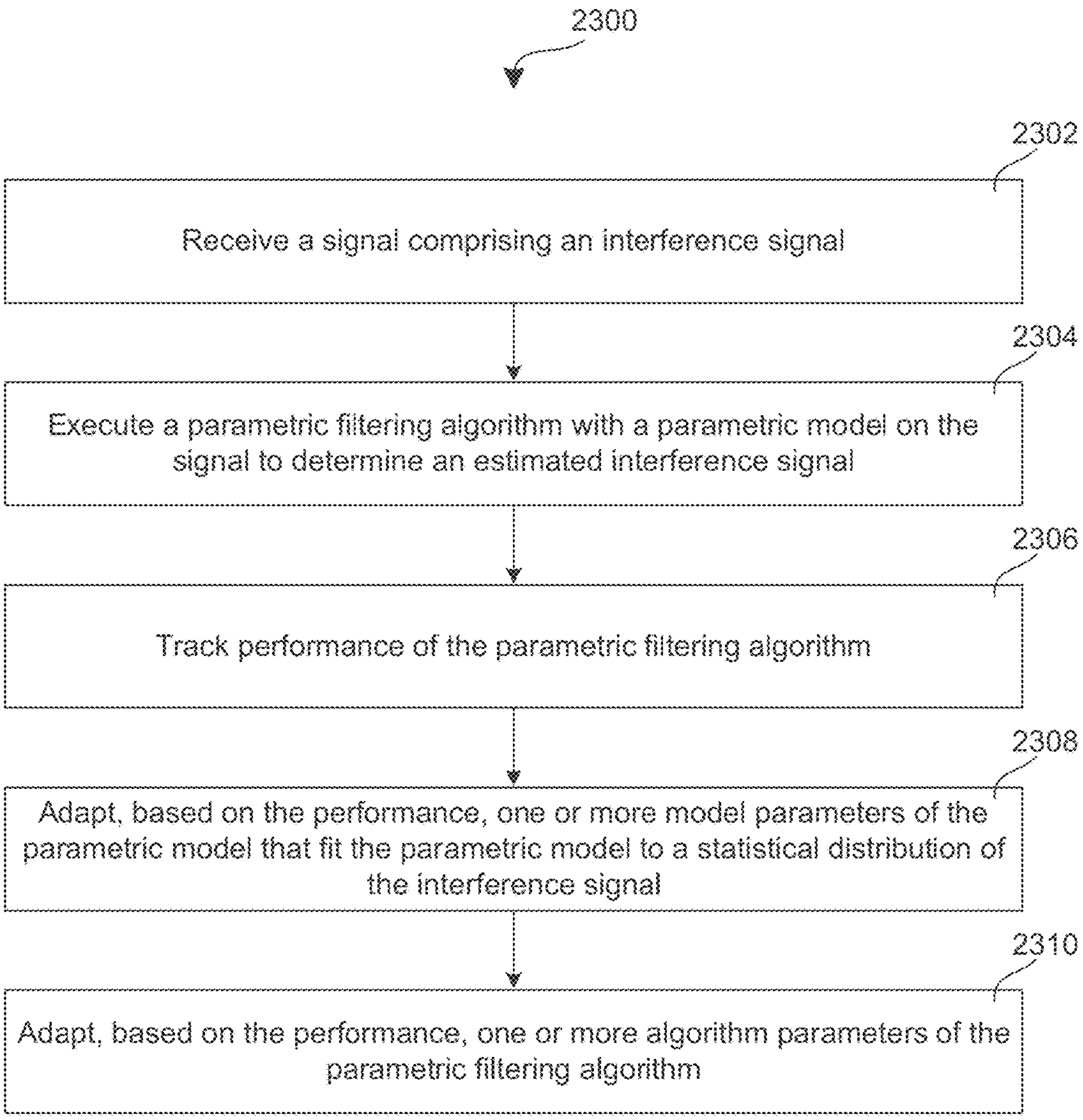
FIG. 23 shows a fourth exemplary method of processing signals according to some aspects.

FIG. 23 shows method 2300 for processing signals. As shown in FIG. 23, method 2300 includes receiving a signal including an interference signal (2302), executing a parametric filtering algorithm with a parametric model on the signal to determine an estimated interference signal (2304), tracking performance of the parametric filtering algorithm (2306), adapting, based on the performance, one or more model parameters of the parametric model that fit the parametric model to a statistical distribution of the interference signal (2308), and adapting, based on the performance, one or more algorithm parameters of the parametric filtering algorithm (2310).

The following examples pertain to further aspects of this disclosure:

Example 1 is a method of processing signals, the method including receiving a signal including a target signal, executing a single-moment filter based on a current measurement sample of the signal and a model of the target signal to obtain a single-moment state estimate and a single-moment state estimate error covariance for the target signal, determining a multi-moment state estimate error covariance for the target signal based on a prior single-moment state estimate error covariance, corresponding to a sample prior to the current measurement sample, and the single-moment state estimate error covariance, executing a multi-moment filter extension based on the current measurement sample and the multi-moment state estimate error covariance to obtain a multi-moment state estimate, and determining an estimate for the target signal based on the multi-moment state estimate.

In Example 2, the subject matter of Example 1 can optionally include wherein the signal includes the target signal and a noise signal.

In Example 3, the subject matter of Example 2 can optionally include wherein the target signal is a non-Gaussian signal and the noise signal is a Gaussian signal.

In Example 4, the subject matter of Example 3 can optionally include wherein the noise signal is a white Gaussian signal or a colored Gaussian signal with unknown coloring.

In Example 5, the subject matter of any one of Examples 1 to 4 can optionally include wherein the model is a stochastic model or a chaotic model.

In Example 6, the subject matter of any one of Examples 1 to 5 can optionally include wherein executing the single-moment filter includes executing a single-moment prediction stage, based on the model of the target signal, to obtain a single-moment predicted state estimate and a single-moment predicted state estimate error covariance for the target signal, and executing a single-moment correction stage, based on the single-moment predicted state estimate, the single-moment predicted state estimate error covariance, and the current measurement sample, to obtain a single-moment updated state estimate and a single-moment updated state estimate error covariance.

In Example 7, the subject matter of Example 6 can optionally include wherein executing the single-moment prediction stage includes executing the single-moment prediction stage based on the model of the target signal, a single-moment updated state estimate from a sample immediately prior to the current measurement sample, and a single-moment updated state estimate error covariance from the sample immediately prior to the current measurement sample.

In Example 8, the subject matter of Example 6 can optionally include wherein the single-moment state estimate error covariance is the single-moment predicted state estimate error covariance, and wherein the single-moment state estimate is the single-moment predicted state estimate or the single-moment updated state estimate.

In Example 9, the subject matter of any one of Examples 1 to 8 can optionally include wherein determining the multi-moment state estimate error covariance includes determining a multi-moment stationary posterior cumulant function value based on delay between the current measurement sample and the sample prior to the current measurement sample, and renormalizing the single-moment state estimate error covariance with the multi-moment stationary posterior cumulant function value and the prior single-moment state estimate error covariance.

In Example 10, the subject matter of Example 9 can optionally include wherein the prior single-moment state estimate error covariance is a single-moment predicted state estimate error covariance or a single-moment updated state estimate error covariance from the sample prior to the current measurement sample.

In Example 11, the subject matter of any one of Examples 1 to 8 can optionally include wherein determining the multi-moment state estimate error covariance includes retrieving the prior single-moment state estimate error covariance and one or more additional prior single-moment state estimate error covariances from a buffer, wherein the one or more additional prior single-moment state estimate error covariances are from one or more other samples prior to the current measurement sample, determining a multi-moment stationary posterior cumulant function value based on the respective delays between the current measurement sample and the one or more other samples prior to the current measurement sample, and renormalizing the single-moment state estimate error covariance with the multi-moment stationary posterior cumulant function value, the prior single-moment state estimate error covariance, and the one or more additional prior single-moment state estimate error covariances to obtain the multi-moment state estimate error covariance.

In Example 12, the subject matter of Example 11 can optionally include wherein the one or more additional prior single-moment state estimate error covariances are single-moment predicted state estimate error covariances or single-moment updated state estimate error covariances from the one or more other samples prior to the current measurement sample.

In Example 13, the subject matter of Example 11 or 12 can optionally further include storing a single-moment predicted state estimate error covariance or a single-moment updated state estimate error covariance from the current measurement sample in the buffer.

In Example 14, the subject matter of any one of Examples 1 to 13 can optionally include wherein executing the multi-moment filter extension includes executing a multi-moment prediction stage, based on the model of the target signal, to obtain a multi-moment predicted state estimate, and executing a multi-moment correction stage, based on the multi-moment predicted state estimate, the multi-moment state estimate error covariance, and the current measurement sample, to obtain a multi-moment updated state estimate and a multi-moment updated state estimate error covariance, wherein the multi-moment state estimate is the multi-moment updated state estimate.

In Example 15, the subject matter of Example 14 can optionally include wherein executing the multi-moment prediction stage includes executing the multi-moment prediction stage based on the model of the target signal, a multi-moment updated state estimate from a sample immediately prior to the current measurement sample, and a multi-moment updated state estimate error covariance from the sample immediately prior to the current measurement sample.

In Example 16, the subject matter of Example 14 or 15 can optionally include wherein executing the multi-moment correction stage includes applying an output operator of the model of the target signal to the multi-moment predicted state estimate to obtain a predicted output, comparing the predicted output to the current measurement sample to obtain a measurement residual, determining a weighted measurement residual based on the multi-moment state estimate error covariance and a measurement noise covariance of the current measurement sample, and combining the multi-moment predicted state estimate and the weighted measurement residual to obtain the multi-moment updated state estimate.

In Example 17, the subject matter of any one of Examples 1 to 16 can optionally include wherein determining the estimate for the target signal based on the multi-moment state estimate includes determining the estimate for the target signal by applying an output operator to the multi-moment state estimate, where the output operator defines a relationship between the target signal and the current measurement sample according to the model of the target signal.

In Example 18, the subject matter of any one of Examples 1 to 17 can optionally include wherein the target signal is radio frequency interference (RFI), the method further including removing the estimate of the target signal from the signal to obtain a cleaned signal.

In Example 19, the subject matter of Example 18 can optionally include wherein the signal further includes an information signal.

In Example 20, the subject matter of any one of Examples 1 to 19 can optionally further include tracking performance of the single-moment filter or the multi-moment filter extension over time and adapting the single-moment filter, the multi-moment filter extension, or the model of the target signal based on the performance.

In Example 21, the subject matter of Example 20 can optionally include wherein adapting the single-moment filter, the multi-moment filter extension, or the model of the target signal based on the performance includes adapting the single-moment filter, the multi-moment filter extension, or the model of the target signal based on an internal variable of the single-moment filter or the multi-moment filter extension.

In Example 22, the subject matter of Example 21 can optionally include wherein the internal variable is a prior or current state estimate error covariance of the single-moment filter or the multi-moment filter extension.

In Example 23, the subject matter of any one of Examples 1 to 19 can optionally further include applying an output operator of the model of the target signal to a multi-moment predicted state estimate to obtain a predicted output, comparing the predicted output to the current measurement sample to obtain a measurement residual, and adapting the single-moment filter, the multi-moment filter extension, or the model of the target signal based on the measurement residual.

In Example 24, the subject matter of any one of Examples 1 to 19 can optionally further include prior to executing the single-moment filter, determining one or more statistical features of the signal and selecting, from a plurality of models for the target signal, a model that fits the one or more statistical features of the signal, and using the selected model as the model of the target signal when executing the single-moment filter and the multi-moment filter extension.

In Example 25, the subject matter of Example 24 can optionally include wherein the plurality of models are parametric models, the method further including tracking performance of the single-moment filter or the multi-moment filter extension over time and adapting one or more parameters of the model of the target signal based on the performance.

In Example 26, the subject matter of any one of Examples 1 to 25 can optionally include wherein the single-moment filter and the multi-moment filter extension are nonlinear filters.

In Example 27, the subject matter of any one of Examples 1 to 25 can optionally include wherein the single-moment filter and the multi-moment filter extension are nonlinear Markov model-based filters.

Example 28 is a method of processing signals, the method including receiving a signal including an interference signal, determining one or more statistical features of the signal and selecting, from a plurality of models, a model that fits the one or more statistical features of the signal, executing a model-based filter with the selected model to determine an estimated interference signal, and tracking performance of the model-based filter and adapting the model-based filter or the selected model based on the performance.

In Example 29, the subject matter of Example 28 can optionally further include removing the estimated interference signal from the signal to obtain a cleaned signal.

In Example 30, the subject matter of Example 28 or 29 can optionally include wherein the interference signal is radio frequency interference (RFI).

In Example 31, the subject matter of any one of Examples 28 to 30 can optionally include wherein the signal includes the interference signal and a desired information signal.

In Example 32, the subject matter of Example 31 can optionally include wherein the signal further includes a thermal noise signal.

In Example 33, the subject matter of any one of Examples 28 to 32 can optionally include wherein the model is a stochastic model or a chaotic model.

In Example 34, the subject matter of any one of Examples 28 to 33 can optionally include wherein the plurality of models are parametric models.

In Example 35, the subject matter of any one of Examples 28 to 34 can optionally include wherein the selected model is a parametric model, and wherein adapting the selected model based on the performance includes adapting a parameter of the selected model.

In Example 36, the subject matter of any one of Examples 28 to 35 can optionally include wherein each of the plurality of models is a parametric model fit to a different statistical distribution family.

In Example 37, the subject matter of Example 36 can optionally include wherein selecting, from the plurality of models, the model that fits the one or more statistical features of the signal includes classifying the signal as belonging to a statistical distribution family based on its one or more statistical features, and selecting one of the plurality of models that is fit to the statistical distribution family as the selected model.

In Example 38, the subject matter of any one of Examples 28 to 37 can optionally include wherein the plurality of models are parametric models with different types of parameters, and wherein adapting the selected model based on the performance includes adapting the selected model based on its specific types of parameters.

In Example 39, the subject matter of any one of Examples 28 to 38 can optionally include wherein the one or more statistical features of the signal include a probability density function (PDF), an autocorrelation function (ACF), or a higher-order statistical cumulant function.

In Example 40, the subject matter of any one of Examples 28 to 39 can optionally include wherein selecting, from the plurality of models, the model that fits the one or more statistical features of the signal includes comparing the one or more statistical features of the signal to one or more pre-computed statistical features of the plurality of models to identify the selected model as one of the plurality of models with one or more similar statistical features.

In Example 41, the subject matter of any one of Examples 28 to 40 can optionally include wherein executing the model-based filter includes executing a prediction stage based on the selected model to obtain a predicted state estimate and a predicted state estimate error covariance for the interference signal, and executing a correction stage based on the predicted state estimate, the predicted state estimate error covariance, and a current measurement sample of the signal to obtain an updated state estimate and an updated state estimate error covariance, where the estimated interference signal is based on the updated state estimate.

In Example 42, the subject matter of Example 41 can optionally include wherein executing the model-based filter further includes applying an output operator of the selected model to the updated state estimate to obtain the estimated interference signal.

In Example 43, the subject matter of Example 41 or 42 can optionally include wherein executing the prediction stage is based on the selected model, an updated state estimate from a correction stage of a prior measurement sample, and an updated state estimate error covariance from the correction stage of the prior measurement sample.

In Example 44, the subject matter of any one of Examples 41 to 43 can optionally include wherein tracking performance of the model-based filter and adapting the model-based filter or the selected model based on the performance includes adapting the model-based filter based on the predicted state estimate and the current measurement sample.

In Example 45, the subject matter of any one of Examples 41 to 43 can optionally include wherein tracking performance of the model-based filter and adapting the model-based filter or the selected model based on the performance includes applying an output operator of the selected model to the predicted state estimate to obtain a predicted output, comparing the predicted output to the current measurement sample to obtain a measurement residual, and adapting the model-based filter or the selected model based on the measurement residual.

In Example 46, the subject matter of any one of Examples 41 to 45 can optionally include wherein the prediction stage and the correction stage are defined by a filtering algorithm, and wherein adapting the model-based filter or the selected model based on the performance includes adapting a parameter of the filtering algorithm.

In Example 47, the subject matter of any one of Examples 28 to 46 can optionally include wherein adapting the model-based filter or the selected model based on the performance includes adapting the model-based filter or the selected model based on an internal variable of the model-based filter.

In Example 48, the subject matter of Example 47 can optionally include wherein the internal variable is a prior or current state estimate error covariance of the model-based filter.

In Example 49, the subject matter of any one of Examples 28 to 48 can optionally include wherein executing the model-based filter includes executing a single-moment model-based filter with the selected model based on a current measurement sample of the signal to obtain a single moment state estimate and a single-moment state estimate error covariance, determining a multi-moment state estimate error covariance for the interference signal based on a prior single-moment state estimate error covariance, corresponding to a sample prior to the current measurement sample, and the single-moment state estimate error covariance, executing a multi-moment model-based filter extension based on the current measurement sample and the multi-moment state estimate error covariance to obtain a multi-moment state estimate, and determining the estimated interference signal with the multi-moment state estimate and the selected model.

In Example 50, the subject matter of any one of Examples 28 to 49 can optionally further include determining, at a first time, whether the signal includes the interference signal and whether a front-end receiving the signal is operating linearly, if, at the first time, the front-end is operating linearly and the signal includes the interference signal, executing the model-based filter with the selected model to determine an estimated interference signal and removing the estimated interference signal from the signal to obtain an output signal for the first time, and if, at the first time, the front-end is not operating linearly, obtaining a clipped signal as the output signal for the first time.

Example 51 is a method of processing signals, the method including receiving a signal, determining whether the signal includes an interference signal and determining whether a front-end receiving the signal is operating linearly, if the front-end is operating linearly and the signal includes the interference signal, performing interference mitigation on the signal to obtain a cleaned signal as an output signal, and if the front-end is not operating linearly, obtaining a clipped signal as the output signal.

In Example 52, the subject matter of Example 51 can optionally include wherein the clipped signal is a zero-valued signal.

In Example 53, the subject matter of Example 51 or 52 can optionally include wherein performing interference mitigation on the signal to obtain the cleaned signal as the output signal includes determining one or more statistical features of the signal, selecting, from a plurality of models, a model that fits the one or more statistical features of the signal, executing a model-based filter with the selected model to determine an estimated interference signal, and removing the estimated interference signal from the signal to obtain the output signal.

In Example 54, the subject matter of any one of Examples 51 to 53 can optionally include wherein the interference signal is radio frequency interference (RFI).

In Example 55, the subject matter of any one of Examples 51 to 54 can optionally include wherein the signal includes the interference signal and a desired information signal.

In Example 56, the subject matter of any one of Examples 53 to 55 can optionally include wherein the model is a stochastic model or a chaotic model.

In Example 57, the subject matter of any one of Examples 53 to 56 can optionally include wherein executing the model-based filter includes executing a prediction stage based on the selected model to obtain a predicted state estimate and a predicted state estimate error covariance for the interference signal, and executing a correction stage based on the predicted state estimate, the predicted state estimate error covariance, and a current measurement sample of the signal to obtain an updated state estimate and an updated state estimate error covariance, where the estimated interference signal is based on the updated state estimate.

In Example 58, the subject matter of any one of Examples 53 to 57 can optionally further include tracking performance of the model-based filter and adapting the model-based filter or the selected model based on the performance.

In Example 59, the subject matter of Example 58 can optionally include wherein tracking performance of the model-based filter and adapting the model-based filter or the selected model based on the performance includes evaluating a measurement residual of a prediction stage of the model-based filter and adapting the model-based filter or the selected model based on the measurement residual.

In Example 60, the subject matter of any one of Examples 53 to 56 can optionally include wherein executing the model-based filter includes executing a single-moment filter with the selected model based on a current measurement sample of the signal to obtain a single moment state estimate and a single-moment state estimate error covariance, determining a multi-moment state estimate error covariance for the interference signal based on a prior single-moment state estimate error covariance, corresponding to a sample prior to the current measurement sample, and the single-moment state estimate error covariance, executing a multi-moment model-based filter extension based on the current measurement sample and the multi-moment state estimate error covariance to obtain a multi-moment state estimate, and determining the estimated interference signal with the multi-moment state estimate and the selected model.

In Example 61, the subject matter of any one of Examples 51 to 60 can optionally include obtaining the clipped signal as the output signal includes obtaining the clipped signal as the output signal if the front-end is not operating linearly and the communication signal includes the interference signal.

In Example 62, the subject matter of any one of Examples 51 to 61 can optionally further include if the front-end is operating linearly and the signal does not include the interference signal, providing the signal as the output signal.

In Example 63, the subject matter of Example 62 can optionally further include disabling interference mitigation functionality when the front-end is operating linearly and the signal does not include the interference signal.

In Example 64, the subject matter of any one of Examples 51 to 63 can optionally include wherein determining whether the signal includes the interference signal and determining whether the front-end receiving the signal is operating linearly includes determining one or more diversity metrics of the signal, comparing the one or more diversity metrics to one or more precomputed diversity metrics associated with scenarios where the signal does or does not include the interference signal and is or is not operating linearly, and determining whether the signal includes the interference signal and determining whether the front-end receiving the signal is operating linearly based on the comparing.

In Example 65, the subject matter of any one of Examples 51 to 63 can optionally include wherein determining whether the signal includes the interference signal and determining whether the front-end receiving the signal is operating linearly includes determining one or more diversity metrics of the signal, evaluating the one or more diversity metrics according to one or more decision rules to determine whether a majority of the one or more diversity metrics indicate a first interference scenario where the front-end is operating nonlinearly, a second interference scenario where the front-end is operating linearly and the signal includes the interference signal, and a third interference scenario where the front-end is operating linearly and the signal does not include the interference signal.

In Example 66, the subject matter of Example 65 can optionally include wherein the one or more decision rules are predetermined based on offline measurements.

In Example 67, the subject matter of any one of Examples 64 to 66 can optionally include wherein the one or more diversity metrics include a power spectral density (PSD), a probability density function (PDF), or an autocorrelation function (ACF).

In Example 68, the subject matter of any one of Examples 51 to 63 can optionally include wherein determining whether the front-end receiving the signal is operating linearly includes comparing a power level of the signal to a signal power threshold, determining that the front-end is operating linearly if the power level is below the signal power threshold, and determining that the frond-end is not operating linearly if the power level is above the signal power threshold.

In Example 69, the subject matter of Example 68 can optionally include wherein the signal power threshold is based on pre-characterized information of the front-end about when the front-end transitions from linear to nonlinear operation.

In Example 70, the subject matter of Example 68 or 69 can optionally further include measuring the power level of the signal with an envelope detector or a power detector in the front-end.

In Example 71, the subject matter of any one of Examples 51 to 63 or 68 to 70 can optionally include wherein determining whether the signal includes the interference signal includes performing a Gaussianity test on the signal to determine a test result, determining that the signal includes the interference signal if the test result is outside of a threshold from a predefined Gaussianity metric, and determining that the signal does not include the interference signal if the test result is within the threshold of the predefined Gaussianity metric.

In Example 72, the subject matter of Example 71 can optionally include wherein the Gaussianity metric is based on higher-order cumulants, and wherein performing the Gaussianity test on the signal includes calculating a higher-order cumulant of the signal.

Example 73 is a signal processing device including a single moment prediction and correction engine configured to receive a signal including a target signal, and to execute a single-moment filter, based on a current measurement sample of the signal and a model of the target signal, to obtain a single-moment state estimate and a single-moment state estimate error covariance for the target signal, a covariance renormalizer configured to determine a multi-moment state estimate error covariance for the target signal based on a prior single-moment state estimate error covariance, corresponding to a sample prior to the current measurement sample, and the single-moment state estimate error covariance, and a multi-moment prediction and correction engine configured to execute a multi-moment filtering extension based on the current measurement sample and the multi-moment state estimate error covariance to obtain a multi-moment state estimate, and further configured to determine an estimate for the target signal based on the multi-moment state estimate.

In Example 74, the subject matter of Example 73 can optionally include wherein the signal includes the target signal and a noise signal.

In Example 75, the subject matter of Example 74 can optionally include wherein the target signal is a non-Gaussian signal and the noise signal is a Gaussian signal.

In Example 76, the subject matter of Example 75 can optionally include wherein the noise signal is a white Gaussian signal or a colored Gaussian signal with unknown coloring.

In Example 77, the subject matter of any one of Examples 73 to 76 can optionally include wherein the model is a stochastic model or a chaotic model.

In Example 78, the subject matter of any one of Examples 73 to 77 can optionally include wherein the single-moment prediction and correction engine is configured to execute the single-moment filter by executing a single-moment prediction stage, based on the model of the target signal, to obtain a single-moment predicted state estimate and a single-moment predicted state estimate error covariance for the target signal, and by executing a single-moment correction stage, based on the single-moment predicted state estimate, the single-moment predicted state estimate error covariance, and the current measurement sample, to obtain a single-moment updated state estimate and a single-moment updated state estimate error covariance.

In Example 79, the subject matter of Example 78 can optionally include wherein the single-moment prediction and correction engine is configured to execute the single-moment prediction stage based on the model of the target signal, a single-moment updated state estimate from a sample immediately prior to the current measurement sample, and a single-moment updated state estimate error covariance from the sample immediately prior to the current measurement sample.

In Example 80, the subject matter of Example 79 can optionally include wherein the single-moment state estimate error covariance is the single-moment predicted state estimate error covariance, and the single-moment state estimate is the single-moment predicted state estimate or the single-moment updated state estimate.

In Example 81, the subject matter of any one of Examples 73 to 80 can optionally further include a cumulant determiner configured to determine a multi-moment stationary posterior cumulant function value based on a delay between the current measurement sample and the sample prior to the current measurement sample, wherein the covariance renormalizer is configured to determine the multi-moment state estimate error covariance by renormalizing the single-moment state estimate error covariance with the multi-moment stationary posterior cumulant function value and the prior single-moment state estimate error covariance.

In Example 82, the subject matter of Example 81 can optionally include wherein the prior single-moment state estimate error covariance is a single-moment predicted state estimate error covariance or a single-moment updated state estimate error covariance from the sample prior to the current measurement sample.

In Example 83, the subject matter of any one of Examples 73 to 82 can optionally further include a buffer configured to store the prior single-moment state estimate error covariance and one or more additional prior single-moment state estimate error covariances, wherein the one or more additional prior single-moment state estimate error covariances are from one or more other samples prior to the current measurement sample, and a cumulant determiner configured to determine a multi-moment stationary posterior cumulant function value based on the respective delays between the current measurement sample and the one or more other samples prior to the current measurement sample, wherein the covariance renormalizer is configured to renormalize the single-moment state estimate error covariance with the multi-moment stationary posterior cumulant function value, the prior single-moment state estimate error covariance, and the one or more additional prior single-moment state estimate error covariances to obtain the multi-moment state estimate error covariance.

In Example 84, the subject matter of Example 83 can optionally include wherein the one or more additional prior single-moment state estimate error covariances are single-moment predicted state estimate error covariances or single-moment updated state estimate error covariances from the one or more other samples prior to the current measurement sample.

In Example 85, the subject matter of Example 83 or 84 can optionally include wherein the buffer is configured to store a single-moment predicted state estimate error covariance or a single-moment updated state estimate error covariance from the current measurement sample.

In Example 86, the subject matter of Example 85 can optionally further include a selector configured to receive the single-moment predicted state estimate error covariance and the single-moment updated state estimate error covariance from the current measurement sample, and to provide one of the single-moment predicted state estimate error covariance or the single-moment updated state estimate error covariance from the current measurement sample to the buffer based on a mode selection signal.

In Example 87, the subject matter of any one of Examples 73 to 86 can optionally include wherein the multi-moment prediction and correction engine is configured to execute the multi-moment filter extension by executing a multi-moment prediction stage, based on the model of the target signal, to obtain a multi-moment predicted state estimate, and by executing a multi-moment correction stage, based on the multi-moment predicted state estimate, the multi-moment state estimate error covariance, and the current measurement sample, to obtain a multi-moment updated state estimate and am multi-moment updated state estimate error covariance, wherein the multi-moment state estimate is the multi-moment updated state estimate.

In Example 88, the subject matter of Example 87 can optionally include wherein the multi-moment prediction and correction engine is configured to execute the multi-moment prediction stage based on the model of the target signal, a multi-moment updated state estimate from a sample immediately prior to the current measurement sample, and a multi-moment updated state estimate error covariance from the sample immediately prior to the current measurement sample.

In Example 89, the subject matter of Example 87 or 88 can optionally include wherein the multi-moment prediction and correction engine is configured to execute the multi-moment correction stage by applying an output operator of the model of the target signal to the multi-moment predicted state estimate to obtain a predicted output, comparing the predicted output to the current measurement sample to obtain a measurement residual, determining a weighted measurement residual based on the multi-moment state estimate error covariance and a measurement noise covariance of the current measurement sample, and combining the multi-moment predicted state estimate and the weighted measurement residual to obtain the multi-moment updated state estimate.

In Example 90, the subject matter of any one of Examples 73 to 89 can optionally include wherein the multi-moment prediction and correction engine is configured to determine the estimate for the target signal based on the multi-moment state estimate by determining the estimate for the target signal by applying an output operator to the multi-moment state estimate, where the output operator defines a relationship between the target signal and the current measurement sample according to the model of the target signal.

In Example 91, the subject matter of any one of Examples 73 to 90 can optionally include wherein the target signal is radio frequency interference (RFI), the signal processing device further including a subtractor configured to remove the estimate of the target signal from the signal to obtain a cleaned signal.

In Example 92, the subject matter of Example 91 can optionally include wherein the signal further includes an information signal.

In Example 93, the subject matter of any one of Examples 73 to 92 can optionally further include an adaptation engine configured to track performance of the single-moment filter or the multi-moment filter extension over time and to adapt the single-moment filter, the multi-moment filter extension, or the model of the target signal based on the performance.

In Example 94, the subject matter of Example 93 can optionally include wherein the adaptation engine is configured to perform the tracking and adapting based on the signal and an internal variable of the single-moment filter or the multi-moment filter extension.

In Example 95, the subject matter of Example 94 can optionally include wherein the internal variable is a prior or current state estimate error covariance of the single-moment filter or the multi-moment filter extension.

In Example 96, the subject matter of any one of Examples 73 to 92 can optionally include wherein the multi-moment prediction and correction engine is configured to, during executing of the multi-moment filter extension, apply an output operator of the model of the target signal to a multi-moment predicted state estimate to obtain a predicted output, and to compare the predicted output to the current measurement sample to obtain a measurement residual, the signal processing device further including an adaptation engine configured to adapt the single-moment filter, the multi-moment filter extension, or the model of the target signal based on the measurement residual.

In Example 97, the subject matter of any one of Examples 73 to 96 can optionally further include a model detector configured to, prior to execution of the single-moment filter, determine one or more statistical features of the signal and select, from a plurality of models for the target signal, a model that fits the one or more statistical features of the signal, wherein the single-moment prediction and correction engine and the multi-moment prediction and correction engine are configured to use the selected model as the model of the target signal.

In Example 98, the subject matter of Example 97 can optionally include wherein the plurality of models are parametric models, the signal processing device further including an adaptation engine configured to track performance of the single-moment filter or the multi-moment filter extension over time and adapt one or more parameters of the model of the target signal based on the performance.

In Example 99, the subject matter of any one of Examples 73 to 98 can optionally include wherein the single-moment filter and the multi-moment filter extension are nonlinear filters.

In Example 100, the subject matter of any one of Examples 73 to 99 can optionally include wherein the single-moment filter and the multi-moment filter extension are nonlinear Markov model-based filters.

Example 101 is a communication device including a model detector configured to receive a signal including an interference signal, determine one or more statistical features of the signal, and select, from a plurality of models, a model that fits the one or more statistical features of the signal, a filter configured to execute model-based filtering with the selected model to determine an estimated interference signal, and an adaptation engine configured to track performance of the model-based filtering and to adapt the model-based filtering or the selected model based on the performance.

In Example 102, the subject matter of Example 101 can optionally further include a front-end configured to provide the signal to the model detector.

In Example 103, the subject matter of Example 101 or 102 can optionally further include subtractor configured to remove the estimated interference signal from the model detector to obtain a cleaned signal.

In Example 104, the subject matter of Example 103 can optionally further include a baseband processor, wherein the subtractor is configured to provide the cleaned signal to the baseband processor.

In Example 105, the subject matter of any one of Examples 101 to 104 can optionally include wherein the interference signal is radio frequency interference (RFI).

In Example 106, the subject matter of any one of Examples 101 to 105 can optionally include wherein the signal includes the interference signal and a desired information signal.

In Example 107, the subject matter of Example 106 can optionally include wherein the signal further includes a thermal noise signal.

In Example 108, the subject matter of any one of Examples 101 to 107 can optionally include wherein the model is a stochastic model or a chaotic model.

In Example 109, the subject matter of any one of Examples 101 to 108 can optionally include wherein the plurality of models are parametric models.

In Example 110, the subject matter of any one of Examples 101 to 109 can optionally include wherein the selected model is a parametric model, and wherein the adaptation engine is configured to adapt the selected model based on the performance by adapting a parameter of the selected model.

In Example 111, the subject matter of any one of Examples 101 to 110 can optionally include wherein each of the plurality of models is a parametric model fit to a different statistical distribution family.

In Example 112, the subject matter of Example 111 can optionally include wherein the model detector is configured to select, from the plurality of models, the model that fits the one or more statistical features of the signal by classifying the signal as belonging to a statistical distribution family based on its one or more statistical features, and selecting one of the plurality of models that is fit to the statistical distribution family as the selected model.

In Example 113, the subject matter of any one of Examples 101 to 112 can optionally include wherein the plurality of models are parametric models with different types of parameters, and wherein the adaptation engine is configured to adapt the selected model based on the performance by adapting the selected model based on its specific types of parameters.

In Example 114, the subject matter of any one of Examples 101 to 113 can optionally include wherein the one or more statistical features of the signal include a probability density function (PDF), an autocorrelation function (ACF), or a higher-order statistical cumulant function.

In Example 115, the subject matter of any one of Examples 101 to 114 can optionally include wherein the model detector is configured to select, from the plurality of models, the model that fits the one or more statistical features of the signal by comparing the one or more statistical features of the plurality of models to identify the selected model as one of the plurality of models with one or more similar statistical features.

In Example 116, the subject matter of any one of Examples 101 to 115 can optionally include wherein the filter includes a prediction engine configured to execute a prediction stage based on the selected model to obtain a predicted state estimate and a predicted state estimate error covariance for the interference signal, and a correction engine configured to execute a correction stage based on the predicted state estimate, the predicted state estimate error covariance, and a current measurement sample of the signal to obtain an updated state estimate and an updated state estimate error covariance, where the estimated interference signal is based on the updated state estimate.

In Example 117, the subject matter of Example 116 can optionally include wherein the correction engine is configured to apply an output operator by applying an output operator of the selected model to the updated state estimate to obtain the estimated interference signal.

In Example 118, the subject matter of Example 116 or 117 can optionally include wherein the prediction engine is configured to execute the prediction stage based on the selected model, an updated state estimate from a correction stage of a prior measurement sample, and an updated state estimate error covariance from the correction stage of the prior measurement sample.

In Example 119, the subject matter of any one of Examples 116 to 118 can optionally include wherein the adaptation engine is configured to track the performance of the model-based filtering and adapt the model-based filtering or the selected model based on the performance by adapting the model-based filtering based on the predicted state estimate and the current measurement sample.

In Example 120, the subject matter of any one of Examples 116 to 118 can optionally include wherein the prediction engine is further configured to, as part of the prediction stage, apply an output operator of the selected model to the predicted state estimate to obtain a predicted output, and to compare the predicted output to the current measurement sample to obtain a measurement residual, wherein the adaptation engine is configured to track the performance of the model-based filtering and adapt the model-based filtering or the selected model based on the measurement residual.

In Example 121, the subject matter of any one of Examples 116 to 120 can optionally include wherein the prediction stage and the correction stage are defined by a filtering algorithm, and wherein the adaptation engine is configured to adapt the model-based filtering or the selected model based on the performance by adapting a parameter of the filtering algorithm.

In Example 122, the subject matter of any one of Examples 101 to 121 can optionally include wherein the adaptation engine is configured to adapt the model-based filtering or the selected model based on an internal variable of the model-based filtering.

In Example 123, the subject matter of Example 122 can optionally include wherein the internal variable is a prior or current state estimate error covariance of the model-based filter.

In Example 124, the subject matter of any one of Examples 101 to 122 can optionally include wherein the filter includes a single-moment prediction and correction engine configured to execute a single-moment model-based filter with the selected model based on a current measurement sample of the signal to obtain a single moment state estimate and a single-moment state estimate error covariance, a covariance renormalizer configured to determine a multi-moment state estimate error covariance for the interference signal based on a prior single-moment state estimate error covariance, corresponding to a sample prior to the current measurement sample, and the single-moment state estimate error covariance, and a multi-moment prediction and correction engine configured to execute a multi-moment model-based filter extension based on the current measurement sample and the multi-moment state estimate error covariance to obtain a multi-moment state estimate, and to determine the estimated interference signal with the multi-moment state estimate and the selected model.

In Example 125, the subject matter of any one of Examples 101 to 124 can optionally further include a scenario classifier configured to determine, at a first time, whether the signal includes the interference signal and whether a front-end receiving the signal is operating linearly, if, at the first time, the front-end is operating linearly and the signal includes the interference signal, control the filter to execute the model-based filter with the selected model to determine an estimated interference signal and to control the communication device to remove the estimated interference signal from the signal to obtain an output signal for the first time, and if, at the first time, the front-end is not operating linearly, control the communication device to obtain a clipped signal as the output signal for the first time.

Example 126 is a communication device including a scenario classifier configured to determine whether a signal received by the communication device includes an interference signal and to determine whether a front-end receiving the signal is operating linearly, a selector configured to select between a cleaned signal and a clipped signal as an output signal of the communication device, wherein the scenario classifier is further configured to if the front-end is operating linearly and the signal includes the interference signal, control the selector to provide the cleaned signal as the output signal, and if the front-end is not operating linearly, control the selector to provide the clipped signal as the output signal.

In Example 127, the subject matter of Example 126 can optionally include wherein the clipped signal is a zero-valued signal.

In Example 128, the subject matter of Example 126 can optionally further include the front-end, wherein the front-end is configured to perform radio-frequency processing and to provide the signal to the interference mitigator.

In Example 129, the subject matter of any one of Examples 126 to 128 can optionally further include a baseband processor, where the communication processor is configured to provide the output signal to the baseband processor.

In Example 130, the subject matter of any one of Examples 126 to 129 can optionally further include a model detector configured to determine one or more statistical features of the signal, and to select, from a plurality of models, a model that fits the one or more statistical features of the signal, and a filter configured to execute model-based filtering on the signal with the selected model to determine an estimated interference signal, and a subtractor configured to remove the estimated interference signal from the signal to obtain the cleaned signal.

In Example 131, the subject matter of any one of Examples 126 to 130, wherein the interference signal is radio frequency interference (RFI).

In Example 132, the subject matter of any one of Examples 126 to 131 can optionally include wherein the signal includes the interference signal and a desired information signal.

In Example 133, the subject matter of any one of Examples 130 to 132 can optionally include wherein the model is a stochastic model or a chaotic model.

In Example 134, the subject matter of any one of Examples 130 to 133 can optionally include wherein the filter includes a prediction engine configured to execute a prediction stage based on the selected model to obtain a predicted state estimate and a predicted state estimate error covariance for the interference signal, and a correction engine configured to execute a correction stage based on the predicted state estimate, the predicted state estimate error covariance, and a current measurement sample of the signal to obtain an updated state estimate and an updated state estimate error covariance, where the estimated interference signal is based on the updated state estimate.

In Example 135, the subject matter of any one of Examples 130 to 134 can optionally further include tracking performance of the model-based filtering and adapting the model-based filtering or the selected model based on the performance.

In Example 136, the subject matter of Example 135 can optionally include wherein tracking the performance of the model-based filtering and adapting the model-based filtering or the selected model based on the performance includes evaluating a measurement residual of a prediction stage of the model-based filtering and adapting the model-based filtering or the selected model based on the measurement residual.

In Example 137, the subject matter of any one of Examples 130 to 133 can optionally include wherein the filter includes a single-moment prediction and correction engine configured to execute single-moment filtering with the selected model based on a current measurement sample of the signal to obtain a single-moment state estimate and a single moment state estimate error covariance, a covariance renormalizer configured to determine a multi-moment state estimate error covariance for the interference signal based on a prior single-moment state estimate error covariance, corresponding to a sample prior to the current measurement sample, and the single-moment state estimate error covariance, and a multi-moment prediction and correction engine configured to execute multi-moment filtering based on the current measurement sample and the multi-moment state estimate error covariance to obtain a multi-moment state estimate, and to determine the estimated interference signal with the multi-moment state estimate and the selected model.

In Example 138, the subject matter of any one of Examples 126 to 137 can optionally include wherein the scenario classifier is configured to control the selector to provide the clipped signal as the output signal if the front-end is not operating linearly and the communication signal includes the interference signal.

In Example 139, the subject matter of any one of Examples 126 to 138 can optionally include wherein the selector is configured to select between the cleaned signal, the clipped signal, and the signal as the output signal, and wherein the scenario classifier is further configured to, if the front-end is not operating linearly and the communication signal includes the interference signal, control the selector to select the signal as the output signal.

In Example 140, the subject matter of Example 139 can optionally include wherein the scenario classifier is configured to disable interference mitigation functionality of the communication when the front-end is operating linearly and the signal does not include the interference signal.

In Example 141, the subject matter of any one of Examples 126 to 140 can optionally include wherein the scenario classifier is configured to determine whether the signal includes the interference signal and determine whether the front-end receiving the signal is operating linearly by determining one or more diversity metrics of the signal, comparing the one or more diversity metrics to one or more precomputed diversity metrics associated with different scenarios where the signal does or does not include the interference signal and is or is not operating linearly, and determining whether the signal includes the interference signal and determining whether the front-end receiving the signal is operating linearly based on the comparing.

In Example 142, the subject matter of any one of Examples 126 to 141 can optionally include wherein the scenario classifier is configured to determine whether the signal includes the interference signal and determine whether the front-end receiving the signal is operating linearly by determining one or more diversity metrics of the signal, evaluating the one or more diversity metrics according to one or more decision rules to determine whether a majority of the one or more diversity metrics indicate a first interference scenario where the front-end is operating nonlinearly, a second interference scenario where the front-end is operating linearly and the signal includes the interference signal, and a third interference scenario where the front-end is operating linearly and the signal does not include the interference signal.

In Example 143, the subject matter of Example 142 can optionally include wherein the one or more decision rules are predetermined based on offline measurements.

In Example 144, the subject matter of any one of Examples 141 to 143 can optionally include wherein the one or more diversity metrics include a power spectral density (PSD), a probability density function (PDF), or an autocorrelation function (ACF).

In Example 145, the subject matter of any one of Examples 126 to 140 can optionally include wherein the scenario classifier is configured to determine whether the front-end receiving the signal is operating linearly by comparing a power level of the signal to a signal power threshold, determining that the front-end is operating linearly if the power level is below the signal power threshold, and determining that the frond-end is not operating linearly if the power level is above the signal power threshold.

In Example 146, the subject matter of Example 145 can optionally include wherein the signal power threshold is based on pre-characterized information of the front-end about when the front-end transitions from linear to nonlinear operation.

In Example 147, the subject matter of Example 145 or 146 can optionally include wherein the scenario classifier is configured to receive the power level as a measurement from an envelope detector or a power detector in the front-end.

In Example 148, the subject matter of any one of Examples 126 to 140 or 145 to 147 can optionally include wherein the scenario classifier is configured to determine whether the signal includes the interference signal by performing a Gaussianity test on the signal to determine a test result, determining that the signal includes the interference signal if the test result is outside of a threshold from a predefined Gaussianity metric, and determining that the signal does not include the interference signal if the test result is within the threshold of the predefined Gaussianity metric.

In Example 149, the subject matter of Example 148 can optionally include wherein the Gaussianity metric is based on higher-order cumulants, and wherein the scenario classifier is configured to perform the Gaussianity test on the signal by calculating a higher-order cumulant of the signal.

Example 150 is a method of processing signals, the method including receiving a signal including an interference signal, executing a parametric filtering algorithm with a parametric model on the signal to determine an estimated interference signal, tracking performance of the parametric filtering algorithm, adapting, based on the performance, one or more model parameters of the parametric model that fit the parametric model to a statistical distribution of the interference signal, and adapting, based on the performance, one or more algorithm parameters of the parametric filtering algorithm.

In Example 151, the subject matter of Example 150 can optionally further include determining one or more statistical features of the signal and selecting, from a plurality of models, a model that that fits the one or more statistical features of the signal as the parametric model.

In Example 152, the subject matter of Example 151 can optionally include wherein each of the plurality of models is a parametric model that is adaptable to fit different statistical distributions in a statistical distribution family.

In Example 153, the subject matter of Example 151 can optionally include wherein the plurality of models are parametric models with different types of model parameters, and wherein adapting the one or more model parameters of the parametric model includes adapting the one or more model parameters based on their specific type.

In Example 154, the subject matter of any one of Examples 151 to 153 can optionally include wherein the one or more statistical features of the signal include a probability density function (PDF), an autocorrelation function (ACF), or a higher-order statistical cumulant function.

In Example 155, the subject matter of any one of Examples 151 to 153 can optionally include wherein selecting, from the plurality of models, the model that fits the one or more statistical features of the signal as the parametric model includes comparing the one or more statistical features of the signal to one or more pre-computed statistical features of the plurality of models to identify the parametric model as one of the plurality of models with one or more similar statistical features.

In Example 156, the subject matter of any one of Examples 150 to 155 can optionally include wherein executing the parametric filtering algorithm using the parametric model on the signal to determine the estimated interference signal includes executing a prediction stage of the parametric filtering algorithm with the parametric model to obtain a predicted state estimate and a predicted state estimate error covariance for the interference signal, and executing a correction stage of the parametric filtering algorithm based on the predicted state estimate, the predicted state estimate error covariance, and a current measurement sample of the signal to obtain an updated state estimate and an updated state estimate error covariance, where the estimated interference signal is based on the updated state estimate.

In Example 157, the subject matter of Example 156 can optionally include wherein the one or more algorithm parameters determine relative contributions of the predicted state estimate and the current measurement sample to the updated state estimate.

In Example 158, the subject matter of Example 156 or 157 can optionally include wherein adapting the one or more model parameters of the parametric model includes applying an output operator of the parametric model to the predicted state estimate to obtain a predicted output, comparing the predicted output to the current measurement sample to obtain a measurement residual, and adapting the one or more model parameters based on the measurement residual.

In Example 159, the subject matter of any one of Examples 156 to 158 can optionally include wherein adapting the one or more algorithm parameters of the parametric model includes applying an output operator of the parametric model to the predicted state estimate to obtain a predicted output, comparing the predicted output to the current measurement sample to obtain a measurement residual, and adapting the one or more algorithm parameters based on the measurement residual.

In Example 160, the subject matter of Example 159 can optionally include wherein the one or more algorithm parameters determine the relative contributions of the predicted state estimate and the measurement residual to the updated state estimate.

In Example 161, the subject matter of any one of Examples 150 to 160 can optionally include wherein adapting the one or more model parameters of the parametric model includes adapting the one or more model parameters based on an internal variable of the parametric filtering algorithm.

In Example 162, the subject matter of any one of Examples 150 to 160 can optionally include wherein adapting the one or more algorithm parameters includes adapting the one or more algorithm parameters based on an internal variable of the parametric filtering algorithm.

In Example 163, the subject matter of Example 161 or 162 can optionally include wherein the internal variable is a prior or current state estimate error covariance of the parametric filtering algorithm.

In Example 164, the subject matter of any one of Examples 150 to 163 can optionally include wherein executing the parametric filtering algorithm with the parametric model includes executing a single-moment filter of the parametric filtering algorithm with the parametric model based on a current measurement sample of the signal to obtain a single moment state estimate and a single-moment state estimate error covariance, determining a multi-moment state estimate error covariance for the interference signal based on a prior single-moment state estimate error covariance, corresponding to a sample prior to the current measurement sample, and the single-moment state estimate error covariance, executing a multi-moment filter extension of the parametric filtering algorithm based on the current measurement sample and the multi-moment state estimate error covariance to obtain a multi-moment state estimate, and determining the estimated interference signal with the multi-moment state estimate and the parametric model.

In Example 165, the subject matter of any one of Examples 150 to 164 can optionally further include determining, at a first time, whether the signal includes the interference signal and whether a front-end receiving the signal is operating linearly, if, at the first time, the front-end is operating linearly and the signal includes the interference signal, executing the parametric filtering algorithm with the parametric model to determine an estimated interference signal and removing the estimated interference signal from the signal to obtain an output signal for the first time, and if, at the first time, the front-end is not operating linearly, obtaining a clipped signal as the output signal for the first time.

Example 166 is a communication device including a filter configured to receive a signal including an interference signal, and to execute a parametric filtering algorithm with a parametric model on the signal to determine an estimated interference signal, and an adaptation engine configured to track performance of the parametric filtering algorithm, adapt, based on the performance, one or more model parameters of the parametric model that fit the parametric model to a statistical distribution of the interference signal, and adapt, based on the performance, one or more algorithm parameters of the parametric filtering algorithm.

In Example 167, the subject matter of Example 166 can optionally further include a model detector configured to determine one or more statistical features of the signal and to select, from a plurality of models, a model that fits the one or more statistical features of the signal as the parametric model.

In Example 168, the subject matter of Example 167 can optionally include wherein each of the plurality of models is a parametric model that is adaptable to fit different statistical distributions in a statistical distribution family.

In Example 169, the subject matter of Example 167 can optionally include wherein the plurality of models are parametric models with different types of model parameters, and wherein the adaptation engine is configured to adapt the one or more model parameters of the parametric model by adapting the one or more model parameters based on their specific type.

In Example 170, the subject matter of any one of Examples 167 to 169 can optionally include wherein the one or more statistical features of the signal include a probability density function (PDF), an autocorrelation function (ACF), or a higher-order statistical cumulant function.

In Example 171, the subject matter of any one of Examples 167 to 169 can optionally include wherein the model detector is configured to select the model that fits the one or more statistical features of the signal as the parametric model by comparing the one or more statistical features of the signal to one or more pre-computed statistical features of the plurality of models to identify the parametric model as one of the plurality of models with one or more similar statistical features.

In Example 172, the subject matter of any one of Examples 166 to 171 can optionally include wherein the filter includes a prediction engine configured to execute a prediction stage of the parametric filtering algorithm with the parametric model to obtain a predicted state estimate and a predicted state estimate error covariance for the interference signal, and a correction engine configured to execute a correction stage of the parametric filtering algorithm based on the predicted state estimate, the predicted state estimate error covariance, and a current measurement sample of the signal to obtain an updated state estimate and an updated state estimate error covariance, where the estimated interference signal is based on the updated state estimate.

In Example 173, the subject matter of Example 172 can optionally include wherein the one or more algorithm parameters determine relative contributions of the predicted state estimate and the current measurement sample to the updated state estimate.

In Example 174, the subject matter of Example 172 or 173 can optionally include wherein the adaptation engine is configured to adapt the one or more model parameters of the parametric model by applying an output operator of the parametric model to the predicted state estimate to obtain a predicted output, comparing the predicted output to the current measurement sample to obtain a measurement residual, and adapting the one or more model parameters based on the measurement residual.

In Example 175, the subject matter of any one of Examples 172 to 174 can optionally include wherein the adaptation engine is configured to adapt the one or more algorithm parameters of the parametric model by applying an output operator of the parametric model to the predicted state estimate to obtain a predicted output, comparing the predicted output to the current measurement sample to obtain a measurement residual, and adapting the one or more algorithm parameters based on the measurement residual.

In Example 176, the subject matter of Example 175 can optionally include wherein the one or more algorithm parameters determine the relative contributions of the predicted state estimate and the measurement residual to the updated state estimate.

In Example 177, the subject matter of any one of Examples 166 to 176 can optionally include wherein the adaptation engine is configured to adapt the one or more model parameters based on an internal variable of the parametric filtering algorithm In Example 178, the subject matter of any one of Examples 166 to 176 can optionally include wherein the adaptation engine is configured to adapt the one or more algorithm parameters based on an internal variable of the parametric filtering algorithm In Example 178, the subject matter of Example 177 or 178 can optionally include wherein the internal variable is a prior or current state estimate error covariance of the parametric filtering algorithm.

In Example 180, the subject matter of any one of Examples 166 to 179 can optionally include wherein the filter includes a single-moment prediction and correction engine configured to execute a single-moment filter of the parametric filtering algorithm with the parametric model based on a current measurement sample of the signal to obtain a single moment state estimate and a single-moment state estimate error covariance, a covariance renormalizer configured to determine a multi-moment state estimate error covariance for the interference signal based on a prior single-moment state estimate error covariance, corresponding to a sample prior to the current measurement sample, and the single-moment state estimate error covariance, a multi-moment prediction and correction engine configured to execute a multi-moment filter extension of the parametric filtering algorithm based on the current measurement sample and the multi-moment state estimate error covariance to obtain a multi-moment state estimate, and further configured to determine the estimated interference signal with the multi-moment state estimate and the parametric model.

In Example 181, the subject matter of any one of Examples 166 to 180 can optionally further include a scenario classifier configured to determine, at a first time, whether the signal includes the interference signal and whether a front-end receiving the signal is operating linearly, if, at the first time, the front-end is operating linearly and the signal includes the interference signal, control the filter to execute the parametric filtering algorithm with the parametric model to determine an estimated interference signal and to control the communication device to remove the estimated interference signal from the signal to obtain an output signal for the first time, and if, at the first time, the front-end is not operating linearly, control the communication device to obtain a clipped signal as the output signal for the first time.

In Example 182, any method of one of Examples 1 to 181 may be embodied as executable instructions and stored on a non-transitory computer-readable medium for subsequent retrieval and execution by one or more processors.

Example 182 is a processor configured to retrieve the executable instructions of Example 182 from the non-transitory computer readable medium and to execute the executable instructions.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A radio frequency interference (RFI) mitigation circuit comprising:
- a selector circuit configured to select between a cleaned signal and a clipped signal, and provide the selected signal as an output signal; and
- a classifier circuit configured to cause the selector circuit to
  - select the cleaned signal as the output signal based at least on a front-end circuit signal indicating that the front-end circuit is operating linearly; and
  - select the clipped signal as the output signal based at least on the front-end circuit signal indicating that the front-end circuit is not operating linearly.

2. The RFI mitigation circuit of claim 1, further comprising:
- a filter configured to generate an estimated interference signal according to model-based filtering performed on the front-end circuit signal using a selected model that fits one or more statistical features of the front-end circuit signal; and
- a subtractor configured to remove the estimated interference signal from the front-end circuit signal to obtain the cleaned signal.

3. The RFI mitigation circuit of claim 2, wherein the filter comprises:
- a prediction engine configured to obtain, based on the selected model, a predicted state estimate and a predicted state estimate error covariance for the estimated interference signal; and
- a correction engine configured to obtain an updated state estimate and an updated state estimate error covariance based on the predicted state estimate, the predicted state estimate error covariance, and a current measurement sample of the front-end circuit signal, wherein the estimated interference signal is based on the updated state estimate.

4. The RFI mitigation circuit of claim 2, wherein the filter comprises:

a single-moment prediction and correction engine configured to obtain a single-moment state estimate and a single moment state estimate error covariance according to the selected model and based on a current measurement sample of the signal;

a covariance renormalizer configured to obtain a multi-moment state estimate error covariance for the estimated interference signal based on a prior single-moment state estimate error covariance, corresponding to a sample prior to the current measurement sample, and the single-moment state estimate error covariance; and a multi-moment prediction and correction engine configured to obtain a multi-moment state estimate based on the current measurement sample and the multi-moment state estimate error covariance, and generate the estimated interference signal according to the multi-moment state estimate and the selected model.

5. The RFI mitigation circuit of claim 1, wherein the selector circuit is further configured to select between the cleaned signal, the clipped signal, and the front-end circuit signal, and wherein the classifier circuit is further configured to:

cause the selector circuit to select the cleaned signal as the output signal further based on the front-end circuit signal indicating that the front-end circuit signal includes an interference signal, and cause the selector circuit to select the front-end circuit signal as the output signal based at least on the front-end circuit signal indicating that the front-end circuit is not operating linearly, and the front-end circuit signal includes the interference signal.

6. The RFI mitigation circuit of claim 1, wherein the classifier circuit is further configured to:

detect that the front-end circuit is operating linearly based at least on detecting that a power level of the front-end circuit signal does not exceed a signal power threshold; and detect that the front-end circuit is not operating linearly based at least on detecting that the power level of the front-end circuit signal exceeds the signal power threshold.

7. A communication device comprising:

a front-end circuit configured to receive a radio frequency (RF) signal and generate a front-end circuit signal based on the received RF signal;

a radio frequency interference (RFI) mitigation circuit comprising:

a selector circuit configured to select between a cleaned signal and a clipped signal, and provide the selected signal as an output signal, and a classifier circuit configured to cause the selector circuit to select the cleaned signal as the output signal based at least on a front-end circuit signal indicating that the front-end circuit is operating linearly; and select the clipped signal as the output signal based at least on the front-end circuit signal indicating that the front-end circuit is not operating linearly; and a baseband processor configured to generate a baseband signal based on the output signal.

8. The communication device of claim 7, wherein the RFI mitigation circuit further comprises:

a filter configured to generate an estimated interference signal according to model-based filtering performed on the front-end circuit signal using a selected model that fits one or more statistical features of the front-end circuit signal; and a subtractor configured to remove the estimated interference signal from the front-end circuit signal to obtain the cleaned signal.

9. The communication device of claim 8, wherein the filter comprises:

a prediction engine configured to obtain, based on the selected model, a predicted state estimate and a predicted state estimate error covariance for the estimated interference signal; and a correction engine configured to obtain an updated state estimate and an updated state estimate error covariance based on the predicted state estimate, the predicted state estimate error covariance, and a current measurement sample of the front-end circuit signal, wherein the estimated interference signal is based on the updated state estimate.

10. The communication device of claim 8, wherein the filter comprises:

a single-moment prediction and correction engine configured to obtain a single-moment state estimate and a single moment state estimate error covariance according to the selected model and based on a current measurement sample of the signal;

a covariance renormalizer configured to obtain a multi-moment state estimate error covariance for the interference signal based on a prior single-moment state estimate error covariance, corresponding to a sample prior to the current measurement sample, and the single-moment state estimate error covariance; and a multi-moment prediction and correction engine configured to obtain a multi-moment state estimate based on the current measurement sample and the multi-moment state estimate error covariance, and generate the estimated interference signal according to the multi-moment state estimate and the selected model.

11. The communication device of claim 7, wherein the selector circuit is further configured to select, between the cleaned signal, the clipped signal, and the front-end circuit signal, and wherein the classifier circuit is further configured to:

cause the selector circuit to select the cleaned signal selected as the output signal further based on the front-end circuit signal indicating that the front-end circuit signal includes an interference signal, and cause the selector circuit to select the front-end circuit signal as the output signal based at least on the front-end circuit signal indicating that:

the front-end circuit is not operating linearly, and the front-end circuit signal includes the interference signal.

12. The communication device of claim 7, wherein the classifier circuit is further configured to:

detect that the front-end circuit is operating linearly based at least on detecting that a power level of the front-end circuit signal does not exceed a signal power threshold; and detect that the front-end is not operating linearly based at least on detecting that the power level of the front-end circuit signal exceeds the signal power threshold.

13. A method for mitigating radio frequency interference, the method comprising:

selecting between a cleaned signal and a clipped signal, and providing the selected signal as a first output signal;

generating a first indication to have the cleaned signal selected as the first output signal based at least on a first front-end circuit signal indicating that the front-end circuit is operating linearly; and generating a second indication to have a second clipped signal selected as a second output signal based at least on a second front-end circuit signal indicating that the front-end circuit is not operating linearly.

14. The method of claim 13, further comprising:

generating an estimated interference signal according to model-based filtering performed on the first front-end circuit signal using a selected model that fits one or more statistical features of the first front-end circuit signal; and subtracting the estimated interference signal from the first front-end circuit signal to obtain the cleaned signal.

15. The method of claim 14, further comprising:

obtaining, based on the selected model, a predicted state estimate and a predicted state estimate error covariance for the estimated interference signal;

obtaining an updated state estimate and an updated state estimate error covariance based on the predicted state estimate, the predicted state estimate error covariance, and a current measurement sample of the first front-end circuit signal; and generating the estimated interference signal based on the updated state estimate.

16. The method of claim 14, further comprising:

by a single-moment prediction and correction engine, obtaining a single-moment state estimate and a single moment state estimate error covariance according to the selected model and based on a current measurement sample of the signal;

by a covariance renormalizer, obtaining a multi-moment state estimate error covariance for an interference signal of the first front-end circuit signal based on a prior single-moment state estimate error covariance, corresponding to a sample prior to the current measurement sample, and the single-moment state estimate error covariance; and by a multi-moment prediction and correction engine:

obtaining a multi-moment state estimate based on the current measurement sample and the multi-moment state estimate error covariance, and generating the estimated interference signal according to the multi-moment state estimate and the selected model.

17. The method of claim 13, further comprising:

selecting, according to the first indication, between the cleaned signal, the clipped signal, and the first front-end circuit signal;

generating the first indication to have the cleaned signal selected as the output signal further based on the first front-end circuit signal indicating that the first front-end circuit signal includes an interference signal; and generating a third indication to have a third front-end circuit signal selected as a third output signal based at least on the third front-end circuit signal indicating that:

the front-end circuit is not operating linearly, and the third front-end circuit signal includes the interference signal.

18. The method of claim 13, further comprising:

detecting that the front-end circuit is operating linearly based at least on detecting that a first power level of the first front-end circuit signal does not exceed a signal power threshold; and detecting that the front-end circuit is not operating linearly based at least on detecting that a second power level of the second front-end circuit signal exceeds the signal power threshold.

19. The method of claim 13, further comprising:

by the front-end circuit:

receiving a radio frequency (RF) signal; and generating the first front-end circuit signal based on the received RF signal.

20. The method of claim 13, further comprising:

by a baseband processor, generating a baseband signal based on the first output signal.

* * * * *